United States Patent [19]

Peterson et al.

[11] Patent Number: 5,903,873
[45] Date of Patent: May 11, 1999

[54] SYSTEM FOR REGISTERING INSURANCE TRANSACTIONS AND COMMUNICATING WITH A HOME OFFICE

[75] Inventors: Paul C. Peterson, Franklin, Tenn.; Thomas R. Johnson, Oak Park, Ill.; James J. Rambo, Hixson, Tenn.; James S. D'Agostino, Jr., Nashville, Tenn.; Gilbert W. Thibedore, Franklin, Tenn.; Paul P. McCullough, Brentwood, Tenn.; Lisa C. Spence, Nashville, Tenn.; Samuel E. Tinsley, Dickson, Tenn.; Michael A. Betts, Nashville, Tenn.

[73] Assignee: American General Life and Accident Insurance Company, Nashville, Tenn.

[21] Appl. No.: 08/658,821

[22] Filed: May 31, 1996

[51] Int. Cl.$^6$ .................................................. G06F 19/00
[52] U.S. Cl. .................. 705/4; 705/2; 705/3; 705/9; 705/10; 705/11
[58] Field of Search ................................. 705/4, 2, 3, 9, 705/10, 11

[56] References Cited

U.S. PATENT DOCUMENTS

| | | |
|---|---|---|
| 4,774,664 | 9/1988 | Campbell et al. . |
| 4,831,526 | 5/1989 | Luchs et al. . |
| 4,837,693 | 6/1989 | Schotz . |
| 4,905,186 | 2/1990 | Fukui . |
| 5,021,952 | 6/1991 | Nishimura et al. . |
| 5,032,989 | 7/1991 | Tornetta . |
| 5,168,444 | 12/1992 | Cukor et al. . |
| 5,184,314 | 2/1993 | Kelly et al. . |
| 5,191,522 | 3/1993 | Bosco et al. ............................ 364/401 |
| 5,194,852 | 3/1993 | More et al. . |
| 5,334,821 | 8/1994 | Campo et al. . |
| 5,347,115 | 9/1994 | Sherman et al. . |
| 5,381,534 | 1/1995 | Shi ........................................ 395/200 |
| 5,644,727 | 7/1997 | Atkins .................................... 395/240 |
| 5,655,085 | 8/1997 | Ryan et al. ............................. 364/401 |

*Primary Examiner*—Kevin J. Teska
*Assistant Examiner*—Thuan Do
*Attorney, Agent, or Firm*—Jacobson, Price, Holman & Stern, PLLC

[57] ABSTRACT

A system for registering insurance transactions and communicating the insurance transactions to a home office computer, preferably on a nightly basis. The system includes a plurality of communications interfaces and portable computers assigned to respective insurance agents, each of the portable computers including a display screen, data storage element for holding insurance information pertaining to a plurality of insurance customers, a computer processor, and a manual input unit. Each of the portable computers is programmed to receive queries from its respective insurance agent and, in response to the queries, to display agent-selected portions of the insurance information. Each of the portable computers is further programmed to receive agent transaction information from its respective insurance agent and to register the agent transaction information for subsequent transmission to the home office computer. Preferably, each portable computer is associated with one of a plurality of insurance districts and the system further includes a district office computer assigned to each insurance district. Each district office computer preferably operates in much the same way as the portable computer, although it is not necessary that the district office computers perform all of the same functions as the portable computers. Each district office computer also performs additional reporting functions and contains copies of all the information processed by the home office which is contained in the portable computers assigned to its district.

24 Claims, 38 Drawing Sheets

FIG. 6A

American General Life and Accident Insurance

Route List Planning

Family Group # [ ]  [View]  [icon] Wednesday, March 15, 1995

| FG # | Name | Status | Due Date | Amt. Due | Visit Pref | Rte Ind | LL PM |
|------|------|--------|----------|----------|------------|---------|-------|
| 0001 | CHANCEY | 1 | 11/07/1994 | 135.42 | WK1 | . | . |
| 0002 | WALKER | 8 | 12/21/1994 | .00 | 1 | . | . |
| 0003 | CHANCEY JR | 8 | 12/18/1994 | .00 | 1 | . | . |
| 0005 | HOFFMAN | 1 | 12/02/1994 | 40.00 | 1 | . | . |
| 0010 | BROWN III | 1 | 11/22/1994 | 35.00 | 1 | . | . |
| 0011 | RIVERS | 1 | 11/19/1994 | 35.00 | 1 | . | * |
| 0015 | MOTT | 8 | 01/01/1995 | .00 | M | . | . |
| 0020 | LESTER | 1 | 10/26/1994 | 90.00 | 1 | . | . |
| 0025 | SEBOURN | 9 | 12/19/1994 | .00 | 1 | . | . |
| 0030 | MACHIBRODA | 8 | 01/01/1995 | .00 | 1 | . | . |
| 0035 | KURTZ JR | 8 | 07/01/1995 | .00 | 1 | . | . |
| 0040 | MACOBRODA | 8 | 02/09/1995 | .00 | 1 | . | . |
| 0045 | MACHIBRODA | 8 | 02/09/1995 | .00 | 1 | . | * |
| 0055 | TURNER | 1 | 11/10/1994 | 22.00 | 1 | . | . |
| 0065 | HOOVER | 8 | 03/21/1995 | .00 | 1 | . | . |
| 0075 | KREGE | 9 | 10/13/1993 | .00 | M | . | . |
| 0080 | ROBERTS | 3 | 10/06/1994 | 115.40 | 1 | . | . |
| 0090 | PERKEY | 8 | 06/05/1997 | .00 | M | . | . |

FG #  Name

[ ] Wed
[ ] Thur
[ ] Fri
[ ] Sat
[ ] Sun
[ ] Mon
[ ] Tues

[Reset]  [File Info.]  Last Collection Date  [Cancel] [OK]

ROUTE LIST PLANNING

FIG. 7A

Daily Route List

Wednesday, March 15, 1995

| FG # | Name | Stat | Amt. Due | Phone # | Street | City | Clct Cmnt |
|------|------|------|----------|---------|--------|------|-----------|
| 2375 | DICKEY | 8 | .00 | | 2941 EMERSON AVE. | ST. PETE | |
| 0080 | ROBERTS | 3 | 115.48 | | 12029 134 PL N | LARGO | N |
| 2062 | YVONNE | 3 | 49.96 | (813) 321-0437 | 5121 14TH AVENUE | ST. PETERSBURG | N |
| 2227 | MCGOWAN | 3 | 83.04 | | 1450 37TH SO | ST. PETE | N |
| 2261 | RANGE | 3 | 108.96 | | 4735 1ST AVE SO | ST. PETE | N |
| 2370 | BROWN | 3 | 56.52 | (813) 232-7552 | 2849 6TH AVENUE S | ST. PETERSBURG | N |
| 2415 | SERY | 3 | 74.50 | | 2971 EMERSON AVE | ST. PETE | N |
| 2485 | HOLLOWAY | 3 | 24.24 | (813) 000-0000 | 2930 2ND AVE S | ST. PETERSBURG | N |
| 2486 | MOORE | 3 | 19.90 | | 2951 2ND AVE S | ST. PETE | N |
| 2544 | MCCRARY | 3 | 65.42 | | 2323 4 AVE S | ST. PETERSBURG | N |
| 2577 | BELL | 3 | 64.66 | | 21 AVE SO | ST. PETE | N |
| 2500 | BOLDEN | 3 | 17.32 | | 4TH AVE SO | ST. PETERSBURG | N |
| 2901 | GIVENS | 3 | 120.36 | | 2569 LANGDOM AVE | ST. PETERSBURG | N |
| 4012 | LUTS | 3 | 90.00 | | 5203 54TH AVE N | ST. PETERSBURG | N |

Route Comments

Collection Instructions

Reset

Last Collection Date

| FG Info | Payment History | Route Planning | Void Line [X] | Cancel | Collection |

FIG. 8A

[ View ] [ Reset ]   Family Group List

Family Group #

| FG # | Name | Status | Due Date | Total Due | Total Partial | Net Due Amount | Loan Ind. | Laps. Ind. | Rte Ind. | Visit Pref. |
|------|------|--------|----------|-----------|---------------|----------------|-----------|------------|----------|-------------|
| 0342 | KDYSLER | 4 | 07/25/94 | 40.00 | .00 | 40.00 | | | | 1 |
| 0370 | REYNOLDS | 1 | 01/05/95 | .00 | .00 | .00 | | | | M |
| 0975 | RUSH | 4 | 07/15/94 | 236.04 | .00 | 236.04 | | | | M |
| 0390 | ROBERTS | 1 | 09/15/94 | 30.38 | .00 | 30.38 | | | | WK1 |
| 0400 | PALMER | 3 | 09/01/94 | 59.04 | .00 | 59.04 | | | | M |
| 0405 | SMITH | 1 | 10/02/94 | 11.41 | .00 | 11.41 | | | | M |
| 0410 | DOWER | 1 | 10/06/94 | 17.94 | .00 | 17.94 | | | | M |
| 0415 | ESSDMEKIN | 4 | 08/27/94 | 30.22 | .00 | 30.22 | | | | M |
| 0418 | DUNCAN | 1 | 05/18/95 | .00 | .00 | .00 | | | | 1 |
| 0425 | BISHOP | 3 | 09/09/94 | 37.66 | .00 | 37.66 | | | | M |
| 0430 | BRETKERTON | 1 | 11/24/94 | .00 | .00 | .00 | | | | M |
| 0435 | KRAGAN | 9 | 09/01/94 | 20.52 | .00 | 20.52 | | | | M |
| 0440 | ODOM | 1 | 02/01/95 | .00 | .00 | .00 | | | | 1 |
| 0445 | BOCARD | 3 | 09/07/94 | 15.52 | .00 | 15.52 | | | | M |
| 0450 | CASSIDY | 4 | 09/01/94 | 78.20 | .00 | 78.20 | | | 1 | M |
| 0455 | BRODOST | 3 | 09/01/94 | 15.20 | .00 | 15.20 | | | | M |

○ Search by FG #
○ Search by Name

[ Payment History ] [ Mass Billing ] [ Add Group ] [ Remove Group ] [ Cancel ] [ Collection ]

FIG. 9A

American General Life and Accident Insurance

Family Group List

View | Reset | Family Group #

| FG # | Name | Status | Due Date | Total Due | Total Partial | Net Due Amount | Loan Ind. | Laps. Ind. | Rte Ind. | Visit Pref. |
|------|------|--------|----------|-----------|---------------|----------------|-----------|------------|----------|-------------|
| 0001 | DILLINGHAM | 1 | 01/05/1995 | 11.55 | .00 | 11.55 | | | | WK2 |
| 0370 | WILSON | 4 | XX/XX/XXXX | .00 | .00 | .00 | | | | X |
| 0975 | WILLIAMS | X | XX/XX/XXXX | X.XX | .00 | X.XX | | | | WK1 |
| 0390 | KELTE | X | XX/XX/XXXX | X.XX | .00 | X.XX | | | | X |
| 0400 | VILAMAN | X | XX/XX/XXXX | X.XX | .00 | X.XX | | | | X |
| 0405 | WILLIAMS | X | 01/01/1995 | X.XX | .00 | X.XX | | | | X |
| 0410 | WILCOX | X | XX/XX/XXXX | X.XX | .00 | X.XX | | | | X |
| 0415 | WILMONT | X | XX/XX/XXXX | X.XX | .00 | X.XX | | | | X |
| 0418 | COLBURN | X | XX/XX/XXXX | X.XX | .00 | X.XX | | | | X |
| 0425 | COLLEY | X | XX/XX/XXXX | X.XX | .00 | X.XX | | | | X |
| 0430 | WALE | X | XX/XX/XXXX | X.XX | .00 | X.XX | | | | X |
| 0435 | NELSON | X | XX/XX/XXXX | X.XX | .00 | X.XX | | | | X |
| 0440 | SOLOMON JR. | X | XX/XX/XXXX | X.XX | .00 | X.XX | | | | X |
| 0445 | SILVERMAN | X | XX/XX/XXXX | X.XX | .00 | X.XX | | | | X |
| 0450 | BULLEN | X | XX/XX/XXXX | X.XX | .00 | X.XX | | | | X |
| 0455 | SOLVSKY | X | XX/XX/XXXX | X.XX | .00 | X.XX | | | | WK2 |

○ Search by FG #
○ Search by Name

LAST COLLECTION DATE 05/02/1995

Payment History | Mass Billing | Add Group | Remove group | Cancel | Collection

SELECTION LIST: FAMILY GROUP INFORMATION

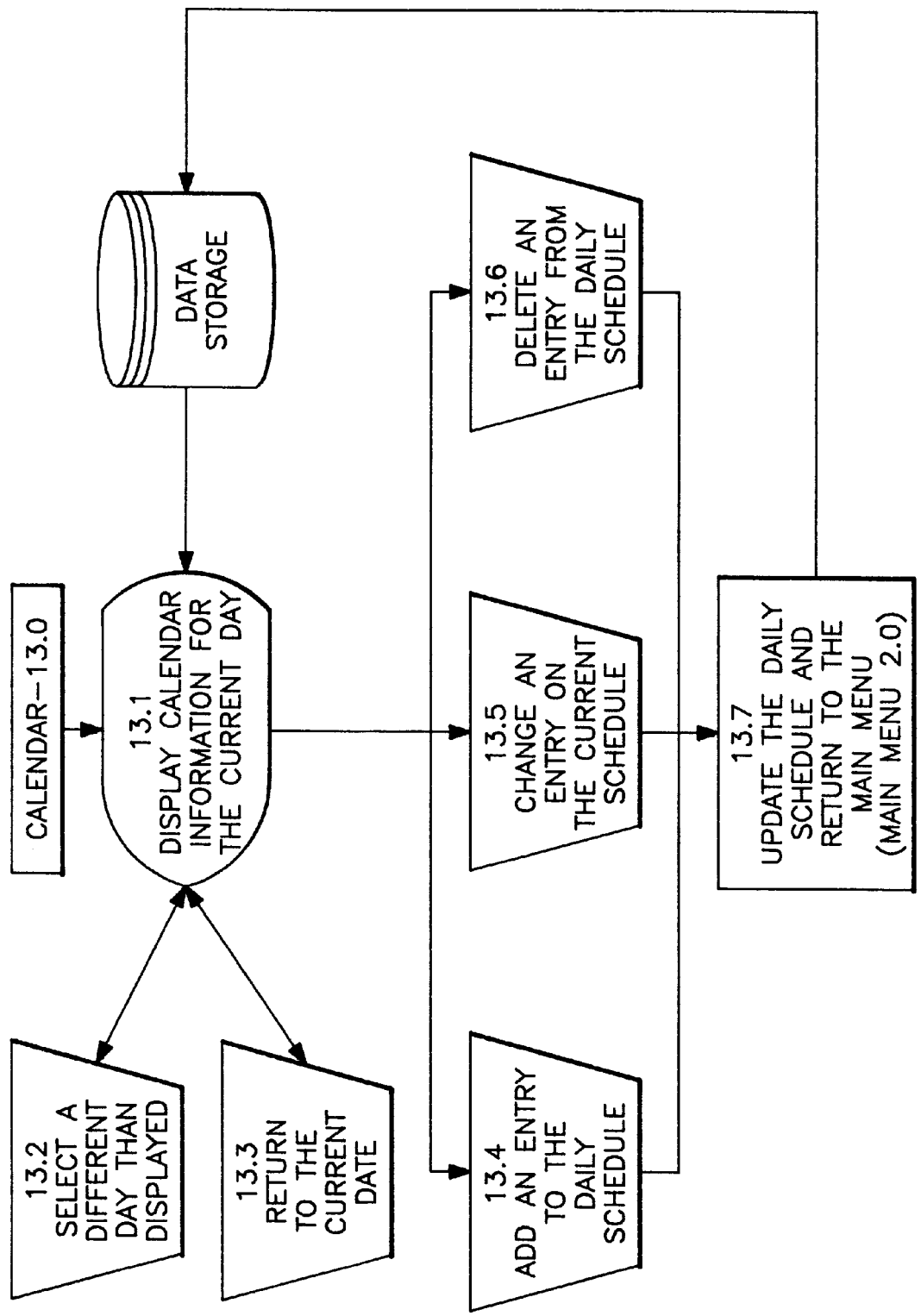

FIG. 16A

American General Life and Accident Insurance

Calendar

| ◀ | March | ▲ | | | 1995 | |
|---|---|---|---|---|---|---|
| Su | Mo | Tu | We | Th | Fr | Sa |
| | | | 1 | 2 | 3 | 4 |
| 5 | 6 | 7 | 8 | 9 | 10 | 11 |
| 12 | 13 | 14 | 15 | ░16░ | 17 | 18 |
| 19 | 20 | 21 | 22 | 23 | 24 | 25 |
| 26 | 27 | 28 | 29 | 30 | 31 | |
| ▼ | | | | | | |

Daily Schedule

8:00 AM COLLECT JONES TODAY
10:30 AM MAKE EIWL SALES PRESENTATION TO MR. LARSON
6:30 PM INS. REVIEW AT SMITH

[Add] [Change] [Delete]

COLLECT JONES TODAY

[Today] [OK]

FIG. 21A

Collections

FG# 0830 FG Homer Wilbur          FG Address

Billed        Non-Billed     Amt. Payable    Amt. Tendered    Amount Due:
○ 124.76   ○ 0.00             124.76              0.00              124.76
                    Display Information is not sufficient Billed
○ Monthly Mode              ● Premium Due                          ○ Policy Level

| Policy # | Insured Name | Bill Type | xxx | xxx | Due Date | Mode Prem. | Due Amount | Net Due Amount | Amount Paid |
|---|---|---|---|---|---|---|---|---|---|
| 0189208162 | JONES, RICHIE D. | 1 MSD | N | | 12/22/1994 | 16.70 | 32.76 | 32.76 | 32.76 |
| 0194374701 | SOMERS, PAUL E. | 1 MSD | N | | 01/02/1995 | 46.00 | 92.00 | 92.00 | 92.00 |

[Clear]
[Clear All]

[FG Info]  [Policy Detail]  [Payment History]       [Cancel]   [OK]

COLLECTIONS

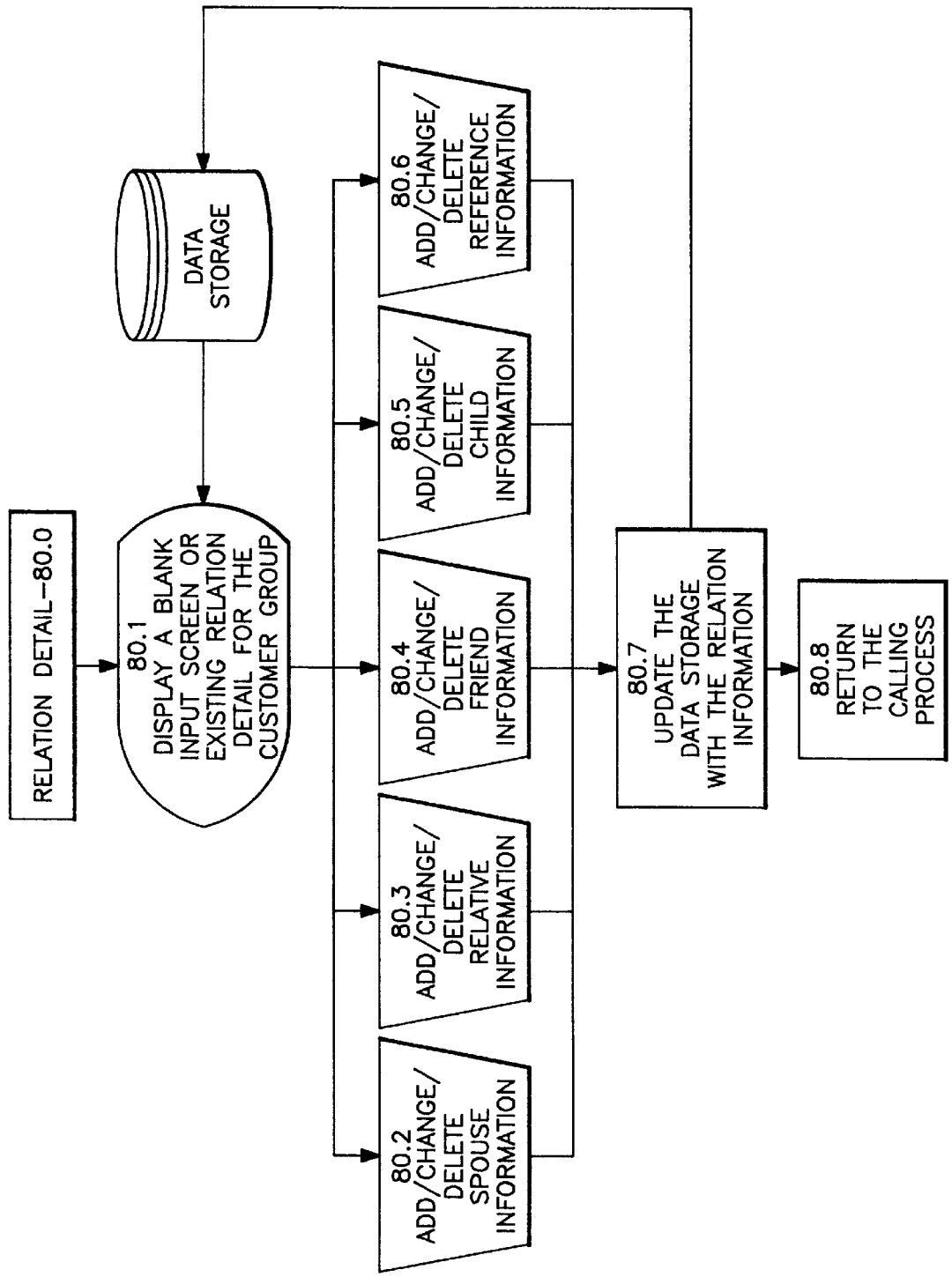

SYSTEM FOR REGISTERING INSURANCE TRANSACTIONS AND COMMUNICATING WITH A HOME OFFICE

BACKGROUND OF THE INVENTION

The present invention relates to a system for registering insurance transactions and communicating the insurance transactions to the home office computer of an insurance company.

It is known that insurance agents in certain parts of the United States occasionally visit their customers, at home or at work, and transact insurance business at such remote locations from the insurance agent's office. This has proven to be a desirable way of transacting insurance matters because it is convenient to the customer.

Conventionally, such insurance transactions were manually documented on paper and were subsequently entered into a computer by clerical staff either at the insurance agent's district office, or at the home office. This arrangment, however, leaves open the potential for errors during entry of the information into the computer by the clerical staff. Many such errors might be avoided if the agent could personally enter the information into the computer system while the transaction is being consummated with the customer.

Although there are many conventional data processing systems capable of processing financial transactions and several known data processing systems capable of processing insurance transactions, there are deficiencies in the conventional systems which the present invention overcomes.

Examples of conventional financial, business or insurance data processing systems include the subject matter disclosed in the following patents:

| U.S. Pat. No. | Patentee |
|---|---|
| 4,774,664 | Campbell et al. |
| 4,831,526 | Luchs et al. |
| 4,837,693 | Schotz |
| 4,905,186 | Fukui |
| 5,021,952 | Nishimura et al. |
| 5,032,989 | Tornetta |
| 5,168,444 | Cukor et al. |
| 5,184,314 | Kelly et al. |
| 5,194,852 | More et al. |
| 5,347,115 | Sherman et al. |
| 5,334,821 | Campo et al. |

None of the foregoing conventional arrangements achieves the combination of features and advantages provided by the present invention.

SUMMARY OF THE INVENTION

It is a primary object of the present invention to overcome the deficiencies associated with the conventional systems by providing a system for registering insurance agent transactions into a portable computer in the field and for communicating the insurance agent transactions to a home office.

Another object of the present invention is to provide a system capable of registering insurance agent transactions into a portable computer in the field and for communicating the insurance agent transactions to a home office computer which, in turn, processes the insurance agent transactions and transmits updated insurance information back to the portable computer.

It is another object of the present invention to provide a system for registering insurance agent transactions into a portable computer in the field and for communicating the insurance agent transactions to a home office computer on a nightly basis so that the home office computer can process the insurance agent transactions the following day while the portable computer registers additional transactions and so that the home office computer can transmit updated insurance information back to the portable computer on a subsequent night.

Yet another object of the present invention is to provide a computer system for registering insurance agent transactions into a portable computer, wherein a data storage element of the portable computer includes two groups of tables, only one of which groups of tables receives agent transaction information, the other group of tables being modifiable by the portable computer only in response to updated insurance information from the home office computer. This advantageously prevents discrepancies between the insurance data used by the portable computer and the data at the home office.

Another object of the present invention is to provide a portable computer for registering agent transaction information and linked to a home office computer which processes the agent transaction information to provide updated insurance information based on the agent transaction information, which updated insurance information is transmitted to the portable computer and an associated district office computer.

In order to achieve the foregoing and other objects, the present invention provides a system for registering insurance agent transactions and communicating the insurance transactions to a home office. The system includes at least one portable computer including a display screen, data storage element for holding insurance information pertaining to a plurality of insurance customers, a computer processor, and a manual input unit.

The term "customer", as used in this disclosure, is not limited to an individual person or policy holder, but rather may encompass numerous individuals or policy holders which are grouped together as a single "customer" because they share a common address, employment or any other characteristic.

The portable computer is programmed to receive queries from an insurance agent via the manual input unit and, in response to the queries, to display agent-selected portions of the insurance information.

The portable computer is further programmed to receive agent transaction information from the insurance agent via the manual input unit and to register the agent transaction information.

The system further includes a communication interface for transmitting the agent transaction information from the portable computer to the home office and for receiving from the home office updated insurance information which the computer processor of the portable computer uses to alter the insurance information in the data storage element.

Preferably, the data storage element of the portable computer is allocated into two groups of storage tables. The insurance information pertaining to a plurality of insurance customers and derived from updated insurance information from the home office is stored in the first group of tables, and the agent transaction information from the insurance agent is registered in the second group of tables, which second group of tables may also be altered by data transmitted from the home office or the district office.

Preferably, the portable computer is programmed to alter the insurance information in the first group of tables only in response to updated insurance information from the home office. This advantageously keeps the first group of tables consistent with the information at the home office and prevents discrepancies from arising.

According to a preferred arrangement, the display screen is activated by the portable computer to create a plurality of display fields, and the manual input unit includes an electronic pen which the insurance agent places against selectively chosen ones of the display fields and manually manipulates to communicate the agent transaction information to the portable computer.

The portable computer is preferably programmed to operate in a Route List Planning mode during which the display screen visually presents at least a portion of a first list and at least a portion of a second list. The first list includes customer information sorted according to one of a plurality of different sorting arrangements. The second list is a route list containing only customer information pertaining to customers which are to be visited, as selected from the first list by the insurance agent.

The portable computer is further programmed to recognize and execute commands from the insurance agent via the manual input unit directing the computer processor to move selected customer information from the first list to the second list.

The portable computer is further programmed to operate in a Daily Route List mode during which the second list is displayed without displaying the first list, the portable computer being further programmed to recognize selection of customer information from the second list via the manual input unit by the insurance agent, and being further programmed to retrieve and display supplemental insurance information from the data storage element. The supplemental insurance information is associated with the customer information selected from the second list by the insurance agent.

The portable computer is also programmed to recognize a selection of one of the different sorting arrangements by the insurance agent via the manual input unit and to execute sorting of the first list in accordance therewith. The portable computer is preferably programmed so that the plurality of different sorting arrangements include a first sorting arrangement wherein sorting is performed in numerical order according to a customer number assigned to each customer; a second sorting arrangement wherein sorting is performed in alphabetical order according to customer names; a third sorting arrangement wherein sorting is performed in chronological order according to due dates associated with each customer's insurance; and a fourth sorting arrangement wherein sorting is performed according to status information pertaining to customers' insurance policies, the status information being indicative of whether the insurance policies are in a current period, a lapsed period, or in a grace period within the lapsed period.

The portable computer is further programmed so as to recognize and execute commands from the insurance agent via the manual input unit directing the computer processor to limit the first list according to the status information pertaining to customers' insurance policies.

The portable computer may be further programmed so as to recognize and execute commands from the insurance agent via the manual input unit directing the computer processor to limit the first list according to visit preference information indicative of the best times and dates to visit the customers.

Preferably, the portable computer is programmed so that the first list includes customer numbers; customer names; the aforementioned status information; due dates for payments in connection with the customers' insurance policies; payment amounts due in connection with the customers' insurance policies; and visit preference information indicative of the best times and dates to visit the customers.

Preferably, the insurance information stored in the data storage element includes data indicative of payment amounts due from each customer. The portable computer is also programmed to receive, via the manual input unit, a collection query from the insurance agent. The collection query is associated with any one of the insurance customers, the portable computer being further programmed to respond to the collection query by retrieving from the data storage element data indicative of a payment amount due from the insurance customer, and displaying the payment amount on the display screen.

The portable computer is programmed to accept payment amount information indicative of an amount paid by an insurance customer to the insurance agent. The payment amount information is provided by the insurance agent via the manual input unit. The portable computer is further programmed to register the payment amount information in the data storage element.

Preferably, the portable computer is also programmed to register the type of payment received by the agent (e.g., cash or check) and to calculate, if appropriate, the amount of change due back to the customer.

The portable computer further includes means for preventing the portable computer from accepting payment amount information associated with improper transactions or transactions which are not permitted under insurance laws and regulations. For example, the portable computer prevents a Florida-licensed agent from failing to give a customer the legally required discount when the customer pays a premium amount which exceeds two monthly modal premiums. Similarly, for transactions involving a Virginia-licensed agent and policies in their grace period and associated with no postal addresses or a postal address in Virginia, the portable computer is programmed to prohibit entry of payments that do not cover all outstanding premiums.

Preferably, the portable computer includes a printer and is further programmed so as to print, via the printer, a receipt indicative of the amount paid by an insurance customer to the insurance agent.

The portable computer is programmed to receive, via the manual input unit, a close-out command from the insurance agent, and is further programmed to calculate a total representing the total amount of payments collected during a period of time preceding the close-out command. The portable computer is preferably also programmed to present the insurance agent with a deposit summary including the total amount. The portable computer is further programmed to print out the deposit summary via the printer.

The communication interface for transmitting the agent transaction information to the home office and for receiving from the home office updated insurance information, includes means for transmitting the payment amount information to the home office as at least part of the agent transaction information.

The portable computer is further programmed to receive modification information from the insurance agent via the manual input unit, the modification information corresponding to changes in the insurance information pertaining to a particular one of the insurance customers. The portable computer is further programmed to register the modification information in the data storage element and is also programmed to subsequently transmit the modification information via the communication interface to the home office as at least part of the agent transaction information.

Preferably, the data storage element includes ratebook information. The portable computer is programmed to receive ratebook inquiries from the insurance agent via the manual input unit, the ratebook inquiries corresponding to requests for pricing information associated with insurance policies available from the home office.

The portable computer is further programmed to respond to the ratebook inquiries with an indication of the pricing information, the pricing information being based on the ratebook information in the data storage element.

Preferably, the system of the present invention includes a plurality of the portable computers, each portable computer being associated with one of a plurality of insurance districts. Accordingly, the system further includes a district office computer assigned to each insurance district.

Each district office computer includes a district office data storage element for storing at least a portion of the insurance information contained in the data storage element of each portable computer assigned to that insurance district.

Each district office computer further includes a district office display screen, a district office computer processor, and a manual input device, each district office computer being programmed to receive queries from district office personnel via the manual input device and, in response to the queries, to display selected portions of the insurance information.

The district office computer is further programmed to receive district office transaction information from the district office personnel via the manual input device and to register the district office transaction information.

The system further includes a district office communication interface at each district office computer for transmitting the district office transaction information to the home office and for receiving from the home office district-specific updated insurance information. The district office computer processor utilizes this district-specific updated insurance information to alter the insurance information in the district office data storage element.

Preferably, each portable computer is programmed to receive, from the home office, updated insurance information derived from the district office transaction information.

The data storage element of the district office computer is preferably allocated into two groups of storage tables. The insurance information pertaining to a plurality of insurance customers and derived from district-specific updated insurance information from the home office is stored in the first group of tables, and district office transaction information from the district office personnel is registered in the second group of tables.

Preferably, the district office computer is programmed to alter the insurance information in the first group of tables only in response to district-specific updated insurance information from the home office. This advantageously keeps the first group of tables consistent with the information at the home office and prevents discrepancies from arising.

The home office computer preferably includes a central data storage element, means for processing the agent transaction information to provide updated insurance information pertaining to a particular one of the portable computers, and means for transmitting the updated insurance information to the particular one of the portable computers.

The above and other objects and advantages will become more readily apparent when reference is made to the following description taken in conjunction with the accompanying drawings.

BRIEF DESCRIPTION OF THE DRAWINGS

FIG. 6A illustrates an exemplary display screen in the Route List Planning mode of the present invention.

FIG. 7A illustrates an exemplary screen display generated in the Daily Route List mode.

FIG. 8A illustrates an exemplary Customer List Display according to the present invention.

FIG. 9A illustrates another exemplary Customer List Display according to the present invention.

FIG. 16 is a flow diagram illustrating a sequence of events in a Calendar mode according to the present invention.

FIG. 16A illustrates an exemplary Calendar Display according to the present invention.

FIG. 21A illustrates an exemplary display of billing information according to the present invention.

FIG. 33 is a flow diagram illustrating a sequence of events in a Relation Detail process according to the present invention.

DESCRIPTION OF THE PREFERRED EMBODIMENTS

Figure 1:
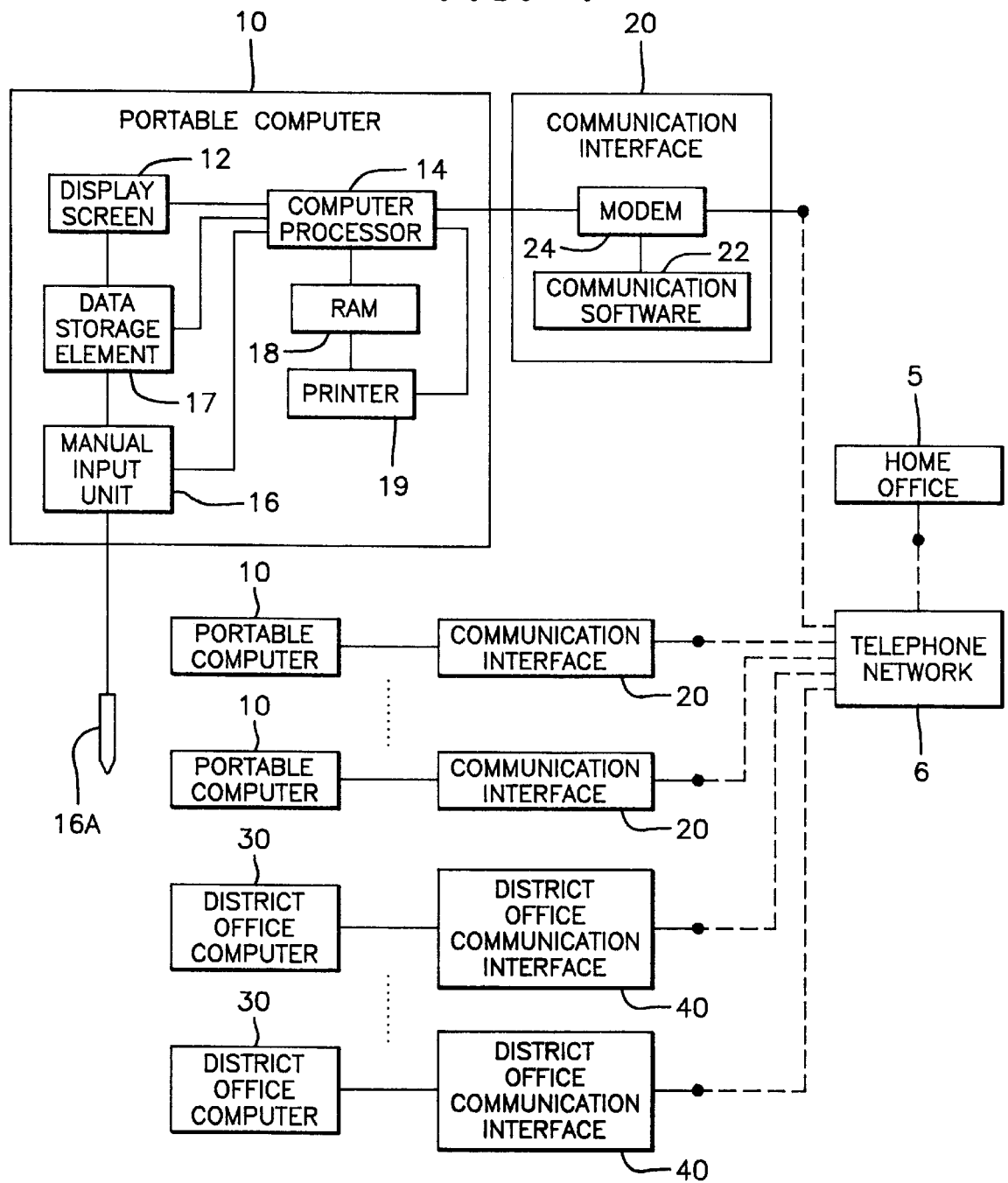
FIG. 1 is a block diagram of a system for registering insurance transactions and communicating the insurance transactions to a home office computer according to the present invention.

As illustrated in FIG. 1, a preferred embodiment of the system for registering insurance transactions and communicating the insurance transactions to a home office 5 includes at least one portable computer 10 and a communication interface 20. Although the communication interface 20 is illustrated as being separate and distinct from the portable computer 10, it is understood that the at least some of the elements which make up the communication interface 20 can be physically housed in the portable computer 20.

Each portable computer 10 preferably includes a display screen 12, a computer processor 14, a manual input unit 16, and a data storage element 17 for holding insurance information pertaining to a plurality of insurance customers. Preferably, each portable computer also includes random access memory (RAM) 18 and a printer 19.

According to a preferred embodiment of the present invention, each portable computer 10 comprises a tablet-type computer having an electronic pen 16A capable of operating as at least part of the manual input unit 16. Preferably, the display screen 12 is activated by the portable computer 10 to create a plurality of display fields and the portable computer 10 is responsive to placement of the electronic pen 16A against selectively chosen display fields. By providing such an electronic pen-based manual input unit 16, an insurance agent is able to manually manipulate the electronic pen 16A on the display screen 12 to communicate agent transaction information to the portable computer 10.

Although different portable computers can be used, a preferred tablet-type computer comprises a commercially available Fujitsu 325 Point notebook personal computer with a 386 processor operating at 25 Mhz, 8 megabytes of memory (4+4 DRAM) defining the RAM 18, 105 megabytes of data storage in the form of a PCMCIA slot with removable hard-disk which together define the data storage element 17, an Extech portable impact printer defining the printer 19, and a 3–8 hour battery.

The portable computer 10 is programmed to receive queries from the insurance agent via the manual input unit 16 and, in response to the queries, to display agent-selected portions of the insurance information on the display screen 12. Each portable computer 10 is further programmed to receive agent transaction information from the insurance agent via the manual input unit 16 and to register, or store, the agent transaction information.

Preferably, the data contained in the data storage element 17 is allocated into at least two groups of storage tables, each of which may be further divided into subsidiary tables. Insurance information originating at the home office 5, and transferred to the portable computer 10 in a manner to be described, which information pertains to a plurality of insurance customers, is stored in the first group of storage tables, while the agent transaction information inputted by the insurance agent is registered or stored in the second group of tables. In order to avoid discrepancies between the information contained at the home office 5 and the insurance information contained in the first group of tables of the data storage element, the portable computer 10 is programmed to alter the insurance information in the first group of storage tables only in response to updated insurance information from the home office 5. That is, the agent transaction information inputted by the insurance agent cannot alter or update the home office-derived information in the first group of storage tables.

Preferably, the aforementioned programming of the portable computer 10 is achieved by loading or providing software in the data storage element 17, which software is loaded into RAM 18 by the computer processor 14 during execution.

The software contained in the data storage unit 17 preferably comprises at least one application-specific program, as well as commercially available programs including, for example, MS Access 2.0, MS DOS 5.0, and MS Windows for Pen. The MS Access 2.0 software provides access to the information in the data storage element 17. The MS DOS 5.0 and MS Windows for Pen software respectively provide a basic operating system and support for the pen-based manual input unit 16.

The application-specific program(s), on the other hand, enable the portable computer 10 to perform the various operations described herein. It is understood that one having ordinary skill in the art would readily understand from this description how to create such application-specific programs, especially in light of the various commercially available software packages which facilitate creation of application-specific programs. Preferably, the application-specific program(s) of the present invention are created using the commercially available software known as Visual Basic 3.0.

The communication interface 20 is capable of transmitting the agent transaction information from the portable computer 10 to the home office 5 and is also capable of receiving from the home office 5 the updated insurance information which the computer processor 14 then uses to alter the insurance information in the first group of storage tables of the data storage element 17.

The communication interface 20 is preferably defined by the combination of communication software 22 and a 14.4 Kbps external Hayes-compatible modem 24. Preferably, the communication software 22 includes a commercially available package of communication software known as RemoteWare by XcelleNet. It is understood, however, that other communication software packages would suffice.

Preferably, the system of the present invention includes a plurality of the portable computers 10 and a plurality of the communication interfaces 20, each of which is assigned to a respective insurance agent. In addition, each portable computer 10 and the insurance agent to which it is assigned are associated with one of a plurality of insurance districts.

The system also preferably includes a district office computer 30 assigned to each insurance district and a district office communication interface 40 connected thereto.

Figure 2:
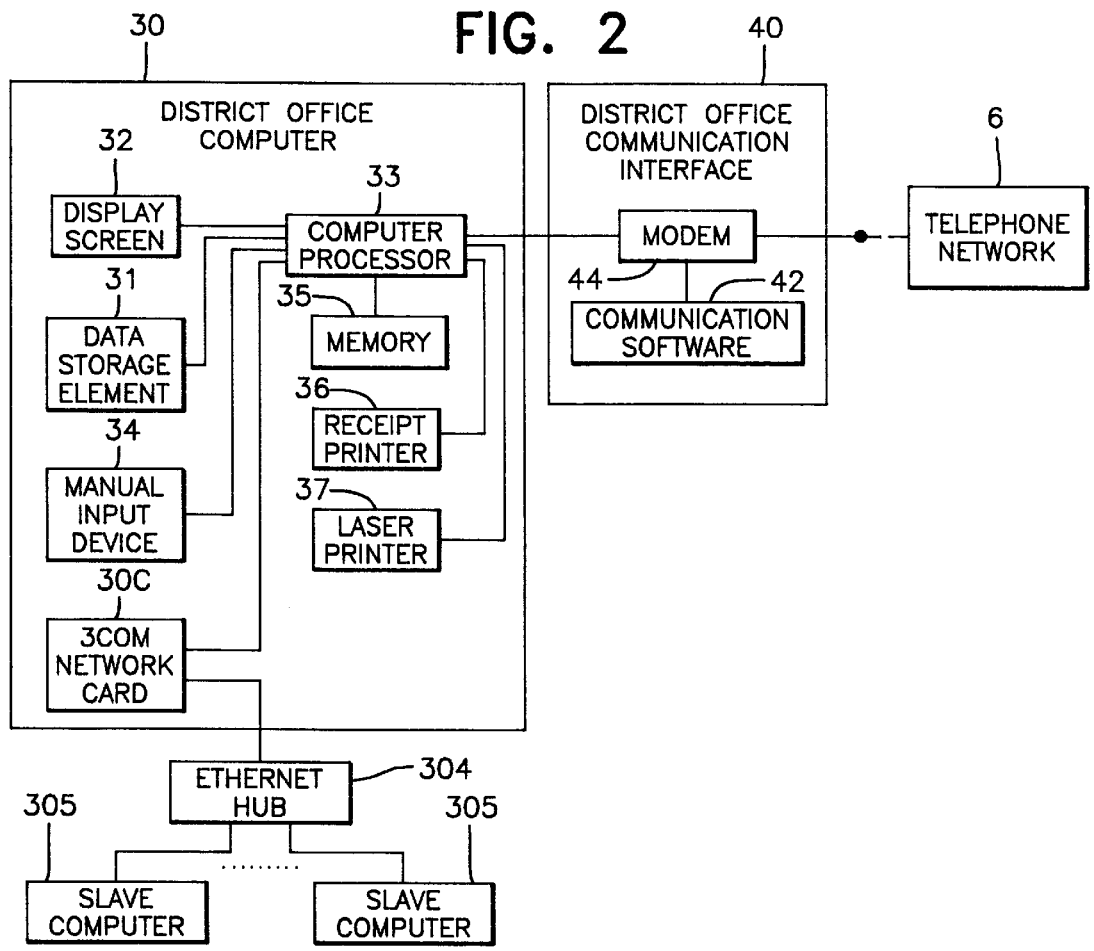
FIG. 2 is a block diagram of a district office computer and associated communication interface according to the present invention.

As illustrated in FIG. 2, each district office computer 30 includes a district office data storage element 31 for storing at least a portion of the insurance information contained in the data storage element 17 of each portable computer 10 assigned to the respective district. Each district office computer 30 further includes a district office display screen 32, a district office computer processor 33, a manual input device 34, a memory 35, a receipt printer 36, and a laser printer 37.

Although different district office computers 30 can be used, a preferred district office computer 30 comprises a commercially available Dell XM90 computer with a Pentium processor operating at 90 Mhz, 32 megabytes of memory defining the memory 35, 1.0 gigabyte of a data storage device defining a portion of the data storage element 31, a printer defining the receipt printer 36, a keyboard and/or mouse defining the manual input device 34, a PCM-CIA drive and associated 260 megabyte hard-disk defining another portion of the data storage element 31 (for example, for use in backing-up data), and an HP LaserJet printer defining the laser printer 37.

Preferably, the district office computer 30 is designated as a master work station and is further connected to a plurality of slave computers 30S via an EtherNet Hub 30H. The plurality of slave computers 30S, as well as the district office computer 30, each include a 3Com network card 30C for supporting network communications between the computers 30 and 30S. A local area network (LAN) is thus defined by the combination of the master work station, the slave computers 30S and the EtherNet Hub 30H. When such a LAN configuration is utilized, the slave computers 30S include essentially the same hardware elements as the master work station, except that there is no need to provide printers 36 and 37 at the slave computers 30S, since the slave computers 30S can utilize the printers 36 and 37 of the district office computer 30 via the EtherNet Hub 30H. Preferably, the slave computers 30S and the district office computer 30 are programmed to operate in much the same way.

The district office computer 30 is programmed to receive queries from district office personnel via the manual input device 34 and, in response to such queries, to display selected portions of the insurance information. Each district office computer 30 is further programmed to receive district office transaction information from district office personnel via the manual input device 34 and to register the district office transaction information.

Preferably, the data contained in the data storage element 31 is allocated into at least two groups of storage tables, each of which may be further divided into subsidiary tables. Insurance information originating at the home office 5, and transferred to the portable computer 10 in a manner to be described, which information pertains to a plurality of insurance customers in the respective district, is stored in the first group of storage tables, while the district office transaction information inputted by personnel at the district office is registered or stored in the second group of tables. In order to avoid discrepancies between the information contained at the home office 5 and the insurance information contained in the first group of tables of the data storage element 31, the district office computer 30 is programmed to alter the insurance information in the first group of storage tables only in response to district-specific updated insurance information from the home office 5. That is, the district office transaction information inputted by the district office personnel cannot alter or update the home office-derived information in the first group of storage tables.

Preferably, the updated insurance information transmitted to the portable computers 10 and the district-specific updated insurance information from the home office 5 are derived by the home office 5 from both agent transaction information and district office transaction information so that the district-specific updated insurance information transmitted back to the district office is always current and consistent with the updated insurance information transmitted to the relevant portable computer 10.

It is understood that programming of the district office computer 30 may be performed in much the same way as programming of the portable computers 10. Preferably, the programming of the district office computer 30 is achieved by loading or providing software in the data storage element 31, which software is loaded into the memory 35 by the computer processor 33 during execution.

The software contained in the data storage unit 31 preferably comprises at least one application-specific program, as well as commercially available programs including, for example, MS Access 2.5, MD DOS 6.2, and MS WFWG (Windows For Work Groups). The MS Access 2.5 software provides access to the information in the data storage element 31. The MS DOS 6.2 provides a basic operating system, while the MS WFWG software provides a Windows operating environment in the context of the aforementioned LAN.

The application-specific program(s) of the district office computer 30 enable the district office computer 30 to perform the various operations described herein. It is understood that one having ordinary skill in the art would readily understand from this description how to create such application-specific programs, especially in light of the various commercially available software packages which facilitate creation of application-specific programs. Preferably, the application-specific program(s) of the present invention are created using the commercially available software known as Visual Basic 3.0.

The district office communication interface 40 at each district office computer 30 is capable of transmitting the district office transaction information to the home office 5 and is further capable of receiving from the home office 5 the aforementioned district-specific updated insurance information which the district office computer processor 33 subsequently utilizes to alter the insurance information in the first group of tables of the district office data storage element 31.

The communication interface 40 is preferably defined by the combination of communication software 42 and a 28.8 Kbps Hayes-compatible modem 44. Preferably, the communication software 22 includes the aforementioned communication software known as RemoteWare by XcelleNet. It is understood, however, that other communication software packages would suffice.

Although FIGS. 1 and 2 show a telephone network 6 as providing the interconnection between the home office 5 and the portable computer 10 and the interconnection between the home office 5 and the district office computer 30, it is understood that the present invention is not limited to such an arrangement. In particular, the interconnection of these components can be provided by any known communications link, including radio communications, satellite communications, optical communications, and the like.

Figure 3:
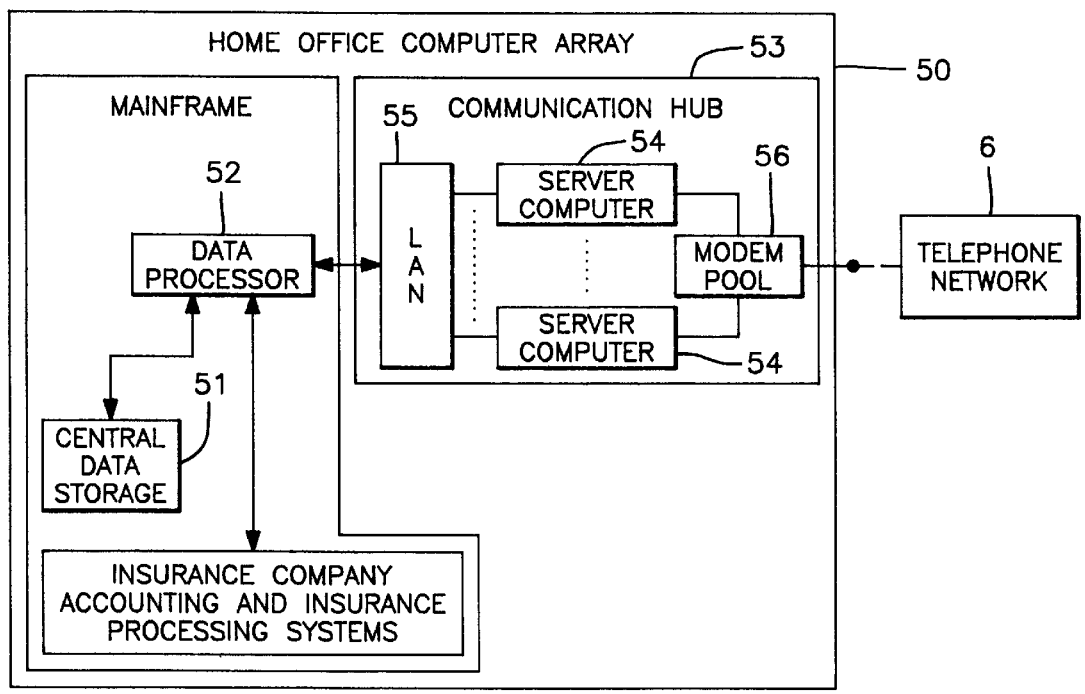
FIG. 3 is a block diagram of a home office computer according to the present invention.

As illustrated in FIG. 3, the home office 5 preferably includes a home office computer array 50. The home office computer array 50 includes a central data storage element 51, a data processor 52, and a communication hub 53. The communication hub 53 receives the agent transaction information from the portable computers 10 and transfers this information to the data processor 52. The data processor 52 is programmed to process the agent transaction information and to compile the updated insurance information at least part of which is based upon the received agent transaction information from the communication hub 53.

The communication hub 53 subsequently transmits the updated insurance information compiled by the data processor 52 to the particular portable computer 10 to which the updated insurance information pertains.

When district office computers 30 are utilized, the communication hub 53 at the home office 5 is also programmed to receive the district office transaction information and to present this information to the data processor 52 for processing. The data processor 52 accepts the district office transaction information from the communication hub 53 and then compiles the updated insurance information at least part of which is based upon the agent transaction information and district office transaction information received by the home office 5.

The data processor 52 is also programmed to compile the district-specific updated insurance information based on the district office transaction information and the agent transaction information originating from that particular district. This district-specific updated insurance information is subsequently transmitted to the relevant district office via the communication hub 53.

The data processor 52 is preferably programmed to retain in the central data storage element 51 copies of all the agent transaction information received by the home office 5 and copies of all the insurance information contained in the data storage means 17 of each portable computer 10. The data processor 52 is further programmed to retain in the central data storage element 51 copies of all the district office transaction information transmitted to the home office 5 by the district office computers 30.

Preferably, the data processor 52 of the home office computer array 50 is connected to at least one of many known computerized accounting and insurance processing systems presently used by insurance companies.

The various agent transactions and district office transactions are processed using the accounting and insurance processing systems of the insurance company, and the results of this processing are stored by the data processor 52 in the central data storage element 51. Based on these results, the data processor 52 compiles the updated insurance information and district-specific updated insurance information. The updated insurance information and district-specific updated information are then distributed by the data processor 52 to the relevant computers 10 or 30 via the communication hub 53.

The communication hub 53 may be created using known communication hub configurations. However, a preferred configuration includes a plurality of Dell XM90 server computers 54, each having a key board, display screen, 32 megabytes of memory, and one gigabyte of data storage; a local area network 55 linking the plurality of server computers 54 to the data processor 52, and a modem pool 56 connecting the plurality of server computers 54 to the telephone network 6.

Preferably, the server computers 54 utilize RemoteWare software by Xcellenet, as well as operating system software commercially available from IBM and known as OS/2 for Remoteware and Network Data Mover. The local area network (LAN) 55 preferably utilizes software known as Netware 3.12 by Novell. It is understood, however, that other forms of software may be used and that the present invention therefore is not limited to the foregoing exemplary software arrangements.

According to a preferred embodiment of the present invention, transmission of agent transaction information from the second group of storage tables of the data storage element 17 to the home office 5 is carried out on a nightly basis. Likewise, transmission of the district office transaction information to the home office 5 from the second group of storage tables of each data storage element 31 is carried out on a nightly basis.

The updated insurance information and the district-specific updated insurance information derived from the foregoing nightly transmissions are compiled the following day by the home office computer array 50, as indicated above, and are transmitted the following night to the respective portable computers 10 and district office computers 30. Upon receipt of the updated insurance information and district-specific updated information by the portable computers 10 and district office computers 30, the information is loaded into appropriate locations in the first group of tables of the data storage elements 17 and 31.

Preferably, the first group of tables in each of the data storage elements 17 and 31 is modified only in response to reception of district-specific updated information or updated insurance information from the home office 5. This advantageously prevents the first group of storage tables of each portable computer 10 or district office computer 30 from being contaminated with information that the home office 5 has yet to receive or process.

In order to maintain consistency between the data contained in the first group of tables of the district office computer 30 and data contained in the first group of tables of its respective portable computers 10, the home office computer array 50 compiles and transmits a piece of district-specific updated insurance information to the district office for each piece of updated insurance information transmitted to a portable computer 10. Likewise, for every piece of district-specific updated insurance information transmitted by the home office 5 to the district office, the home office computer array 50 also compiles and transmits a piece of updated insurance information to a relevant portable computer 10 associated with that district office.

According to a preferred embodiment of the present invention, the application-specific programs enable the following operations to be carried out by the portable computers 10 of the present invention, which operations are illustrated in the flow charts of FIGS. 4–33:

Log On

Figure 4:
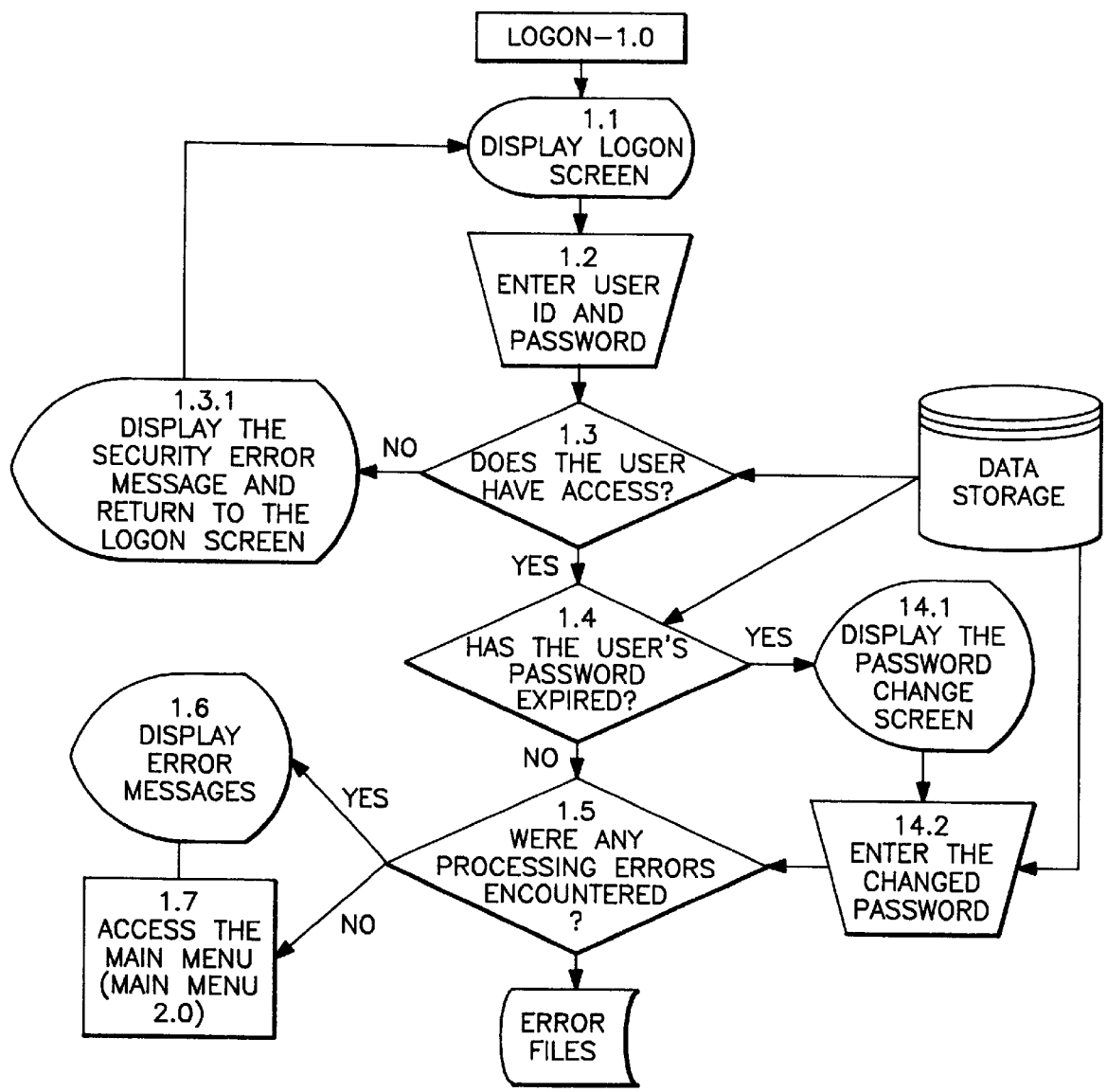
FIG. 4 is a flow diagram illustrating a sequence of events in a Log On mode according to the present invention.

With reference to FIG. 4, each portable computer is programmed to respond to the application of power by displaying a "log-on" screen on the display screen 12 (Step 1.1). The "log-on" screen preferably directs the insurance agent to enter his/her alphanumeric Identification (ID) and a confidential password into designated boxes into which individual characters of the ID and password are to be written. Using the electronic pen 16A, the insurance agent writes the correct ID and password into the boxes (Step 1.2).

The portable computer 10, using known handwriting recognition techniques, automatically determines what characters were entered into each box using the electronic pen 16A and displays the characters in each box. Preferably, only the characters of the ID are displayed, not that of the password, in order to preserve the confidentiality of the password.

The "log-on" display screen also includes a box marked "clear", a box marked "OK" and a box marked with a typewriter icon. The "clear" box is tapped using the electronic pen 16A when an incorrect entry is inadvertently made. The portable computer 10 responds to tapping of the "clear" box by clearing the entry and providing a new "log-on" display.

The typewriter icon is tapped using the electronic pen 16A when the insurance agent wishes to by-pass the handwriting recognition technique. The portable computer 10 responds to tapping of the typewriter icon by displaying a simulated typewriter keyboard and recognizing tapping of the electronic pen 16A on different characters of the keyboard. The tapped characters are displayed in successive ones of the aforementioned name and password boxes as each character is tapped.

Preferably, the boxes, as described above, and the keyboard icon appear whenever alphanumeric information is required by the portable computer 10 via the manual input unit 16.

When the electronic pen 16A is tapped against the "OK" box, the portable computer 10 determines that the intended entry was made and then determines whether the intended entry matches the name and password assigned to that particular portable computer (Step 1.3) and whether the password has expired (Step 1.4).

If there is no match, the portable computer 10 displays a "Security Error" message (Step 1.3.1) and will not exit the "log-in" screen. Preferably, after five unsuccessful attempts, the portable computer 10 shuts down and cannot be reused without intervention from home office personnel.

If there is a name and password match, but the user's password has expired, the portable computer 10 generates a password-change screen on the display screen 12 (Step 1.4.1) and awaits for a entry of a new password by the insurance agent. Upon receiving the new password (Step 1.4.2), the portable computer 10 displays error information concerning previous communications between the portable computer and the home office 5, if any such error information is present (Steps 1.5 and 1.6), and then displays a main menu of possible operating modes (Step 1.7).

The error information and main menu are also displayed when the portable computer 10 determines that there is a name and password match and that the password has not expired.

Main Menu

The main menu displayed on the display screen 12 preferably includes a plurality of icons, each icon being indicative of a particular operating mode of the present invention.

The preferred icons are indicative of a Route List Planning mode, Daily Route List mode, Customer Group Collections mode, Customer Group Information mode, Allowances and Purchases mode, Miscellaneous Payments mode; Unassigned Policies mode; Agency Close-out mode; Close-out History mode; Ratebook mode; Calendar mode; Home Office Connection mode; Security Maintenance mode; and a Log Off mode.

Figure 5:
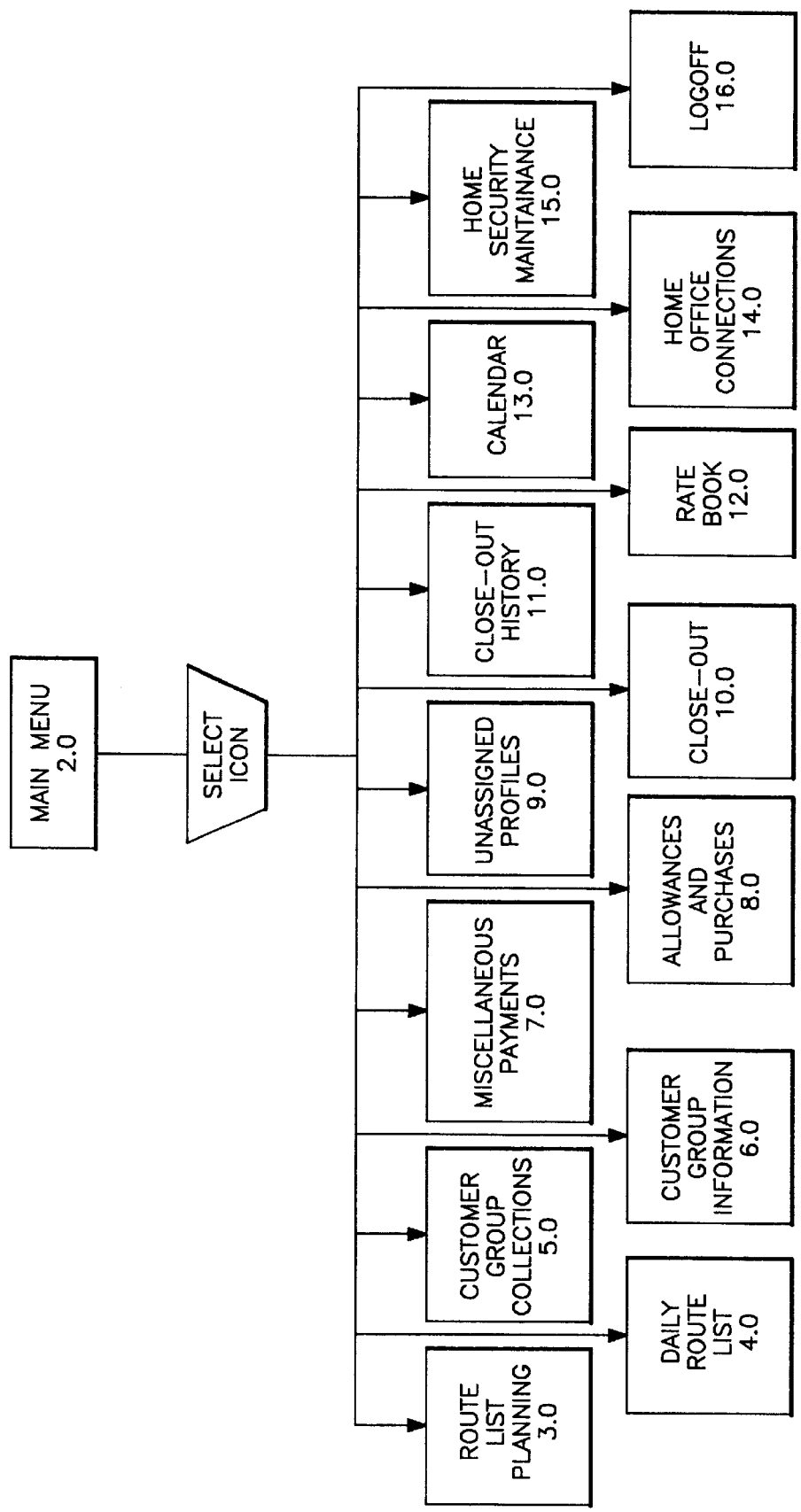
FIG. 5 is a flow diagram illustrating a sequence of events in a main menu mode according to the present invention.

As illustrated in FIG. 5, in order to enter one of the operating modes indicated by a particular icon, the insurance agent merely taps the particular icon with the electronic pen 16A, and the portable computer 10 automatically responds by entering the associated operating mode.

Route List Planning Mode

Figure 6:
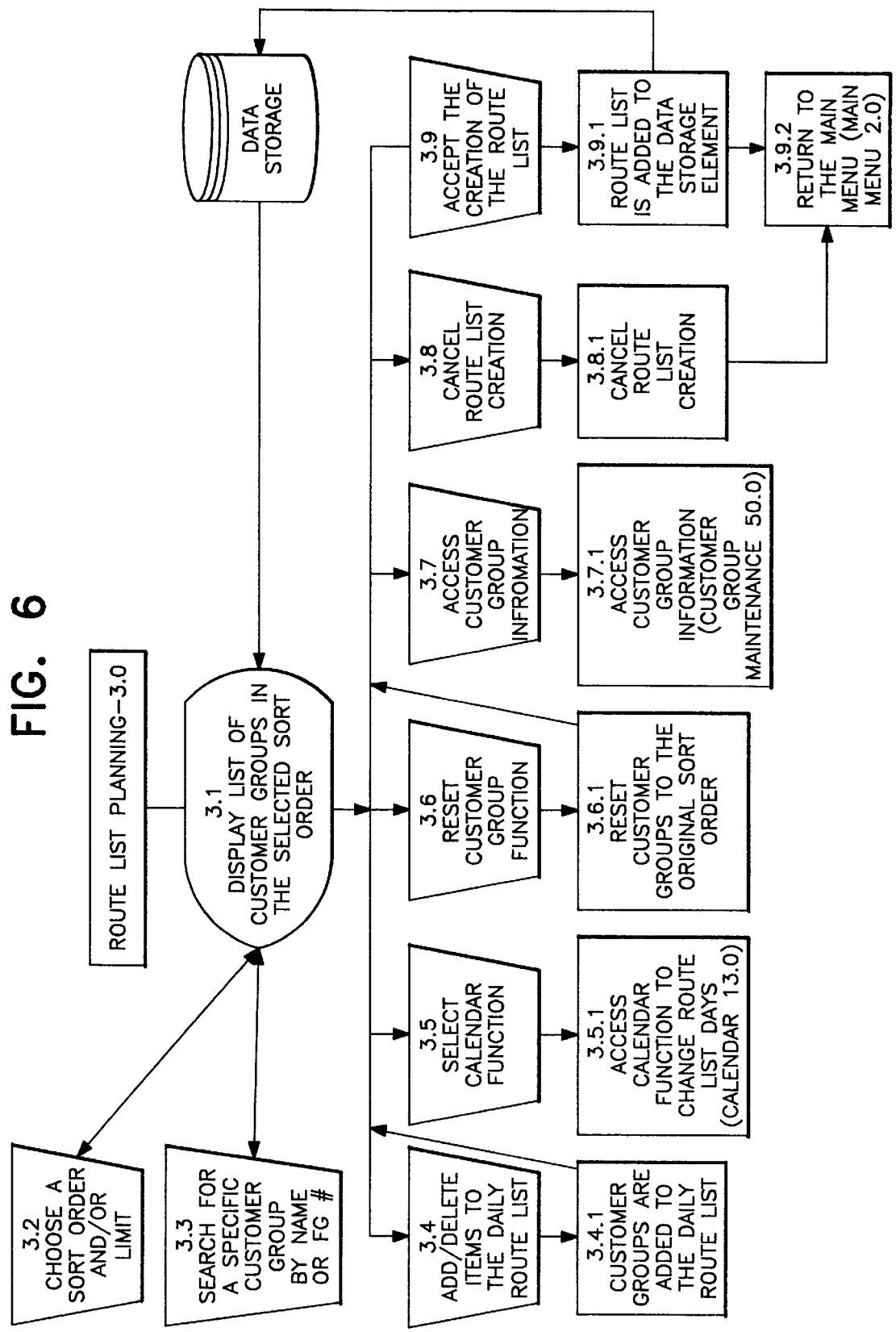
FIG. 6 is a flow diagram illustrating a sequence of events in a Route List Planning mode according to the present invention.

Preferably, as illustrated in FIG. 6, each portable computer 10 is programmed to operate in a Route List Planning mode which can be used by the insurance agent to schedule visits to insurance customers.

If the Route List Planning Mode is selected (Step 3.0) from the main menu, the portable computer 10 causes the display screen 12 to visually present at least a portion of a first list and at least a portion of a second list (Step 3.1). An exemplary display is illustrated in FIG. 6A, wherein the term "customer" has been replaced by "Family". The acronym "FG" therefore represents "family group".

The first list includes a row of customer information for each customer, the rows being sorted according to one of a plurality of different sorting arrangements. Preferably, each row of the first list includes a customer number; a customer name; status information pertaining to customers' insurance policies and indicative of whether the insurance policies are in a current period, a lapsed period, or in a grace period within the lapsed period; a due date for the next payment; the amount due; visit preference information indicative of when the best time is to visit a particular customer; information about the number of route lists upon which the particular customer appears; information indicative of whether a policy has lapsed; and information indicative of whether there are loans associated with a particular customer's policies.

The portable computer 10 is preferably programmed to recognize a selection of one of the sorting arrangements by the insurance agent using the manual input unit 16 (Step 3.2) and is also programmed to execute sorting of the first list in accordance therewith. The different sorting arrangements preferably include:

1. a first sorting arrangement wherein sorting is performed in numerical order according to a customer number assigned to each customer;
2. a second sorting arrangement wherein sorting is performed in alphabetical order according to customer names;

3. a third sorting arrangement wherein sorting is performed in chronological order according to due dates associated with each customer's insurance; and 4. a fourth sorting arrangement wherein sorting is performed according to the status information and wherein rows having the same status information are sorted in chronological order according to due dates.

Preferably, the portable computer 10 is further programmed so as to recognize and execute commands from the insurance agent via the manual input unit 16 (Step 3.2) directing the computer processor 14 to limit the first list according to status information pertaining to customers' insurance policies, the status information being indicative of whether the insurance policies are in a current period, a lapsed period, or in a grace period within the lapsed period. When this command is executed, the computer processor 14 eliminates from the first list any customer information which does not satisfy the imposed limits on status.

The portable computer is further programmed so as to recognize and execute commands from the insurance agent (Step 3.2) via the manual input unit 16 directing the computer processor 14 to limit the first list according to visit preference information indicative of the best times (e.g. dates, days of the week, weeks of the month, and the like) to visit the customers. When this command is executed, the computer processor 14 eliminates from the first list any customer information which does not satisfy the imposed limits on visit preference.

Preferably, the forgoing sorting and view limiting step (3.2) is carried out by tapping the electronic pen 16A on a "View" box which is presented on the display screen 12. The portable computer 10 is preferably programmed so that such tapping of the pen 16A on the "view" box causes a "view options" window to open on the display screen 12. The "view options" window preferably includes scrollable lists of sorting arrangements and view limitations, any one of which arrangements and limitations may be selected by double tapping the electronic pen 16A on the desired view option.

After selection of the desired view options, the portable computer rearranges the first list in accordance therewith. The insurance agent then may scroll the first list to review information pertaining to a particular customer and to determine whether any of the listed customers are to be visited anytime in the near future. In addition to scrolling, the portable computer 10 may be programmed to provide alternative ways of accessing customer information using a customer name or customer number (but preferably not by policy number) as will be described hereinafter. (Step 3.3)

The second list is a route list containing only customer information pertaining to customers which are to be visited, as selected from the first list by the insurance agent. Preferably, each row of the route list includes only a customer number and a customer name.

The portable computer 10 is programmed to recognize (Step 3.4) and execute (Step 3.4.1) commands from the insurance agent via the manual input unit 16 directing the computer processor 14 to remove customer information from the route list, or directing the computer processor 14 to move selected customer information from the first list to the route list.

Preferably, the two lists are presented on the display screen 12 in a scrollable manner using a typical "Windows" arrangement. This allows the insurance agent to scroll through the entire list of information in each list, even though only a portion of each list is displayed at one time.

The first list preferably includes columns of different types of information about each customer, each row of the list corresponding to a particular customer. Preferably, the columns of information include the information described above as being included in the first list.

When the insurance agent determines from reviewing the first list that a particular customer should appear on the route list, the insurance agent merely taps the display screen 12 where the customer information appears. This causes the portable computer 10 to highlight the information associated with that customer. A second tap of the information while the information is highlighted causes the portable computer 10 to move this customer information to the route list. Preferably, only the number associated with that customer and the customer name are displayed in the route list.

As an additional method of moving the information from the first list to the second list, while the two lists are displayed, the portable computer 10 preferably generates an icon on the display screen 12 indicative of movement from the first list to the second list. This icon, for example, constitutes an arrow pointing from the first list to the second list. By programming the portable computer 10 to respond to tapping of the arrow icon while a particular customer's information is highlighted, so that the particular customer's information is moved to the second list, an alternative way of producing such movement is advantageously provided.

In like manner, the portable computer 10 can be programmed so that tapping of an arrow-shaped icon pointing away from the route list causes removal of a highlighted piece of customer information from the route list. According to a preferred embodiment of the present invention, the arrow pointing toward the route list automatically appears on the display screen 12 when a row in the first list is highlighted. However, when a row in the second list is highlighted (for example, by tapping the electronic pen 16A against the particular row on the display screen 12), the arrow pointing toward the route list is automatically converted into an arrow pointing toward the first list.

Additionally, the portable computer 10 can be programmed to also display double-arrow-shaped icons pointing from the first list to the route list. Tapping of the double-arrow-shaped icons with the electronic pen 16A causes all of the displayed elements in the first list to be transferred to the route list. Another double-arrow-shaped icon can be provided pointing in the opposite direction to effect transfer of all the information currently displayed in the route list to the first list.

Yet another way of achieving movement of information to and from the route list, is by making the portable computer 10 responsive to "drag and drop" movements of the electronic pen 16A across the display screen 12. In particular, "drag and drop" movement involves placing the tip of the electronic pen 16A against the display screen 12 in the field of the screen 12 which contains a particular piece of customer information. The pen is then dragged across the screen to the route list if the information is to be moved to the route list, or alternatively, is dragged out of the route list if removal of this information is desired. By repeating any of the foregoing procedures, numerous customers may be added to and/or removed from the route list.

Preferably, the portable computer 10 is programmed to retain multiple route lists, each of which corresponds, for example, to a particular date. In addition, the portable computer 10 is programmed to generate "day of the week" icons in the Route List Planning mode. Preferably, there is a "day of the week" icon for each day of the week and one of these icons is highlighted when the route list for that particular date is currently being displayed.

If a particular piece of customer information is to be added to a route list other than the one being displayed, the insurance agent merely "drags" the piece of information from the first list using the electronic pen 16A and "drops" the piece of information by lifting the pen from the display screen 12 at the location of the icon representing the desired date.

For example, if the route list for Monday is being displayed and the insurance agent wishes to add a piece of information to Wednesday's route list, the insurance agent merely "drags" the piece of information from the first list to the "Wednesday" icon using the pen 16A. Once the pen 16A reaches the "Wednesday" icon, it is lifted from the display screen 12 and the portable computer 10 responds by placing the particular piece of information in Wednesday's route list.

Additionally, the portable computer 10 may be programmed to display a calendar icon and a route list date field on the display screen 12. The route list date field constantly indicates the date (including month, day and year) to which a presently displayed route list pertains. The portable computer 10 is responsive to tapping of the calendar icon with the electronic pen 16A. When such tapping of the calendar icon occurs (Step 3.5), the portable computer 10 responds by switching (Step 3.5.1) to the Calendar mode (Step 13.0) displaying, among other things, "forward" and "back" arrows for selecting a month and year, as well as an entire monthly calendar for the selected year and month. By appropriately tapping the "forward" and "back" arrows to select a month, and then tapping on a desired date on the displayed monthly calendar, a desired date can be selected and the portable computer 10 displays the route list corresponding to the selected date upon returning to the Route List Planning mode. Additions to and deletions from this route list are then made in the same manner as indicated above.

It is noted that manipulation of the route lists is an agent transaction. Accordingly, the route lists are preferably stored in the second group of storage tables of the storage element 17 in respective ones of the aforementioned subsidiary tables.

The portable computer 10 is also preferably programmed so as to generate a "Reset" box on the display screen 12 during the Route List Planning mode. Further programming of the portable computer 10 makes it responsive to tapping of the electronic pen 16A against the "Reset" box (Step 3.6), so that such tapping causes the portable computer 10 to eliminate (Step 3.6.1) any previously selected view options (e.g., sort order and view limits) and to display all of the customer information according to a default sorting order (e.g., by customer number).

Preferably, a Customer Group Info icon is provided on the display screen 12 in the Route List Planning mode. Tapping of the electronic pen 16A against the Customer Group Info icon while the selected customer information is highlighted, causes the portable computer 10 to invoke (Step 3.7.1) the Customer Group Maintenance process (Step 50.0) and automatically display supplemental information from the data storage element 17 about the selected customer. The portable computer 10 therefore is programmed to retrieve and display supplemental insurance information from the data storage element 17, which supplemental insurance information is associated with the customer information selected from the first list by the insurance agent.

The portable computer 30 is also programmed to generate a "Cancel" box and an "OK" box on the display screen 12 whenever the portable computer 10 is in the Route List Planning mode. Tapping of the "cancel" box with the electronic pen 16A (Step 3.8) causes the portable computer 10 to disregard the route list which is currently displayed without saving the route list in the data storage element 17 (Step 3.8.1).

Tapping of the "OK" box, by contrast, signifies acceptance of the presently displayed route list (Step 3.9). Accordingly, the computer processor 14 responds to such tapping of the "OK" box by saving the route list in an appropriate subsidiary table in the second group of storage tables of the data storage element 17 (Step 3.9.1).

After acceptance or cancellation of a recently created route list, the portable computer 10 automatically switches to the Menu mode (Step 3.9.2) and displays the main menu on the display screen 12 (Step 2.0).

Daily Route List Mode

Figure 7:
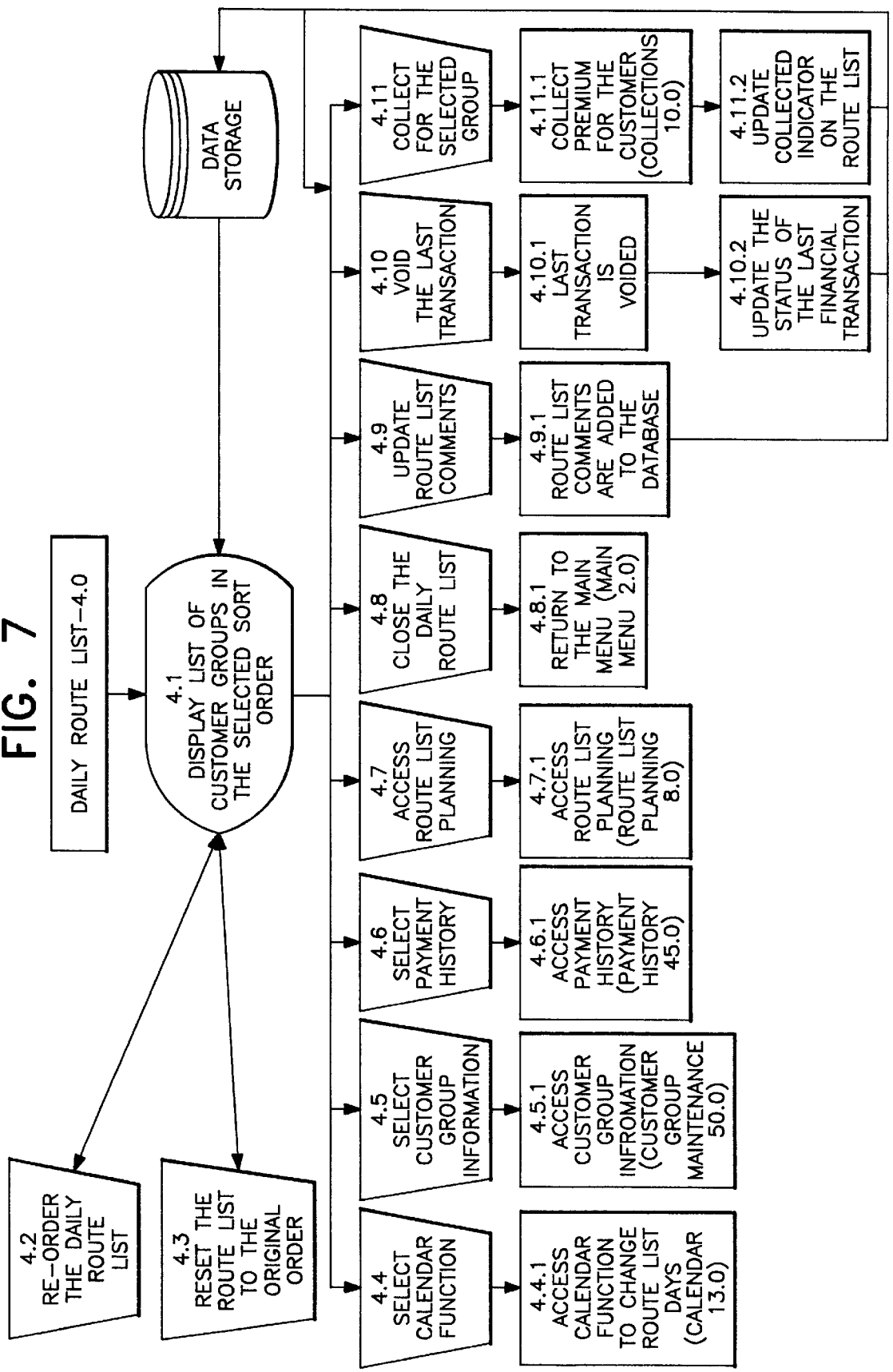
FIG. 7 is a flow diagram illustrating a sequence of events in a Daily Route List mode of the present invention.

Preferably, as illustrated in FIG. 7, each portable computer 10 is programmed to operate in a Daily Route List mode wherein the route list for each day is displayed with a more extensive collection of customer information than the route list in the Route List Planning mode.

If the Daily Route List mode is selected (Step 4.0) from the main menu, the portable computer 10 causes the display screen 12 to visually present the route list without displaying the first list from which the route list was created (Step 4.1). The portable computer 10 is preferably programmed to display the current date's route list by default. FIG. 7A illustrates an exemplary screen display generated in the Daily Route List mode, wherein the term "customer" has been replaced with "family".

The route list in the Daily Route List mode preferably includes multiple rows of customer information, each row corresponding to a particular customer. Preferably, each row includes a customer number; customer name; status information; the amount due; the customer's telephone number; the customer's street address and city of residence; an indication of whether a collection transaction with the customer has been completed; and an indication of whether comments regarding this particular customer have been recorded in the data storage element 17.

Preferably, if more than fourteen rows are present in the route list, only a portion of the route list is displayed and a "scroll bar" is generated by the portable computer 10 to one side of the route list. The insurance agent may then scroll through the list by tapping the various portions of the scroll bar with the electronic pen 16A.

Additionally, the portable computer 10 may be programmed to display a calendar icon and a route list date field on the display screen 12. The route list date field constantly indicates the date (including month, day and year) to which a presently displayed route list pertains. The portable computer 10 is responsive to tapping of the calendar icon with the electronic pen 16A. When such tapping of the calendar icon occurs (Step 4.4), the portable computer 10 responds by switching (Step 4.4.1) to the Calendar mode (Step 13.0) and displaying, among other things, "forward" and "back" arrows for selecting a month and year, as well as an entire monthly calendar for the selected year and month. By appropriately tapping the "forward" and "back" arrows to select a month, and then tapping on a desired date on the displayed monthly calendar, a desired date can be selected and the portable computer 10 displays the route list corresponding to the selected date upon returning to the Daily Route List mode.

The portable computer 10 is also programmed to recognize the insurance agent's selection of customer information from the route list (Step 4.5) via the manual input unit 16. Such selection may be performed, for example, by tapping the electronic pen 16A against the display screen 12 where the selected customer information appears.

Preferably, a Customer Group Info icon is provided on the display screen 12 in the Daily Route List mode. Tapping of the electronic pen 16A against the Customer Group Info icon while the selected customer information is highlighted, causes the portable computer 10 to invoke (Step 4.5.1) the Customer Group Maintenance process (Step 50.0) and automatically display supplemental information from the data storage element 17 about the selected customer. The portable computer 10 therefore is programmed to retrieve and display supplemental insurance information from the data storage element 17, which supplemental insurance information is associated with the customer information selected from the route list by the insurance agent.

Preferably, the portable computer 10 is further programmed to display a route comment box on the display screen 12 immediately below the route list, and to receive commands from the insurance agent to enter route comments for particular customers.

The portable computer 10 is also programmed so as to respond to tapping of a particular customer's information on the route list by not only highlighting the customer's information in the route list, but also by displaying in the route comment box any comments which were previously stored by the insurance agent in connection with that particular customer.

It may become necessary to change the comments in the route comment box or add a comment for a customer. Accordingly, the portable computer 10 is programmed to open a comment box window on the display screen 12 whenever the route comment box is tapped using the electronic pen 16A.

Preferably, the comment box window includes individual character boxes into which the characters which define the comment are written using the electronic pen 16A, the portable computer 10 being programmed to recognize the characters and display the recognized characters in the individual character boxes.

The comment box window further includes a "clear" box which is tapped by the insurance agent using the electronic pen 16A when the currently displayed comment is to be cleared. Upon tapping of the "clear" box using the electronic pen 16A, the portable computer 10 responds by clearing the subject matter contained in each of the character boxes.

Also provided in the comment box window is a "typewriter" icon which, as previously indicated, can be tapped with the electronic pen 16A to provide an alternative way of entering the characters which make up the comment. In particular, a simulated typewriter is displayed on the display screen 12 by the portable computer 10. The individually displayed keys are then tapped using the electronic pen 16A to enter each character.

In addition, a "cancel" box is displayed in the comment box window and the portable computer 10 is programmed to respond to tapping of the "cancel" box by closing the comment box window without storing the contents of the comment box window in the data storage element 17.

For situations when the comment contained in the comment box window is correct and should be entered into the route comment box, an "OK" box is provided by the portable computer 10 in the comment box window. The "OK" box is tapped by the insurance agent using the electronic pen 16A (Step 4.9) whenever the displayed comment is to be entered into the route comment box. The portable computer 10 is preferably programmed to respond to such tapping by storing the displayed comment in a subsidiary table of the second group of tables in the data storage element 17 (Step 4.9.1).

The route comment box may be used advantageously to store comments regarding how the particular customer is to be serviced. An exemplary comment may be "Customer will leave payment at back door".

The portable computer 10 is further programmed to display a collection instruction field including information regarding the method for collecting payment from a particular customer, which information is entered by the agent during Customer Group Maintenance or Customer Group Add processes (Steps 50.0 and 60.0) to be described.

As indicated above, in the Daily Route List mode, whenever a row of customer information is highlighted by an insurance agent by tapping on the row using the electronic pen 16A, any comments or collection instructions associated with that row of customer information are automatically displayed by the portable computer 10 in the route comment box and collection instruction box, respectively.

Preferably, the portable computer 10 is further programmed to display "up" and "down" arrows on the display screen 12 when the portable computer 10 is operating in the Daily Route List mode. The portable computer 10 is further programmed so that tapping of the electronic pen 16A on the "up" or "down" arrows while a row of customer information is highlighted, causes that row of customer information to move up or down, respectively, in the displayed route list. By moving various rows of the route list up and down in this manner, the insurance agent is able to selectively adjust the order of the list (Step 4.2).

The portable computer 10 is further programmed to display a "reset" box when operating in the Daily Route list mode. Tapping of the "reset" box with the electronic pen 16A causes the portable computer 10 to reset the order of the route list to the original order, thus discarding any changes in order made using the "up" and "down" arrows (Step 4.3).

The portable computer 10 is further programmed to display, in the Daily Route List mode, a "Payment History" box, and to respond to tapping of the electronic pen 16A against the "Payment History" box (Step 4.6) by automatically switching (Step 4.6.1) to the Payment History mode (Step 45.0). Preferably, the portable computer 10 is programmed so that, if a row of customer information is already highlighted when the "Payment History" box is tapped by the pen 16A, the portable computer 10 automatically displays information concerning the particular customer's payment history on the display screen 12.

The portable computer 10 is further programmed to display, in the Daily Route List mode, a "Route List Planning" box, and to respond to tapping of the electronic pen 16A against the "Route List Planning" box (Step 4.7) by automatically switching (Step 4.7.1) to the Route List Planning mode (Step 3.0).

The portable computer 10 is likewise programmed to display, in the Daily Route List mode, a "Cancel" box (other than that which appears in the route comment window), and to respond to tapping of the electronic pen 16A against the "Cancel" box (Step 4.8) by automatically switching (Step 4.8.1) to the main menu (Step 2.0).

Occasionally, insurance agents will discover errors upon completing a payment transaction and it will become necessary to void the most recent payment transaction. The portable computer 10 is therefore programmed to display, in the Daily Route List mode, a "Void Last Txn" box, and to respond to tapping of the electronic pen 16A against the "Void Last Txn" box (Step 4.10) by automatically voiding the last payment transaction (Step 4.10.1) and modifying the status information associated with that customer to reflect the voided payment transaction (Step 4.10.2).

Preferably, the portable computer 10 is further programmed to display, in the Daily Route List mode, a "Collections" box, and to respond to tapping of the electronic pen 16A against the "Collections" box (Step 4.11) by automatically invoking (Step 4.11.1) a collection procedure (Step 20.0). After collection is completed in accordance with the collection procedure (as will be described hereinafter), the information in the route list indicative of whether collection has been completed is updated by the portable computer 10 to reflect the collection (Step 4.11.2).

As an alternative way of entering the collection procedure, the portable computer 10 is preferably programmed to respond to double tapping of the electronic pen 16A against a row of customer information (Step 4.11) by automatically invoking (Step 4.11.1) the collection procedure (Step 20.0).

In addition, the portable computer 10 is programmed to register any voided transactions and any collections in the second group of tables of the data storage element 17.

Customer Group Collections Mode

Figure 8:
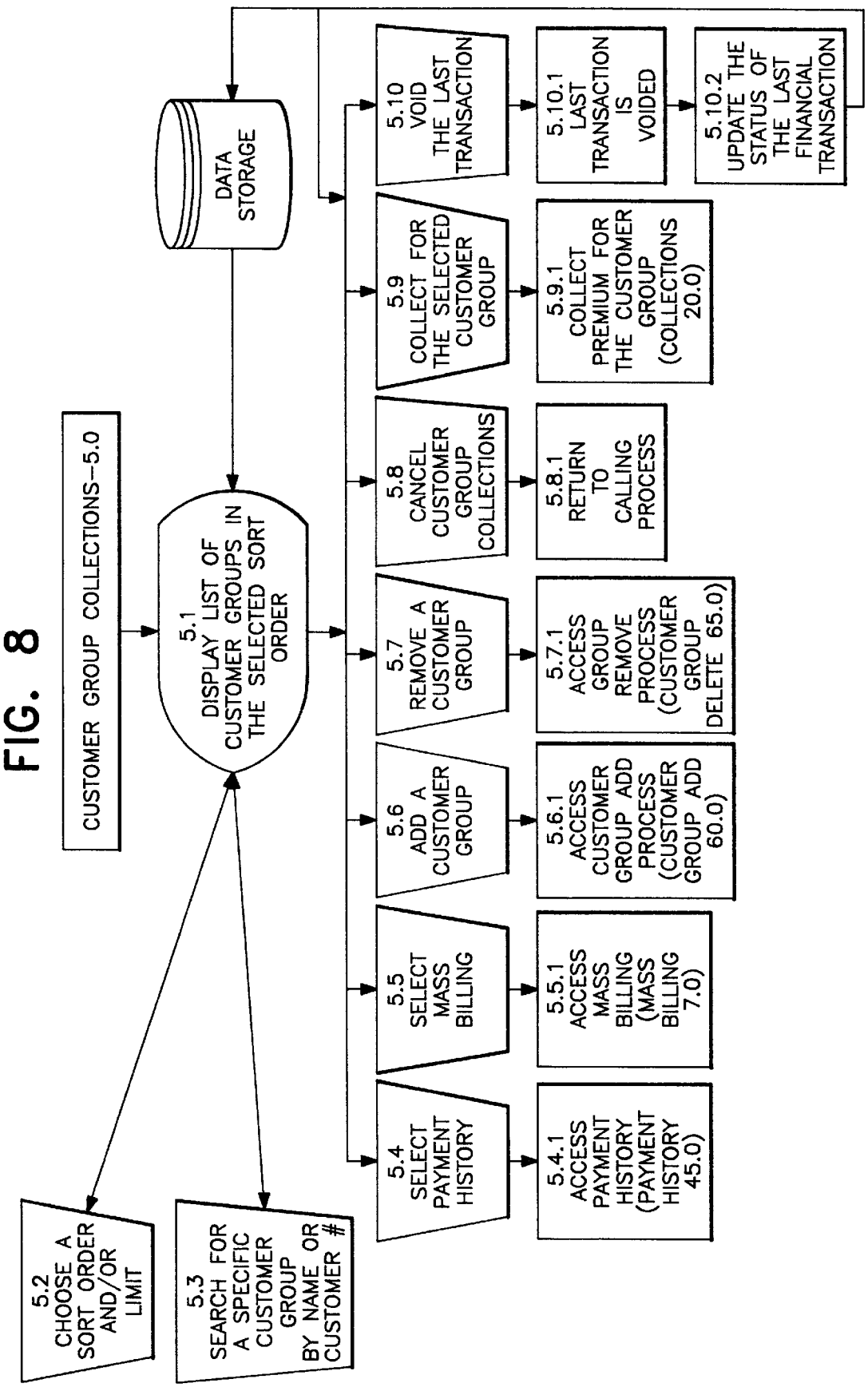
FIG. 8 is a flow diagram illustrating a sequence of events in a Customer Group Collections mode according to the present invention.

Preferably, as illustrated in FIG. 8, each portable computer 10 is programmed to operate in a Customer Group Collections mode. The data storage element 17 therefore includes, among the insurance information stored therein, data indicative of payment amounts due from each customer.

The portable computer 10 is programmed to receive, via the manual input unit 16, a collection query from the insurance agent. The collection query is associated with any one of the insurance customers.

The portable computer 10 is further programmed to respond to the collection query by:

1. retrieving from the data storage means data indicative of a payment amount due from the insurance customer; and
2. displaying the payment amount on the display screen.

Preferably, the portable computer 10 is also programmed to accept payment amount information indicative of an amount paid by an insurance customer to the insurance agent. The payment amount information is provided by the insurance agent via the manual input unit 16.

The portable computer 10 is further programmed to register the payment amount information in the data storage element 17, preferably, as agent transaction information in a subsidiary table in the second group of storage tables of the data storage element 17.

The portable computer 10 is also preferably programmed to prevent the portable computer 10 from accepting payment amount information associated with improper transactions. Although the term "improper transactions" is primarily directed to transactions that are not permitted under insurance laws or regulations, it is understood that some transactions, though permitted by law, may be deemed improper for various reasons, such as company policy. Therefore, the term "improper transactions" is not limited to those transactions which are not permitted by insurance laws and regulations.

If the Customer Group Collection mode is selected (Step 5.0) from the main menu, the portable computer 10 causes the display screen 12 to visually present a Customer List Display. The Customer List Display includes at least a portion of a list containing information about all of the customers assigned to the insurance agent. An exemplary Customer List Display is illustrated in FIG. 8A, wherein the term "Customer" has been replaced by the term "Family".

The Customer List Display preferably includes multiple rows of customer information, each row corresponding to a particular customer. Preferably, each row includes a customer number; customer name; status information (as described above); a payment due date; the amount due from the customer; an indication of any partial payment already received; an indication of a net amount due from the customer (amount due minus the partial payment); an indicator of whether there are any loans associated with the customer's insurance portfolio; an indicator of whether any of the customer's policies have lapsed; an indicator of the number of route lists in which the customer appears; and information regarding visit preference.

By appropriately programming the portable computer 10, the list sorting and limiting procedures described above in connection with the Route List Planning mode are also available in the Customer Group Collections mode (Step 5.2). Likewise, according to a preferred embodiment, the portable computer 10 is also programmed to perform the reset procedure described above, which eliminates the list sorting arrangement and view limitations in the same manner as described in connection with the Route List Planning mode.

The customer list presented in the Customer List Display therefore can be sorted, limited and reset in the same manner as in the Route List Planning mode.

Preferably, if more than sixteen rows are present in the customer list, only a portion of the customer list is displayed in the Customer List Display and a "scroll bar" is generated by the portable computer 10 to one side of the customer list. The insurance agent may then scroll (Step 5.3) through the list by tapping the various portions of the scroll bar with the electronic pen 16A.

The portable computer 10 is also programmed to recognize the insurance agent's selection of customer information from the customer list via the manual input unit 16. Such selection may be performed, for example, by tapping the electronic pen 16A against the display screen 12 where the selected customer information appears. Preferably, the portable computer 10 automatically causes the selected customer information to be highlighted in response to such tapping with the manual input unit 16.

Since the customer list may contain numerous rows of customer information, the portable computer 10 is preferably programmed to provide alternative ways of accessing customer information. One alternative way is to provide a "Search by Customer Name" field, a "Search by Customer Number" field, and a "Search by Policy Number" field in the Customer Information Display. Adjacent to these three fields, the portable computer 10 generates character boxes for use by the insurance agent to input a customer name, a customer number, or a policy number using the electronic pen 16A.

The portable computer 10 is responsive to tapping of the electronic pen 16A on any of the three fields. In particular, when one of the three fields is tapped by the electronic pen 16A, the portable computer 10 utilizes handwriting recognition techniques to identify and display the inputted customer name, customer number, or policy number.

Thereafter, the portable computer 10 searches the customer list for a match and displays customer information matching the inputted customer number, customer name, or policy number.

Yet another way of inputting customer names, customer numbers, or policy numbers is to program the portable computer 10 to display a "typewriter" icon and further programming the portable computer 10 to be responsive to tapping of the "typewriter" icon with the electronic pen 16A. In particular, such tapping of the "typewriter" icon causes the portable computer 10 to display a simulated typewriter keyboard on the display screen 12 that the insurance agent, in turn, utilizes as previously described to input characters into the displayed character boxes. Thereafter, the portable computer 10 searches the customer list for a match between the inputted characters and a customer name, a customer number, or a policy number in the customer list. Once a match is found, the portable computer 10 displays the customer information matching the inputted customer name, customer number, or policy number on the Customer List Display.

The portable computer 10 is further programmed to display, as part of the Customer List Display, a "Payment History" box, and to respond to tapping of the electronic pen 16A against the "Payment History" box (Step 5.4) by automatically switching (Step 5.4.1) to the Payment History mode (Step 45.0). Preferably, the portable computer 10 is programmed so that, if a row of customer information is already highlighted when the "Payment History" box is tapped by the pen 16A, the portable computer 10 automatically displays information concerning the particular customer's payment history on the display screen 12.

The portable computer 10 is likewise programmed to display, as part of the Customer List Display, a "Cancel" box, and to respond to tapping of the electronic pen 16A against the "Cancel" box (Step 5.8) by automatically switching (Step 5.8.1) to the operating mode from which the Customer Group Collections mode was accessed, typically, the main menu (Step 2.0).

The portable computer 10 is also programmed to display, as part of the Customer List Display, a "Mass Billing" box, and to respond to tapping of the electronic pen 16A against the "Mass Billing" box (Step 5.5) by automatically invoking (Step 5.5.1) a mass billing procedure (Step 70.0) wherein all of the policy information corresponding to a particular customer number is reassigned to another customer number.

In order to facilitate the addition of information regarding new customers, the portable computer 10 is also programmed to display, as part of the Customer List Display, an "Add Customer" box, and to respond to tapping of the electronic pen 16A against the "Add Customer" box (Step 5.6) by automatically invoking (Step 5.6.1) a customer adding procedure (Step 60.0) which causes the portable computer 10 to add the new customer information to the customer list and to store information pertaining to such adding of customer information as agent transaction information in a subsidiary table of the second group of storage tables in the data storage element 17.

In order to facilitate removal of customer information (after such information is selected and highlighted using the electronic pen 16A), the portable computer 10 is programmed to display, as part of the Customer List Display, a "Remove Customer" box, and to respond to tapping of the electronic pen 16A against the "Remove Customer" box (Step 5.7) by automatically invoking (Step 5.7.1) a customer removal procedure (Step 65.0) which causes the portable computer 10 to delete the highlighted customer's information from the customer list and to store information pertaining to such deletion of customer information as agent transaction information in a subsidiary table of the second group of storage tables in the data storage element 17.

In view of the aforementioned "Add Customer" and "Remove Customer" operations of the portable computer 10, it is understood that the portable computer 10 is programmed to receive modification information from the insurance agent via the manual input unit 16, the modification information corresponding to desired changes in the insurance information pertaining to a particular one of the insurance customers. It is also understood that the portable computer is further programmed to register the modification information in the data storage element 17 for subsequent transmission of the modification information via the communication interface 20 to the home office 5 as at least part of the agent transaction information.

Preferably, the portable computer 10 is further programmed to display, in the Customer List Display, a "Collections" box, and to respond to tapping of the electronic pen 16A against the "Collections" box (Step 5.9) by automatically invoking (Step 5.9.1) the collection procedure (Step 20.0).

As an alternative way of entering the collection procedure, the portable computer 10 is preferably programmed to respond to double tapping of the electronic pen 16A against a row of customer information (Step 5.9) by automatically invoking (Step 5.9.1) the collection procedure (Step 20.0).

Occasionally, insurance agents will discover errors upon completing a payment transaction and it will become necessary to void the most recent payment transaction. The portable computer 10 is therefore programmed to display, in the Customer Group Collection mode, a "Void Last Txn" box, and to respond to tapping of the electronic pen 16A against the "Void Last Txn" box (Step 5.10) by automatically voiding the last payment transaction (Step 5.10.1) and modifying the status information associated with that customer to reflect the voided transaction (Step 5.10.2).

In addition, the portable computer 10 is programmed to register any voided payment transactions and any collections in the second group of tables of the data storage element 17.

Customer Group Information Mode

Figure 9:
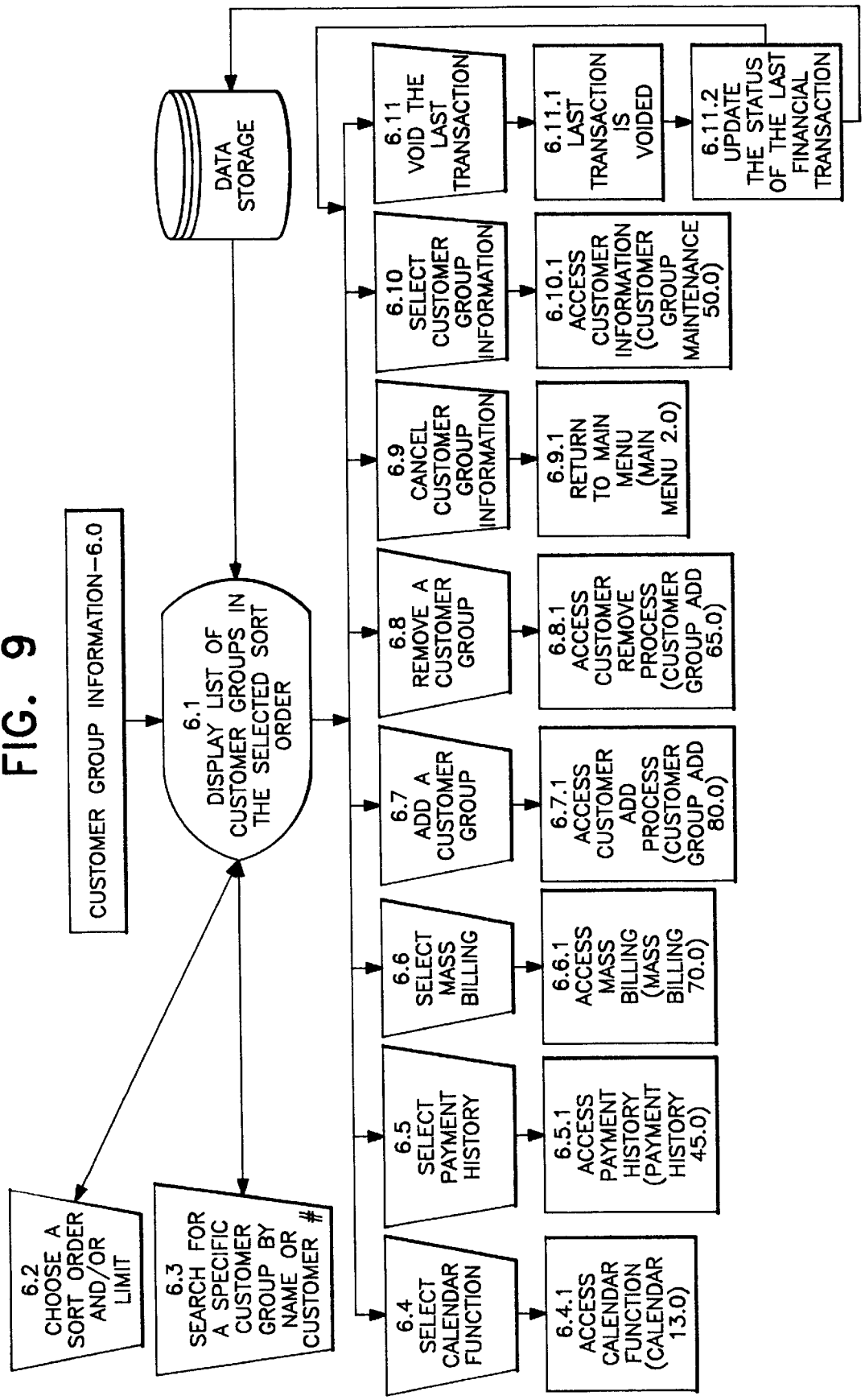
FIG. 9 is a flow diagram illustrating a sequence of events in a Customer Group Information mode according to the present invention.

Preferably, as illustrated in FIG. 9, each portable computer 10 is programmed to operate in a Customer Group Information mode.

If the Customer Group Information mode is selected (Step 6.0) from the main menu, the portable computer 10 causes the display screen 12 to visually present a Customer Information Display. The Customer Information Display includes at least a portion of a list containing information about all of the customers assigned to the insurance agent. An exemplary Customer List Display is illustrated in FIG. 9A, wherein the term "customer" has been replaced with "family".

The Customer Information Display preferably includes multiple rows of customer information, each row corresponding to a particular customer. Preferably, each row includes a customer number; customer name; status information (as described above); a payment due date; the amount due from the customer; an indication of any partial payment already received; an indication of a net amount due from the customer (amount due minus the partial payment); an indicator of whether there are any loans associated with the customer's insurance portfolio; an indicator of whether any of the customer's policies have lapsed; an indicator of the number of route lists in which the customer appears; and information regarding visit preference.

By appropriately programming the portable computer 10, the list sorting and limiting procedures described above in connection with the Route List Planning mode are also available in the Customer Group Collections mode (Step 6.2).

The customer list presented in the Customer Information Display therefore can be sorted, limited and reset in the same manner as in the Route List Planning mode.

Preferably, if more than sixteen rows are present in the customer list, only a portion of the customer list is displayed in the Customer Information Display and a "scroll bar" is generated by the portable computer 10 to one side of the customer list. The insurance agent may then scroll (Step 6.3) through the list by tapping the various portions of the scroll bar with the electronic pen 16A.

The portable computer 10 is also programmed to recognize the insurance agent's selection of customer information from the customer list via the manual input unit 16. Such selection may be performed, for example, by tapping the electronic pen 16A against the display screen 12 where the selected customer information appears. Preferably, the portable computer 10 automatically causes the selected customer information to be highlighted in response to such tapping with the manual input unit 16.

Since the customer list may contain numerous rows of customer information, the portable computer 10 is preferably programmed to provide alternative ways of accessing customer information. One alternative way is to provide a "Search by Customer Name" field and a "Search by Customer Number" field in the Customer Information Display. Adjacent to these two fields, the portable computer 10 generates character boxes for use by the insurance agent to input either a customer name or a customer number using the electronic pen 16A.

The portable computer 10 is responsive to tapping of the electronic pen 16A on either of the two fields. In particular, when either field is tapped by the electronic pen 16A, the portable computer 10 utilizes handwriting recognition techniques to identify and display the inputted customer name or number.

Thereafter, the portable computer 10 searches the customer list for a match and displays customer information matching the inputted customer number or name.

Yet another way of inputting customer names or numbers is to program the portable computer 10 to display a "typewriter" icon and further programming the portable computer 10 to be responsive to tapping of the "typewriter" icon with the electronic pen 16A. In particular, such tapping of the "typewriter" icon causes the portable computer 10 to display a simulated typewriter keyboard on the display screen 12 that the insurance agent, in turn, utilizes as previously described to input characters into the displayed character boxes. Thereafter, the portable computer 10 searches the customer list for a match between the inputted characters and a customer name or number in the customer list. Once a match is found, the portable computer 10 displays the customer information matching the inputted customer number or name on the Customer Information Display.

Additionally, the portable computer 10 may be programmed to display a calendar icon in the Customer Information Display. The portable computer 10 is responsive to tapping of the calendar icon with the electronic pen 16A. When such tapping of the calendar icon occurs (Step 6.4), the portable computer 10 responds by switching (Step 6.4.1) to the Calendar mode (Step 13.0).

The portable computer 10 is further programmed to display, as part of the Customer Information Display, a "Payment History" box, and to respond to tapping of the electronic pen 16A against the "Payment History" box (Step 6.5) by automatically switching (Step 6.5.1) to the Payment History mode (Step 45.0). Preferably, the portable computer 10 is programmed so that, if a row of customer information is already highlighted when the "Payment History" box is tapped by the pen 16A, the portable computer 10 automatically displays information concerning the particular customer's payment history on the display screen 12.

The portable computer 10 is also programmed to display, as part of the Customer Information Display, a "Mass Billing" box, and to respond to tapping of the electronic pen 16A against the "Mass Billing" box (Step 6.6) by automatically invoking (Step 6.6.1) a mass billing procedure (Step 70.0) wherein all of the policy information corresponding to a particular customer number is reassigned to another customer number.

In order to facilitate the addition of information regarding new customers, the portable computer 10 is also programmed to display, as part of the Customer Information Display, an "Add Customer" box, and to respond to tapping of the electronic pen 16A against the "Add Customer" box (Step 6.7) by automatically invoking (Step 6.7.1) a customer adding procedure (Step 60.0) which causes the portable computer 10 to add the new customer information to the customer list and to store information pertaining to such adding of customer information as agent transaction information in a subsidiary table of the second group of storage tables in the data storage element 17.

In order to facilitate removal of customer information (after such information is selected and highlighted using the electronic pen 16A), the portable computer 10 is programmed to display, as part of the Customer Information Display, a "Remove Customer" box, and to respond to tapping of the electronic pen 16A against the "Remove Customer" box (Step 6.8) by automatically invoking (Step 6.8.1) a customer removal procedure (Step 65.0) which causes the portable computer 10 to delete the highlighted customer's information from the customer list and to store information pertaining to such deletion of customer information as agent transaction information in a subsidiary table of the second group of storage tables in the data storage element 17.

The portable computer 10 is likewise programmed to display, as part of the Customer Information Display, a "Cancel" box, and to respond to tapping of the electronic pen 16A against the "Cancel" box (Step 6.9) by automatically switching (Step 6.9.1) to the main menu (Step 2.0).

Preferably, a Customer Group Info icon is provided on the display screen 12 in the Customer Information Display. Tapping of the electronic pen 16A against the Customer Group Info icon (Step 6.10) while the selected customer information is highlighted, causes the portable computer 10 to invoke (Step 6.10.1) the Customer Group Maintenance process (Step 50.0) and automatically display supplemental information from the data storage element 17 about the selected customer. The portable computer 10 therefore is programmed to retrieve and display supplemental insurance information from the data storage element 17, which supplemental insurance information is associated with the customer information selected from the customer list by the insurance agent.

As an alternative way of entering the Customer Group Maintenance process, the portable computer 10 is preferably programmed to respond to double tapping of the electronic pen 16A against a row of customer information (6.10) by automatically invoking (Step 6.10.1) the Customer Group Maintenance process (Step 50.0).

Miscellaneous Payments Mode

Figure 10:
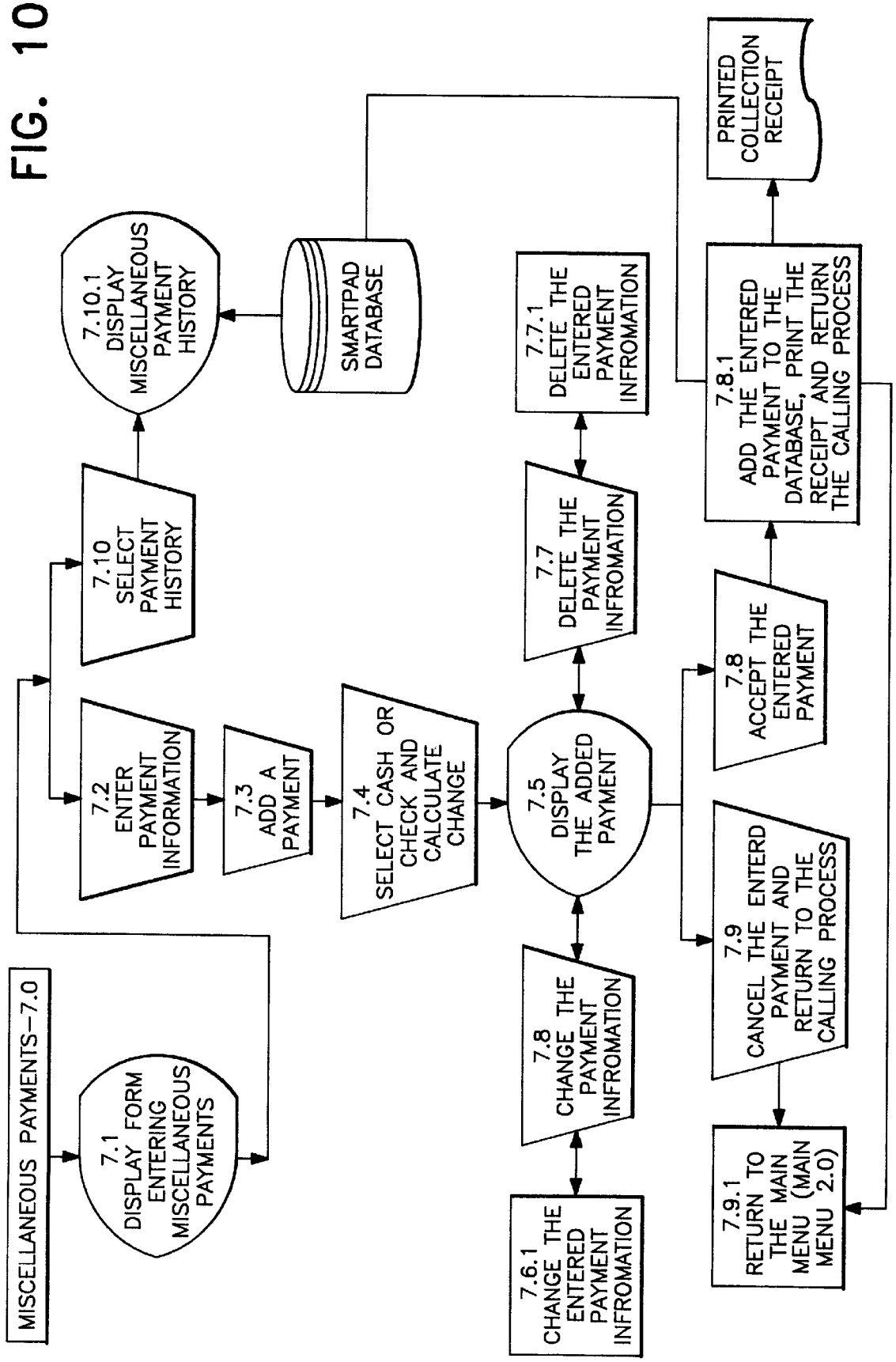
FIG. 10 is a flow diagram illustrating a sequence of events in a Miscellaneous Payments mode according to the present invention.

Preferably, as illustrated in FIG. 10, each portable computer 10 is programmed to operate in a Miscellaneous Payments mode.

If the Miscellaneous Payments mode is selected (Step 7.0) from the main menu, the portable computer 10 causes the display screen 12 to visually present a Miscellaneous Payments Display.

The portable computer 10 is further programmed to display, as part of the Miscellaneous Payment Display, a "Payment History" box, and to respond to tapping of the electronic pen 16A against the "Payment History" box (Step 7.10) by automatically displaying (7.10.1) payment history information contained in the data storage element 17 of the portable computer 10.

The Miscellaneous Payments Display includes a "payment type" field for indicating whether the payment to be registered is a list bill payment (i.e., a payment in connection with a consolidated statement of premiums due on all policies for any payroll deduction or cases wherein multiple insureds are covered by one group policy), a duplicate policy payment (i.e., fee charged for generating a duplicate of a customer's policy); or any other type.

The Miscellaneous Payments Display also includes a "list bill ID" field; a "company code" field; a "policy number" field; an "insured's name" field; a "comments" field; a "payment amount" field; and a "method of payment" (cash or check) field.

The portable computer 10 is preferably programmed to facilitate entry of information into the foregoing fields using any known technique. Preferably, the portable computer 10 is programmed to achieve such entry using "Windows" techniques, such as drop boxes which open as lists of entries, the portable computer 10 being further programmed to detect selection of entries in the list, which entries are selected by tapping the electronic pen 16A on the entries.

Alternatively, various fields of the Miscellaneous Payment Display may be filled using the previously mentioned handwriting recognition techniques and/or the previously mentioned simulated typewriter display and associated activation using the electronic pen 16A.

The portable computer 10 also displays an "Add" box as part of the Miscellaneous Payment Display. After predetermined ones of the fields have been filled with the necessary information (Step 7.2), the insurance agent verifies that all entries are correct and then activates the "Add" box (Step 7.3) by tapping it with the electronic pen 16A.

The portable computer 10 then prompts the insurance agent to select between payment methods (cash or check), preferably using the electronic pen 16A, and also prompts the insurance agent to enter a payment amount. The term "prompt" as used in this disclosure is understood to encompass not only expressly displayed instructions or requests on the display screen 12, but also suggestive displays indicating that certain options are available, for example, by displaying boxes which the insurance agent can tap using the electronic pen 16A to achieve a desired operation of, or input into, the portable computer 10.

After the payment method and payment amount are entered (Step 7.4), the portable computer 10 displays both (Step 7.5) and prompts the insurance agent to tap an "OK" box on the display screen 12 with the electronic pen if the insurance agent accepts the displayed payment method and payment amount. The portable computer 10 is preferably programmed to respond to this entry by calculating change due to the customer and displaying the change amount along with information indicative of the tendered amount.

In case the insurance agent wishes to change the miscellaneous payment information or delete the payment information, the portable computer 10 is programmed to accept a command from the insurance agent to do so (Steps 7.6 or 7.7).

If the command from the insurance agent is to delete the payment information, the information is merely deleted (Step 7.7.1) by the portable computer 10. If, however, the command is to change the payment information (Step 7.6), the portable computer 10 does not process the payment information and again displays the Miscellaneous Payment Display to facilitate changing of the information (Step 7.6.1).

If the command from the insurance agent is to cancel the miscellaneous payment transaction (Step 7.9), the portable computer 10 does not process the entered information, and instead, returns (Step 7.9.1) to the main menu (Step 2.0).

If, however, the payment information is accepted by the insurance agent by appropriately tapping the "OK" box (Step 7.8) with the electronic pen 16A, the miscellaneous payment information is registered as agent transaction information in a designated subsidiary table in the second group of storage tables of the data storage element 17, and a receipt is printed for the payment maker (Step 7.8.1) using the printer 19.

The portable computer 10 is preferably programmed so that, after the receipt is printed and the associated agent transaction information is appropriately registered in the data storage element 17, the portable computer 10 switches to the main menu mode (Step 2.0).

Allowances and Purchases Mode

Figure 11:
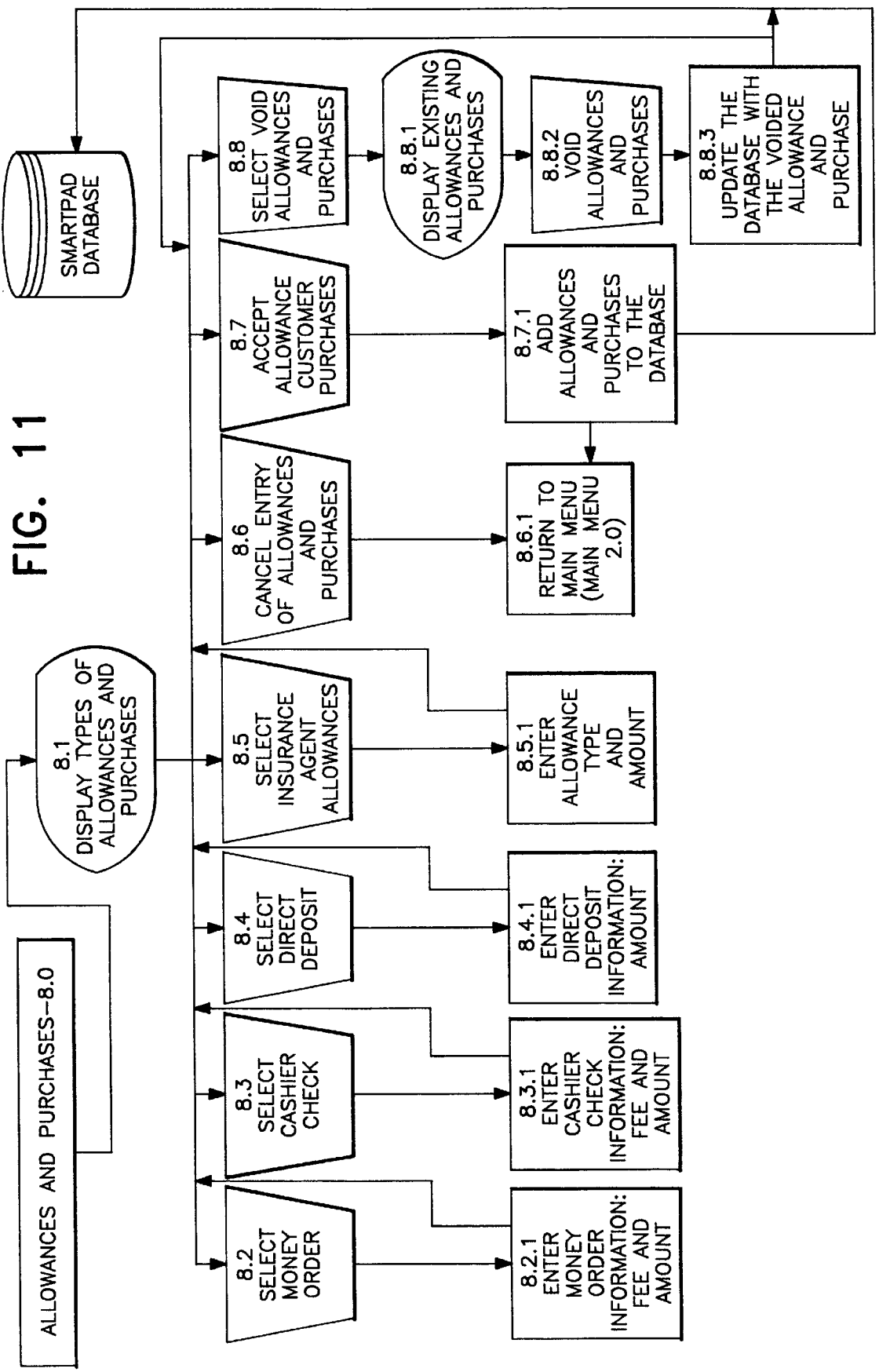
FIG. 11 is a flow diagram illustrating a sequence of events in an Allowances and Purchases mode according to the present invention.

As indicated in FIG. 11, the portable computer 10 is preferably programmed to process information indicative of allowances (i.e., expenses the insurance agent may take credit for in his/her collection amount, including amounts for postage, photographs, etc.) and information indicative of purchases (i.e., the actual amounts of money orders, cashiers checks purchased, and direct deposits).

In particular, the portable computer 10 is programmed so that, when the Allowances and Purchases mode is selected (Step 8.0) by the insurance agent from the main menu, the portable computer 10 provides an Allowances and Purchases Display on the display screen 12 (Step 8.1). The Allowances and Purchases Display prompts the insurance agent to select, using the electronic pen 16A, a transaction type from a group of predetermined transactions.

Preferably, the portable computer 10 is programmed so that the predetermined types of transactions include processing of money order purchase information; processing of cashier check purchase information; processing of direct deposit information; processing of allowance information; cancelling allowance or purchase information before acceptance; accepting entered allowance or purchase information; and voiding allowances and purchases which were previously accepted.

If the insurance agent selects processing of money order purchase information (Step 8.2), the portable computer 10 prompts the insurance agent to enter the money order purchase information and the insurance agent responds by making the necessary entries (Step 8.2.1).

If the insurance agent selects processing of cashier check purchase information (Step 8.3), the portable computer 10 prompts the insurance agent to enter the cashier check purchase information and the insurance agent responds by making the necessary entries (Step 8.3.1).

If the insurance agent selects processing of direct deposit information (Step 8.4), the portable computer 10 prompts the insurance agent to enter the direct deposit information and the insurance agent responds by making the necessary entries (Step 8.4.1).

If the insurance agent selects processing of allowance information (Step 8.5), the portable computer 10 prompts the insurance agent to enter the allowance information and the insurance agent responds by making the necessary entries (Step 8.5.1).

If after entry of any of the foregoing allowance or purchase information, the insurance agent determines that the entry should not be processed, the insurance agent selects (Step 8.6) a "Cancel" box from the Allowances and Purchases Display and the portable computer 10 responds by not processing the entered information and returning (Step 8.6.1) to the main menu mode (Step 2.0).

On the other hand, if after entry of any of the foregoing allowance or purchase information, the insurance agent determines that the entry is proper and should be processed, the insurance agent accepts the transaction by selecting (Step 8.7) an "OK" box from the Allowances and Purchases Display. The portable computer 10 is programmed to respond to this selection of the "OK" box by registering the entered information as an agent transaction in a designated subsidiary table in the second group of storage tables of the data storage element 17 (Step 8.7.1). The portable computer 10 is preferably further programmed to return thereafter to the main menu mode (Step 2.0).

If after any of the foregoing allowance or purchase information has been accepted, the insurance agent determines that the entry should not have been processed, the insurance agent selects (Step 8.8) a "Void Allowance" box from the Allowances and Purchases Display. The portable computer 10 is preferably programmed to respond to this selection by displaying a list of all the existing allowance and purchase transactions registered in the second group of storage tables of the data storage element 17 (Step 8.8.1). The portable computer 10 is also programmed to detect a selection by the insurance agent (Step 8.8.2), of one of the displayed allowance and purchase transactions, and is further programmed to register voiding information indicating that the transaction is to be voided, as agent transaction information in the second group of storage tables of the data storage element 17 (Step 8.8.3).

Unassigned Policies Mode

Figure 12:
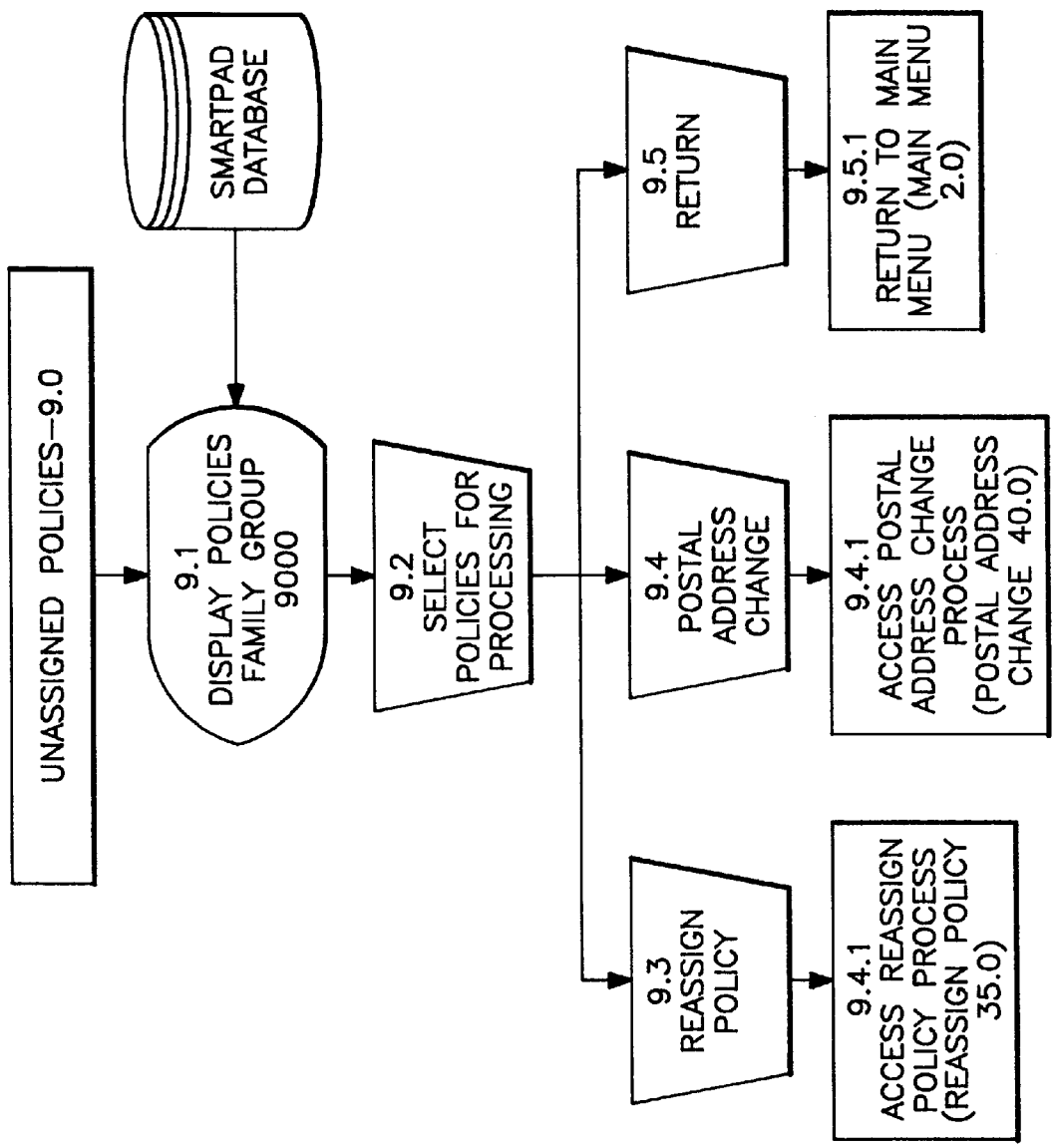
FIG. 12 is a flow diagram illustrating a sequence of events in an Unassigned Policies mode according to the present invention.

As indicated in FIG. 12, the portable computer 10 is preferably programmed to facilitate assignment of insurance policy information to a particular Customer in the customer list. Preferably, information from the home office 5 regarding insurance policies which have yet to be assigned to a particular customer in the list, are stored in a subsidiary table of the first group of storage tables in the data storage element 17.

This information is initially assigned to a predetermined default or fictitious customer in the customer list, which default or fictitious customer is associated, for example, with the customer number 9000.

The portable computer 10 is programmed to detect selection (Step 9.0) of the Unassigned Policies mode from the main menu (Step 2.0) using the electronic pen 16A. Upon detecting such a selection, the portable computer 10 automatically retrieves the information regarding insurance policies which have yet to be assigned from the associated subsidiary table in the first group of storage tables. This information is then displayed by the portable computer 10 in the display screen 12 as part of a Policy Detail Display (Step 9.1).

The insurance agent then selects information pertaining to a particular policy from the Policy Detail Display by tapping the displayed information using the electronic pen 16A (Step 9.2). In response, the portable computer 10 preferably causes the information to be highlighted on the Policy Detail Display.

If the insurance agent wishes to re-assign the highlighted policy to a particular customer from the fictitious customer, the insurance agent taps the electronic pen 16A against a "Reassign Policies" box on the Policy Detail Display. The portable computer 10 is programmed to respond to such tapping of the "Reassign Policies" by invoking (Step 9.3.1) a Reassign Policy procedure (35.0).

If, on the other hand, the insurance agent wishes to change a postal address associated with the highlighted policy, the insurance agent taps (Step 9.4) the electronic pen 16A against a predetermined field in the Policy Detail Display. The portable computer 10 is programmed to respond to such tapping of the predetermined field by invoking (Step 9.4.1) a Postal Address Change process (40.0).

Alternatively, if the insurance agent merely wishes to return to the main menu, the insurance agent taps (Step 9.5) the electronic pen 16A against another predetermined field in the Policy Detail Display, preferably, an "OK" box. The portable computer 10 is programmed to respond to such tapping by switching (Step 9.5.1) to the main menu (Step 2.0).

Close-out Mode

Figure 13:
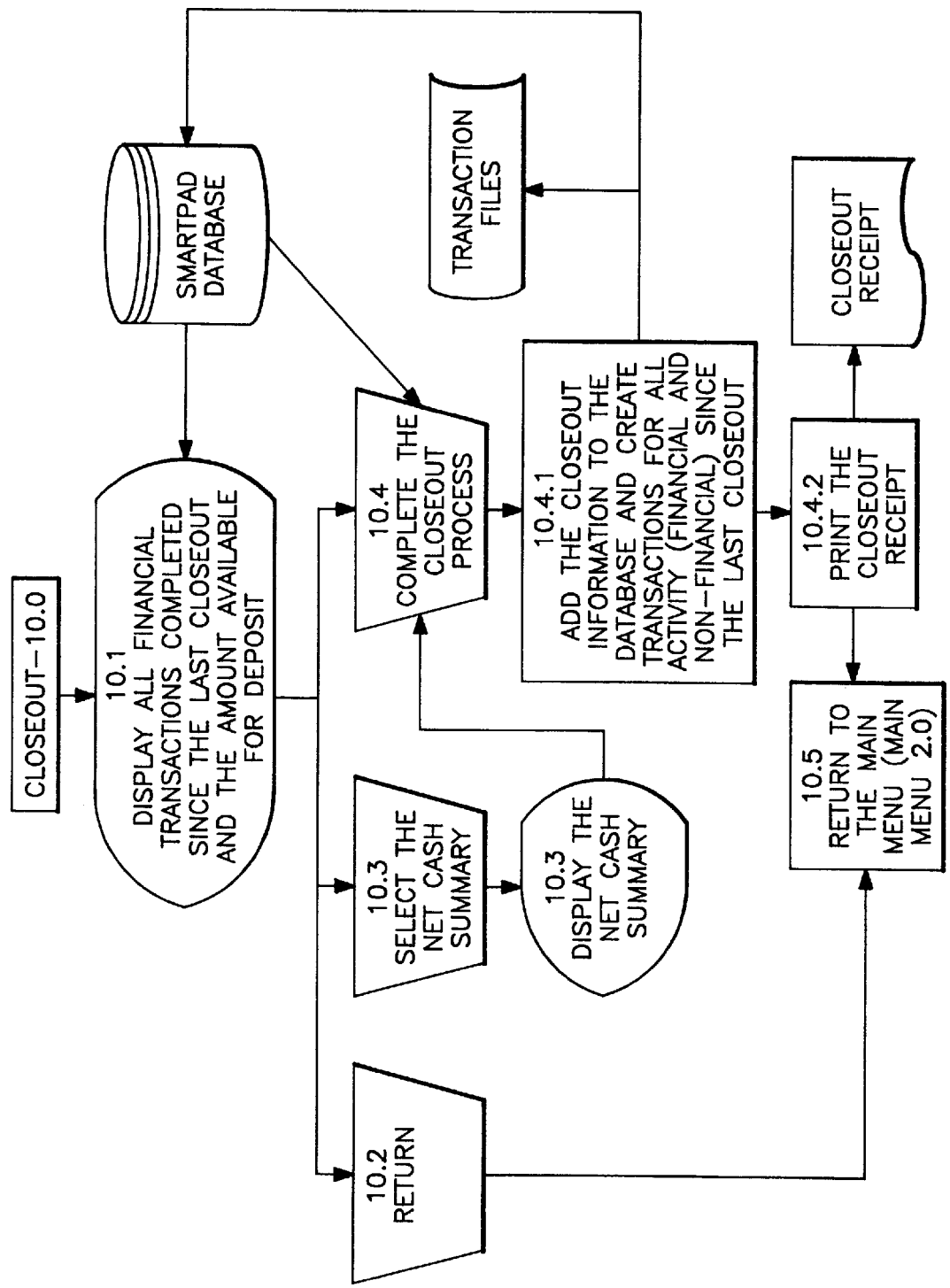
FIG. 13 is a flow diagram illustrating a sequence of events in a Close-out mode according to the present invention.

As indicated in FIG. 13, the portable computer 10 is programmed to receive, via the manual input unit 16, a close-out command from the insurance agent. The portable computer 10 is further programmed to calculate a total representing the total amount of payments collected during a period of time preceding the close-out command and is also programmed to present the insurance agent with a deposit summary including the total amount, which deposit summary is printed via the printer 19.

When the Close-out mode is selected (Step 10.0) from the main menu (Step 2.0), the portable computer 10 responds by displaying (Step 10.1) a record of all financial transactions completed since the last time a close-out procedure was performed. In particular, this record is derived from the agent transaction information registered in the second group of storage tables of the data storage element 17.

Thereafter, the portable computer 10 prompts the insurance agent, via the display screen 12, to select one of three different operations, namely, a return to the main menu operation, a Net Cash Summary display operation, or a complete close-out process operation.

If the insurance agent selects the Return operation (Step 10.2), the portable computer 10 responds by merely switching to the main menu (Step 2.0).

If the insurance agent selects the Net Cash Summary (Step 10.3), the portable computer 10 responds by calculating the amount of cash which the insurance agent received based on the agent transaction information stored in the second group of storage tables of the data storage element 17 and by displaying this amount to the insurance agent (Step 10.3.1). Thereafter, the insurance agent may wish to complete the close-out process.

If the "complete close-out" process is selected (Step 10.4) by the insurance agent, the portable computer 10 responds (Step 10.4.1) by calculating various financial totals derived from the agent transaction information contained in the second group of storage tables of the data storage element 17 and registering the results of these calculations as agent transaction information in the data storage element 17. The portable computer also places all of the agent transaction information into transaction files in proper format for transmission via the communication interface 20 to the home office 5, and prints a close-out receipt (Step 10.4.2). The portable computer 10 then switches (Step 10.5) to the main menu mode (Step 2.0).

Preferably, the close-out procedure is preformed on a daily basis and the transaction files derived therefrom are transmitted to the home office 5 on a nightly basis, as will be described hereinafter.

Close-out History Mode

Figure 14:
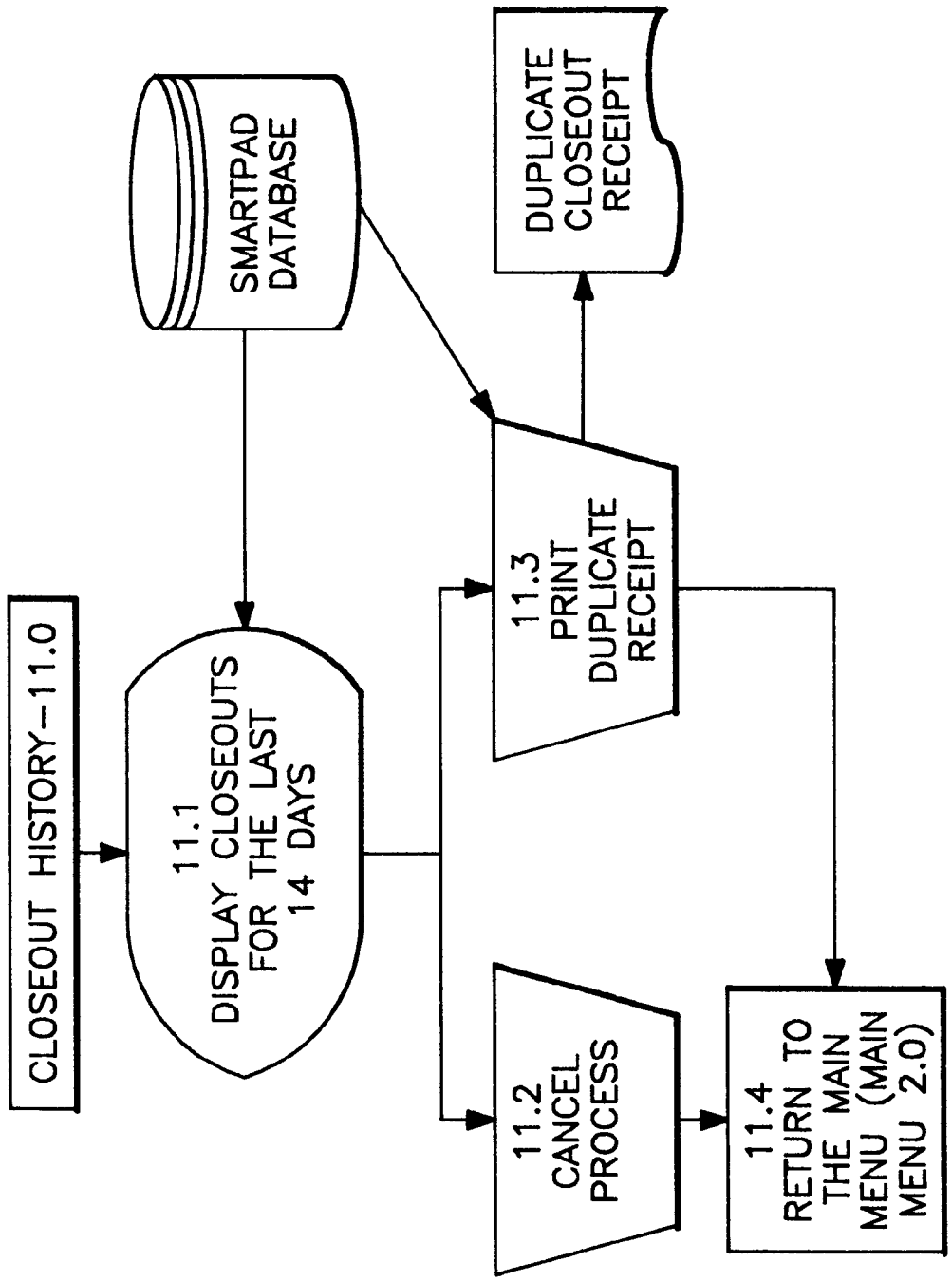
FIG. 14 is a flow diagram illustrating a sequence of events in a Close-out History mode according to the present invention.

As illustrated in FIG. 14, the portable computer 10 is further programmed to operate in a Close-out History mode and to maintain a record of all close-outs in the second group of storage tables of the data storage element 17 for at least 14 days after the close-outs are registered.

When the Close-out History mode is selected (Step 11.0) from the main menu (Step 2.0), the portable computer 10 generates on the display screen 12 a Close-out History Display of information pertaining to any close-outs which occurred within the most recent 14 days. The Close-out History Display also preferably includes a "Cancel" box and a "Print Duplicate Receipt" box.

If the insurance agent taps (Step 11.2) on the "Cancel" box with the electronic pen 16A, the portable computer 10 responds by switching (Step 11.4) to the Main Menu mode (2.0).

On the other hand, if the insurance agent taps on information in the Close-out History Display pertaining to a particular close-out transaction, the portable computer 10 responds by highlighting the information. While the information remains highlighted, if the insurance agent taps (Step 11.3) the electronic pen 16A against "Print Duplicate Receipt" box, the portable computer 10 responds by printing via the printer 19 a duplicate close-out receipt for the highlighted close-out transaction. Thereafter, the portable computer 10 switches (Step 11.4) to the Main Menu mode (2.0).

Rate Book Mode

Figure 15:
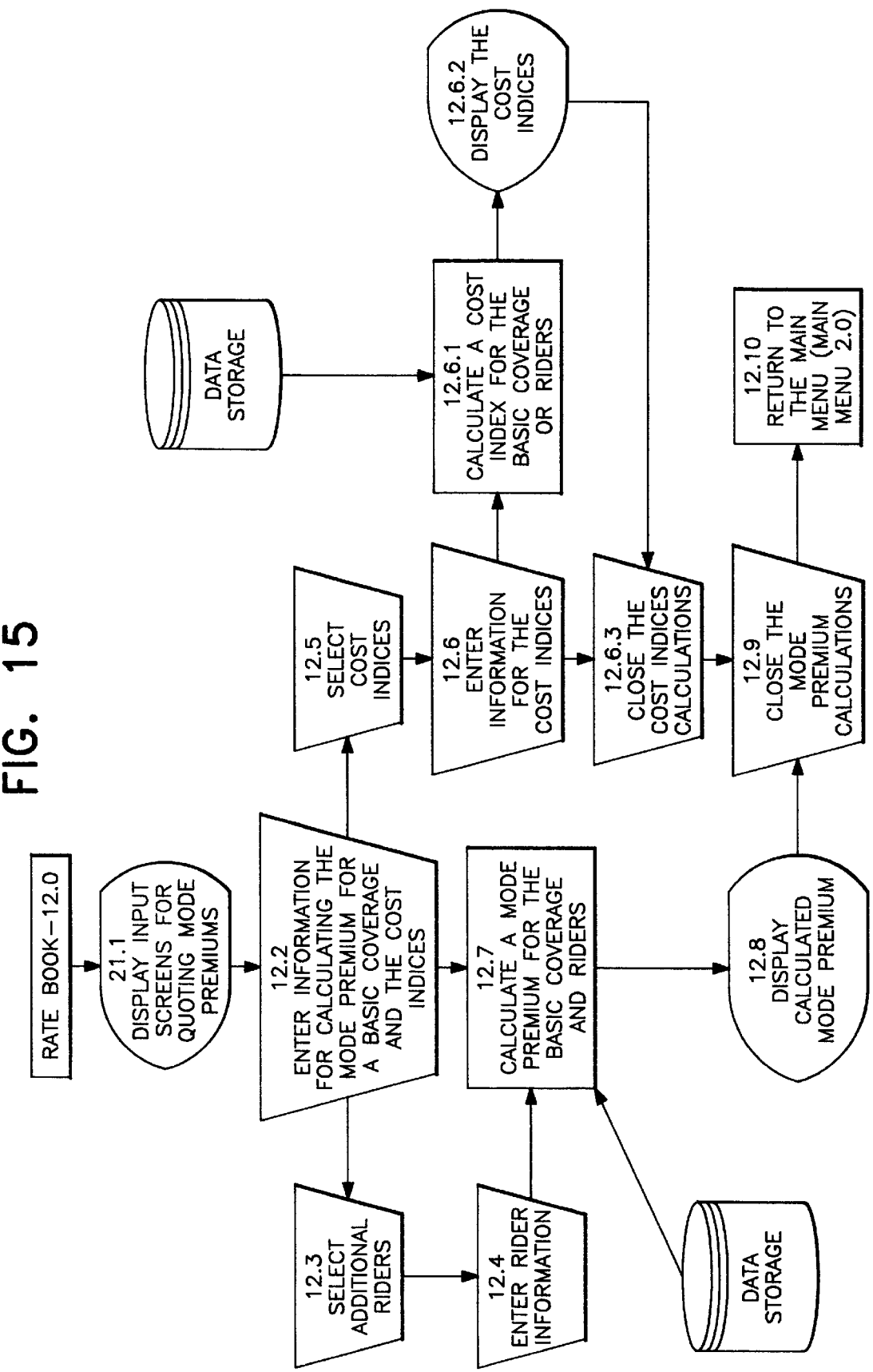
FIG. 15 is a flow diagram illustrating a sequence of events in a Ratebook mode according to the present invention.

With reference to FIG. 15, the first group of storage tables of the data storage element 17 includes ratebook information from the home office 5.

The portable computer 10 is programmed to receive ratebook inquiries from the insurance agent via the manual input unit 16, the ratebook inquiries corresponding to requests for pricing information associated with insurance policies available from the home office 5.

The portable computer 10 is further programmed to respond to the ratebook inquiries with an indication of the pricing information, the pricing information being based on the ratebook information in the first group of storage tables of the data storage element 17.

Initially, when the Ratebook Mode is selected (Step 12.0) by the insurance agent from the main menu (Step 2.0), the portable computer responds by generating a Ratebook Display (Step 12.1) on the display screen 12 prompting the insurance agent to input certain pieces of information critical to the determination of mode premiums for insurance coverage and cost indices.

After the insurance agent enters the requested information using the electronic pen 16A (Step 12.2) and, if desired, also enters information regarding additional riders (Step 12.4), the portable computer 10 responds by calculating (Step 12.7) a mode premium for the basic coverage and any riders. In particular, the mode premium is calculated using ratebook information provided by the home office in the first group of storage tables of the data storage element 17. The results of the premium calculation are then displayed (Step 12.8) on the display screen 12.

Alternatively, after the insurance agent enters the information critical to the determination of mode premiums for insurance coverage, the portable computer 10 is programmed to become responsive to entry of information (Steps 12.5 and 12.6) necessary for calculating cost indices, which information may be entered via the electronic pen 16A.

If information regarding cost indices is desired, such information can be provided (Step 12.6) to the portable computer 10 by the insurance agent using the electronic pen 16A and the portable computer 10 can prompt the insurance agent to enter the information. In response to this information, the portable computer 10 calculates the cost index for the basic coverage or riders (Step 12.6.1) and displays the results (12.6.2).

Next, the portable computer 10 closes (Step 12.6.3) the display of cost indices and thereafter closes (Step 12.9) the display of mode premium calculations. The portable computer 10 then switches (Step 12.10) to the Main Menu mode (Step 2.0).

Calendar Mode

As illustrated in FIG. 16, the portable computer 10 is programmed to operate in a Calendar mode. When the Calendar mode is selected (Step 13.0) from the main menu (Step 2.0), the portable computer 10 responds by displaying (Step 13.1) a Calendar Display including a calendar field consisting of the present month's calendar with the current date highlighted; "forward" and "back" arrows for switching the calendar field to a next or previous month, respectively; a schedule field where various appointments are listed in respective rows; a "Today" box; an "Add" box; a "Delete" box; and an "OK" box. An exemplary Calendar Display is illustrated in FIG. 16A.

The portable computer 10 is responsive to tapping of the electronic pen 16A on any date in the calendar field (Step 13.2). Such tapping of a particular date causes the portable computer 10 to display the schedule associated with the particular date in the schedule field.

Preferably, the portable computer 10 responds to tapping of the "Today" box by switching the calendar and schedule fields back to the present date.

The insurance agent then may tap on rows of appointments using the electronic pen 16A to highlight the rows for subsequent deletion (Step 13.6) by tapping on the "Delete" box, or for subsequent changing (Step 13.5) by tapping on the "Change" box and entering changes. Additional appointments may be entered after tapping on the "Add" box (Step 13.4).

If the insurance agent is satisfied with the schedule in the schedule field, the "OK" box is tapped using the electronic pen 16A and the portable computer responds by registering the new schedule in a corresponding subsidiary table of the second group of storage tables. The portable computer 10 then switches back to the mode from which the Calendar mode was accessed, or preferably, to the main menu (Step 2.0).

Home Office Connection Mode

Figure 17:
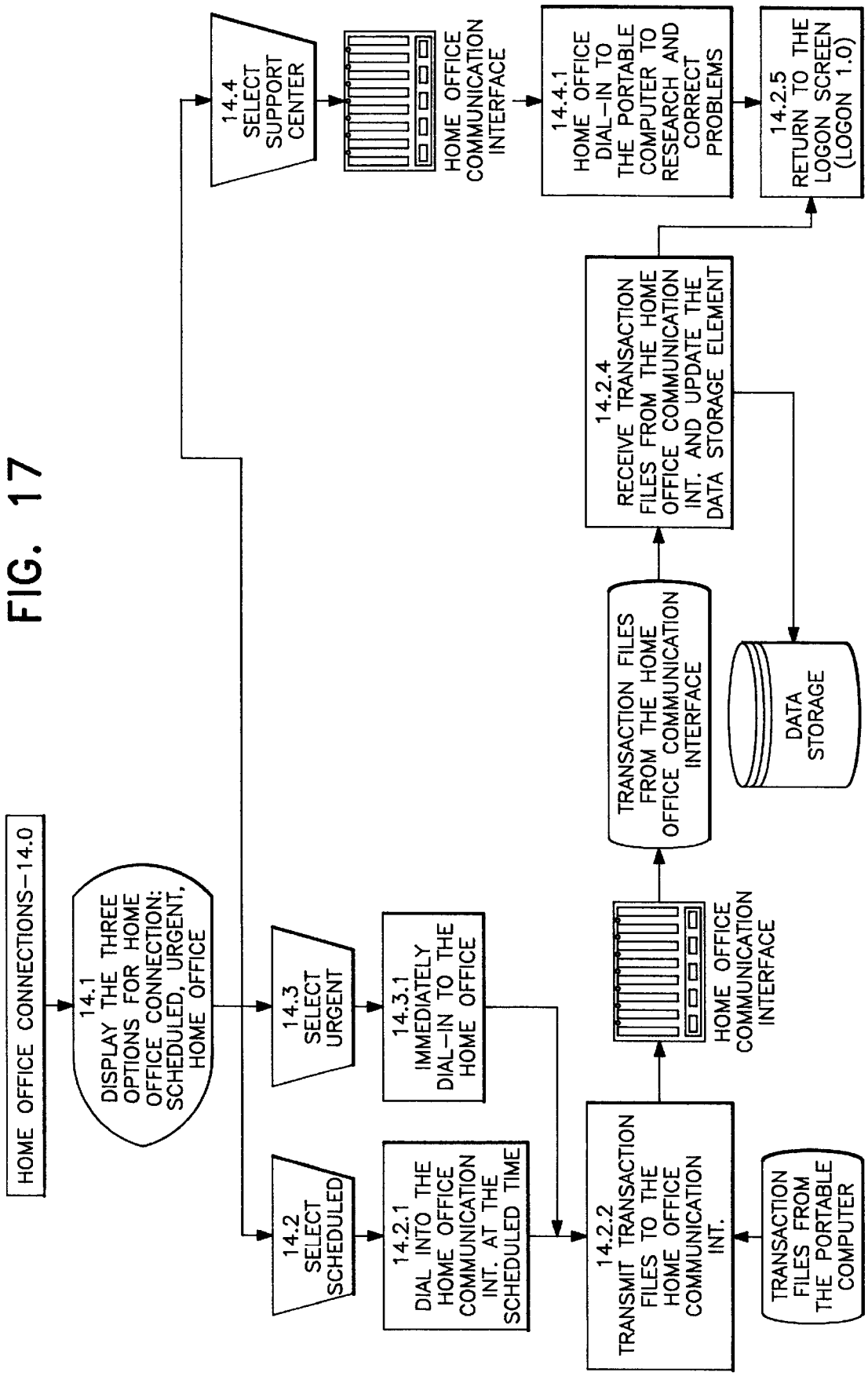
FIG. 17 is a flow diagram illustrating a sequence of events in a Home Office Connections mode according to the present invention.

With reference to FIG. 17, the portable computer 10 is preferably programmed to operate in a Home Office Connection mode. Preferably, the Home Office Connection mode is invoked (Step 14.0) on a nightly basis after the above-mentioned close-out procedure has been performed.

Initially, the portable computer 10 generates a Home Office Connection Display on the display screen 12. The Home Office Connection Display prompts the insurance agent to select between three different types of possible home office connections. The three types of connections are scheduled, urgent or home office support center.

Typically, the insurance agent will select (Step 14.2) the scheduled type of connection. When the scheduled type of connection is selected, the portable computer dials (Step 14.2.1) the home office 5 via the communication interface 20 at a scheduled time overnight. Upon establishing a connection with the home office 5, the portable computer 10 transmits (Step 14.2.2) to the home office computer array 50 a collection of transaction files containing preferably all of the agent transaction information registered in the data storage element 17 during the time period between home office connections (preferably one day).

The home office computer array 50 then generates and transmits (Step 14.2.4) transaction files to the portable computer 10, which transaction files contain the insurance information. The portable computer 10 then stores, or updates, the first group of storage tables in the data storage element 17 using this updated insurance information from the home office 5. The portable computer 10 then switches to the Log On mode and displays the associated screen.

If, however, the insurance agent selects (Step 14.3) the urgent type of home office connection, the portable computer 10 immediately dials up (Step 14.3.1) the home office computer array 50 without waiting for the aforementioned scheduled time. The rest of the home office connection proceeds in the same way as when the home connection is made in the scheduled manner.

If there is a problem, the Support Center type of home office connection is selected (Step 14.4) by the insurance agent and the home office 5 dials up the portable computer 10 (Step 14.4.1) to research and correct the problem. After the home office connection is complete, the portable computer switches (Step 14.2.5) to the Log On mode and displays the associated screen.

Security Maintenance Mode

Figure 18:
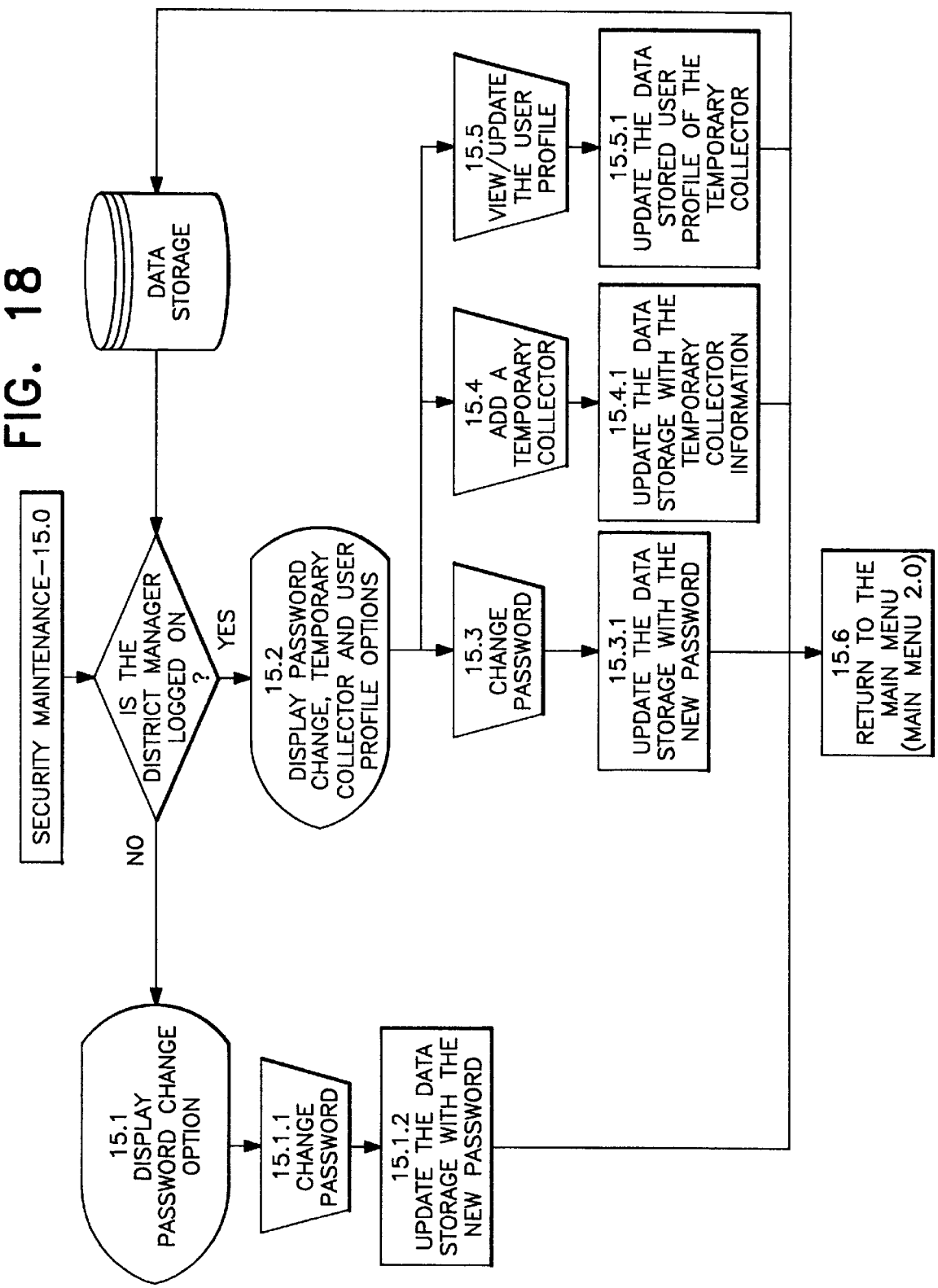
FIG. 18 is a flow diagram illustrating a sequence of events in a Security Maintenance mode according to the present invention.

As illustrated in FIG. 18, the portable computer 18 is further programmed to operate in a Security Maintenance mode which facilitates changing of an insurance agent's password, permits a supervisor (e.g., district manager) to change the password and to assign the portable computer 10 to a temporary insurance agent (or collector) and facilitates viewing and updating of user profiles by the district manager.

Log Off Mode

Figure 19:
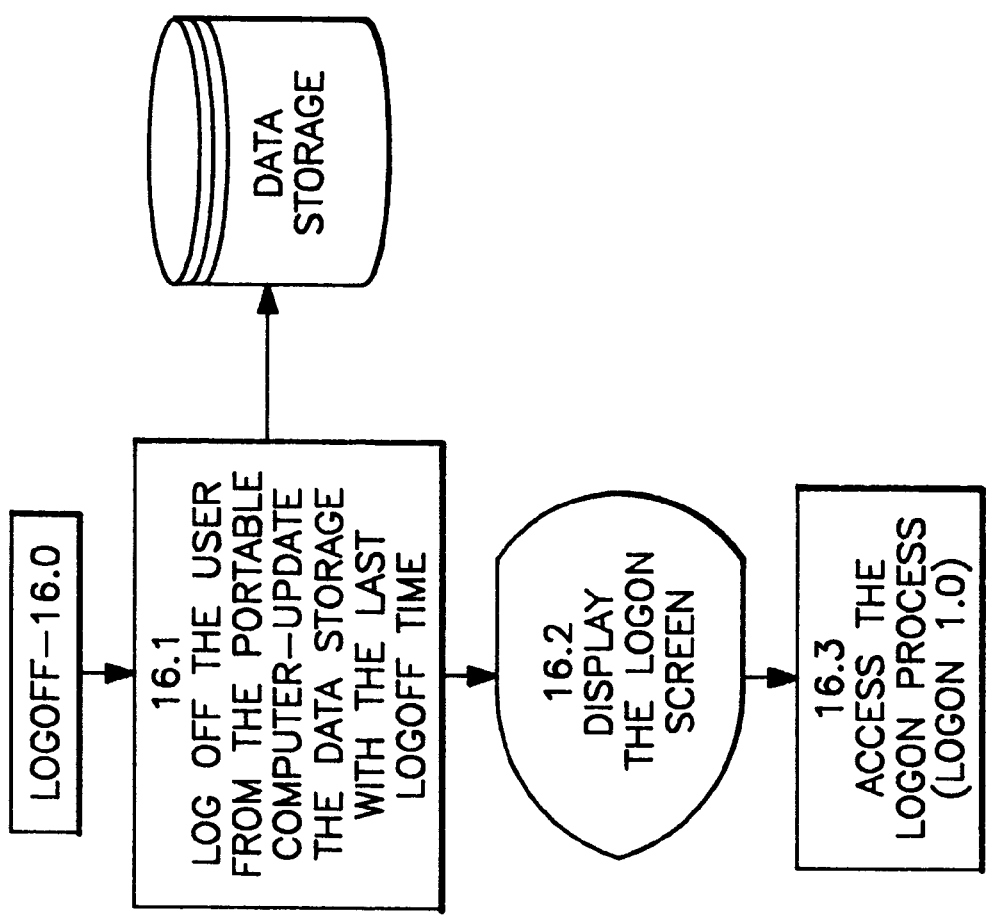
FIG. 19 is a flow diagram illustrating a sequence of events in a Log-off mode according to the present invention.

As illustrated in FIG. 19, when the Log Off mode is selected (Step 16.0), the portable computer logs the insurance agent out of the portable computer 10 and registers a log-off time in the second group of tables of the data storage element 17 (Step 16.1) The portable computer 10 then displays (Step 16.2) the Log On display and switches (Step 16.3) to the Log On mode.

Collections Procedure

Figure 20:
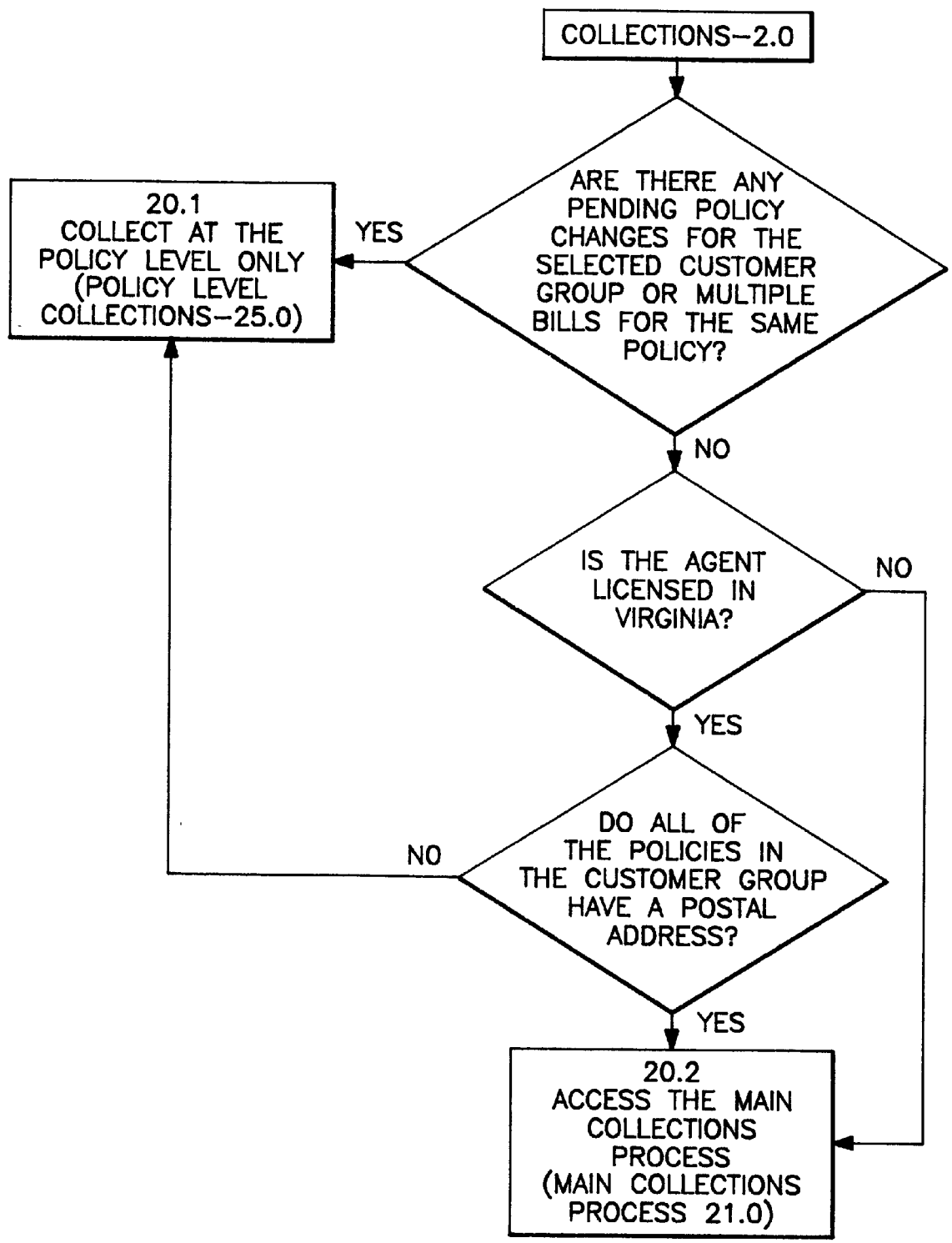
FIG. 20 is a flow diagram illustrating a sequence of events in a Collections process according to the present invention.

As illustrated in FIG. 20, the portable computer 10 is preferably programmed so that the aforementioned collection procedure (20.0) complies with various insurance regulations and statutes.

The portable computer 10 is programmed so that when the collection procedure (Step 20.0) is commenced, the portable computer 10 first determines whether there are any pending policy changes for the selected customer group or multiple bills for the same policy. If there are pending policy changes or multiple bills for the same policy, collection will be made at the policy level and the portable computer 10 therefore automatically invokes (Step 20.1) the Policy Level Collection procedure (Step 25.0).

If there are no pending policy changes and there are no multiple bills for the same policy, the portable computer 10 then determines whether the insurance agent is licensed in Virginia.

If the insurance agent is licensed in Virginia, then the portable computer determines whether all of the policies pertaining to the customer group being processed have a postal address according to the insurance information in the first group of tables of the data storage element 17, and if not, then the portable computer 10 invokes (Step 20.1) the Policy Level Collection procedure (Step 25.0). If, by contrast, all of the policies in the customer group do have a postal address and the insurance agent is licensed in Virginia, then the portable computer invokes (Step 20.2) a Main Collections Process (Step 21.0).

If the insurance agent is not licensed in Virginia, then the portable computer 10 invokes (Step 20.2) a Main Collections Process (Step 21.0).

Main Collections Process

Figure 21:
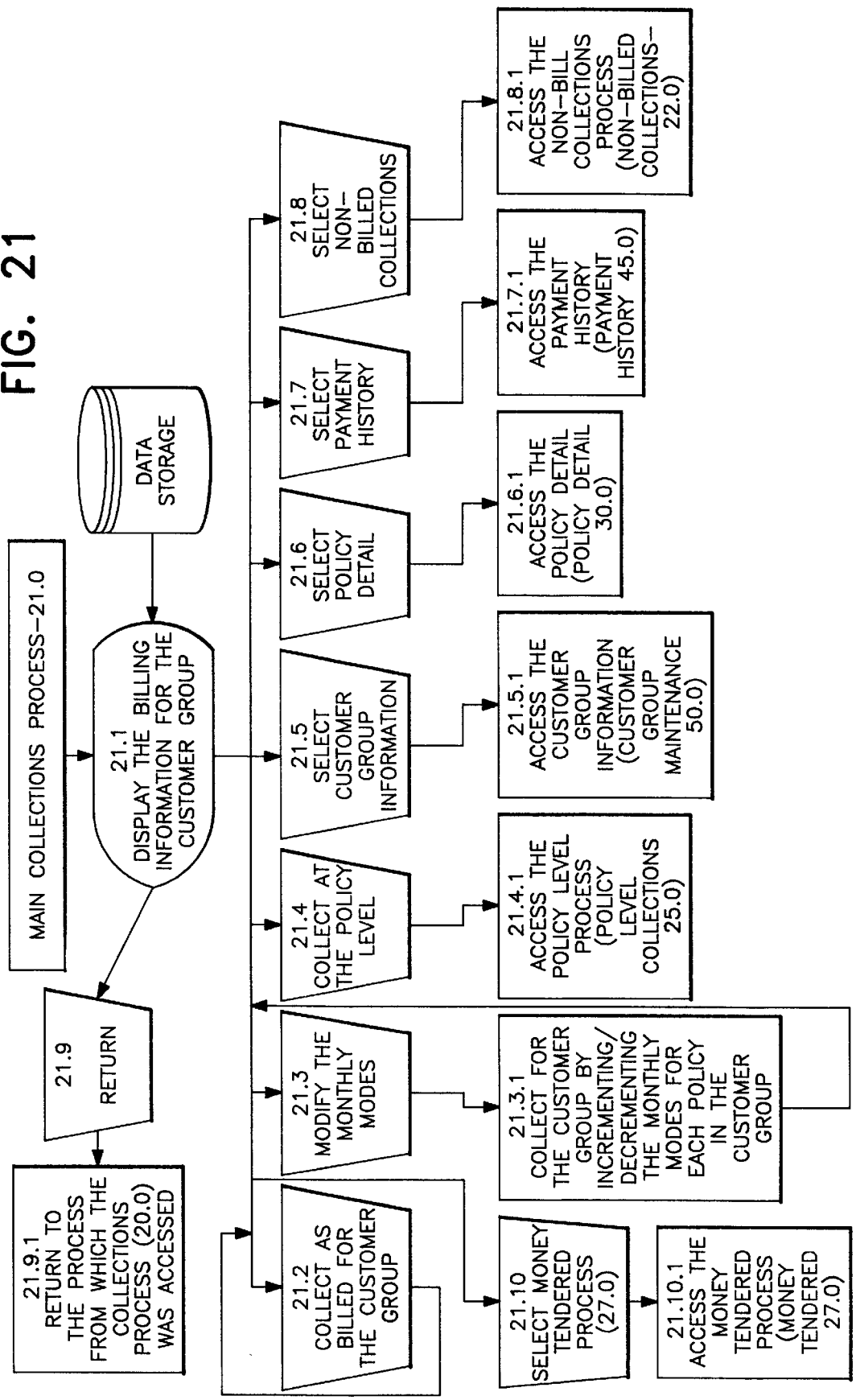
FIG. 21 is a flow diagram illustrating a sequence of events in a Main Collections process according to the present invention.

With reference to FIG. 21, the portable computer 10 is programmed to perform the aforementioned main collections process (Step 21.0). According to the main collections process, the portable computer 10 first displays billing information for the relevant Customer Group and prompts the insurance agent to select one of a plurality of different options. An exemplary display of billing information is illustrated in FIG. 21A, wherein the term "customer" has been replaced by the term "family". Thus, in FIG. 21, "FG" represents "family group", as opposed to "customer group".

According to a first option, the insurance agent may elect (Step 21.9), via the manual input unit 16, to return to a mode or process from which the Collections Process (Step 20.0) was accessed. The portable computer 10 is also programmed to respond to such an election, by switching to or invoking the particular mode or process (Step 21.9.1).

According to a second option, the insurance agent may elect (Step 21.2), via the manual input unit 16, to collect a payment or payments from a customer as billed. Preferably, the agent then taps (Step 21.10) on a "Money Tendered" box on the display screen 12 using the electronic pen 16A. The portable computer 10 is programmed to respond to such tapping by invoking (Step 21.10.1) a Money Tendered Process (Step 27.0) using the "payment as billed" information selected by the insurance agent.

According to a third option, the insurance agent may elect (Step 21.3) via the manual input unit 16 to modify the monthly modes for a particular customer. The portable computer 10 is preferably programmed to determine whether the agent is licensed in Florida, and if the agent is licensed in Florida and the modified monthly mode is greater than two, then the portable computer 10 prompts the agent to invoke a Policy Level Collections process (25.0).

If the agent is not licensed in Florida or the modified monthly mode is not greater than two, the portable computer 10 registers collection of a modified monthly mode by incrementing/decrementing the monthly modes for each policy in the customer group. Preferably, the agent then taps (Step 21.10) on the "Money Tendered" box on the display screen 12 using the electronic pen 16A. The portable computer 10 is programmed to respond to such tapping by invoking (Step 21.10.1) the Money Tendered process (Step 27.0) using the "mode premium" information entered by the insurance agent.

According to a fourth option, the insurance agent may elect (Step 21.4) via the manual input unit 16 to collect payments at the policy level, in which case the portable computer 10 responds by invoking (Step 21.4.1) the Policy Level Collections process (Step 25.0). The agent then taps (Step 21.10.1) on the "Money Tendered" box on the display screen 12 using the electronic pen 16A. The portable computer 10 is programmed to respond to such tapping by invoking (Step 21.10.1) the Money Tendered process (Step 27.0) using the "policy level payment" information entered by the insurance agent.

According to a fifth option, the insurance agent may elect (Step 21.5) via the manual input unit 16 to access customer group information by invoking (Step 21.5.1) the Customer Group Maintenance process (Step 50.0).

According to a sixth option, the insurance agent may elect (Step 21.6) via the manual input unit 16 to access policy detail information by invoking (Step 21.6.1) the Policy Detail process (Step 30.0).

According to a seventh option, the insurance agent may elect (Step 21.7) via the manual input unit 16 to access payment history information by invoking (Step 21.7.1) the Payment History procedure (Step 45.0).

According to an eighth option, the insurance agent may elect (Step 21.8) via the manual input unit 16 to collect non-billed payments by invoking (Step 21.8.1) the non-billed collection process (Step 22.0).

Non-billed Collections

Figure 22:
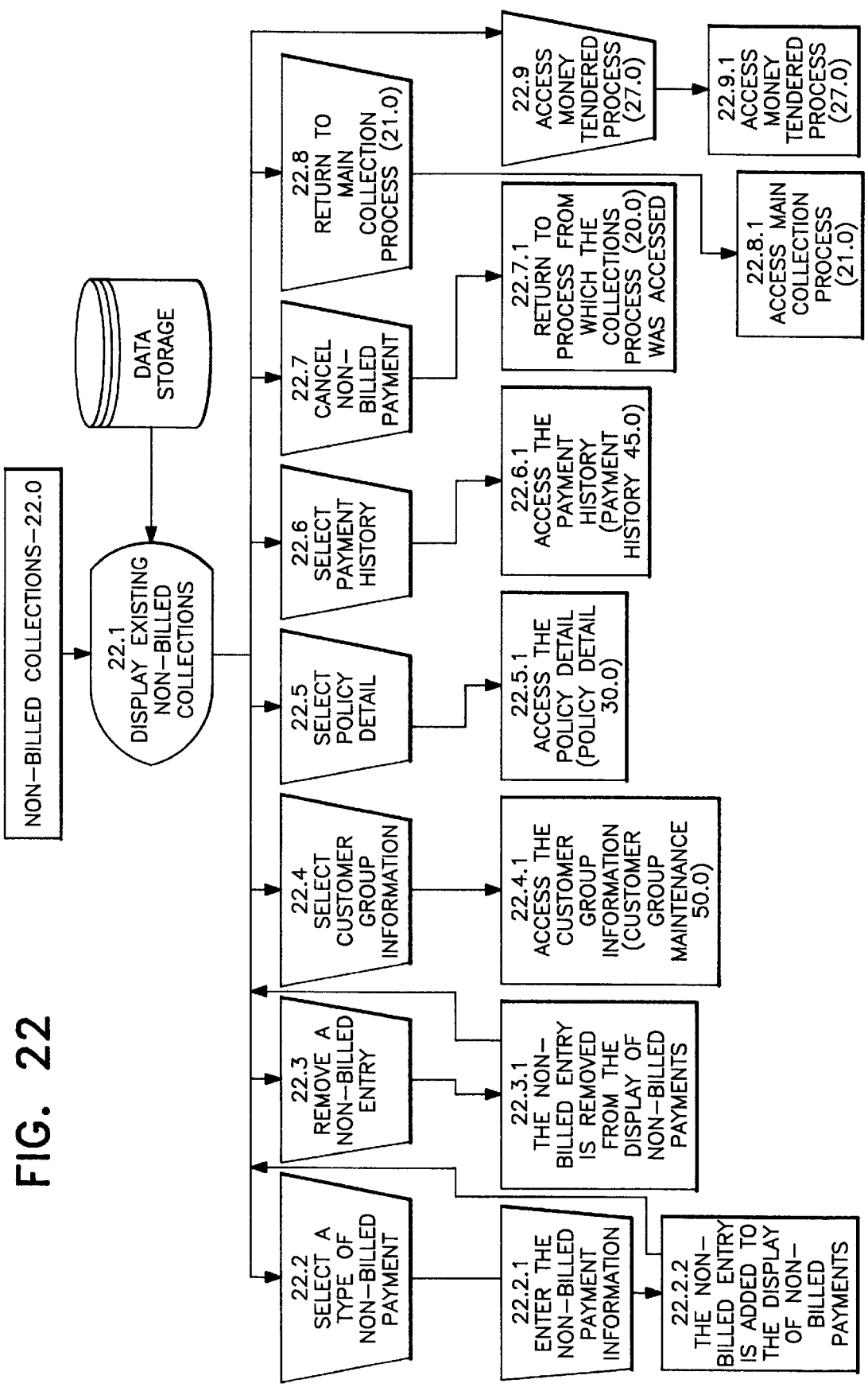
FIG. 22 is a flow diagram illustrating a sequence of events in a Non-billed Collections process according to the present invention.

With reference to FIG. 22, the portable computer 10 is programmed to perform the aforementioned non-billed collections process (Step 22.0). Examples of non-billed payment include, but are not limited to, duplicate policy fees, loan payments, lump sum deposits, new application fees (for fire insurance or the like); non-billed reinstatements; policy changes; premium deposit funds transfers, and the like.

According to the non-billed collections process, the portable computer 10 first displays a list of any existing information in the data storage element 17 regarding non-billed collections relevant to the current customer group, and then prompts the insurance agent to select one of a plurality of different options.

According to a first option, the insurance agent may select (Step 22.2) a type of non-billed payment to be received, and may then enter (Step 22.2.1), via the manual input unit 16, information associated with the non-billed payment. The portable computer 10 then responds by displaying the non-billed payment information in the aforementioned list of existing information.

According to a second option, the insurance agent may elect (Step 22.3), via the manual input unit 16, to remove an entry from the list of non-billed collections. The portable computer 10 responds to such an election by removing the entry from the list.

According to third and fourth options, the insurance agent may elect (Steps 22.4 or 22.6) to access customer group information (Step 22.4.1) or payment history (Step 22.6.1), and in those instances, the portable computer 10 responds in a manner which has been previously described.

According to a fifth option, the insurance agent may elect (Step 22.7) to cancel the Non-Billed Collections process without making any entries. In response to such an election, the portable computer 10 switches to or invokes (Step 22.7.1) the mode or process from which the Collections process (Step 20.0) was accessed.

According to a sixth option, the insurance agent may elect (Step 22.5), via the manual input unit 16, to access more detailed information in connection with certain insurance policies. The portable computer 10 is therefore programmed to respond to such an election by switching to or invoking (Step 22.5.1) a Policy Detail process (Step 30.0) to be described.

According to a seventh option, the insurance agent may elect (Step 22.8), via the manual input unit 16, to return to the Main Collection process (Step 21.0). The portable computer 10 is programmed to respond to such an election by invoking (Step 22.8.1) the Main Collection process (Step 21.0).

According to an eighth option, the insurance agent may elect (Step 22.9), via the manual input unit 16, to invoke the Money Tendered process (Step 27.0). The portable computer 10 is programmed to respond to such an election by invoking (Step 22.9.1) the Money Tendered process (Step 27.0).

Policy Level Collections

Figure 23:
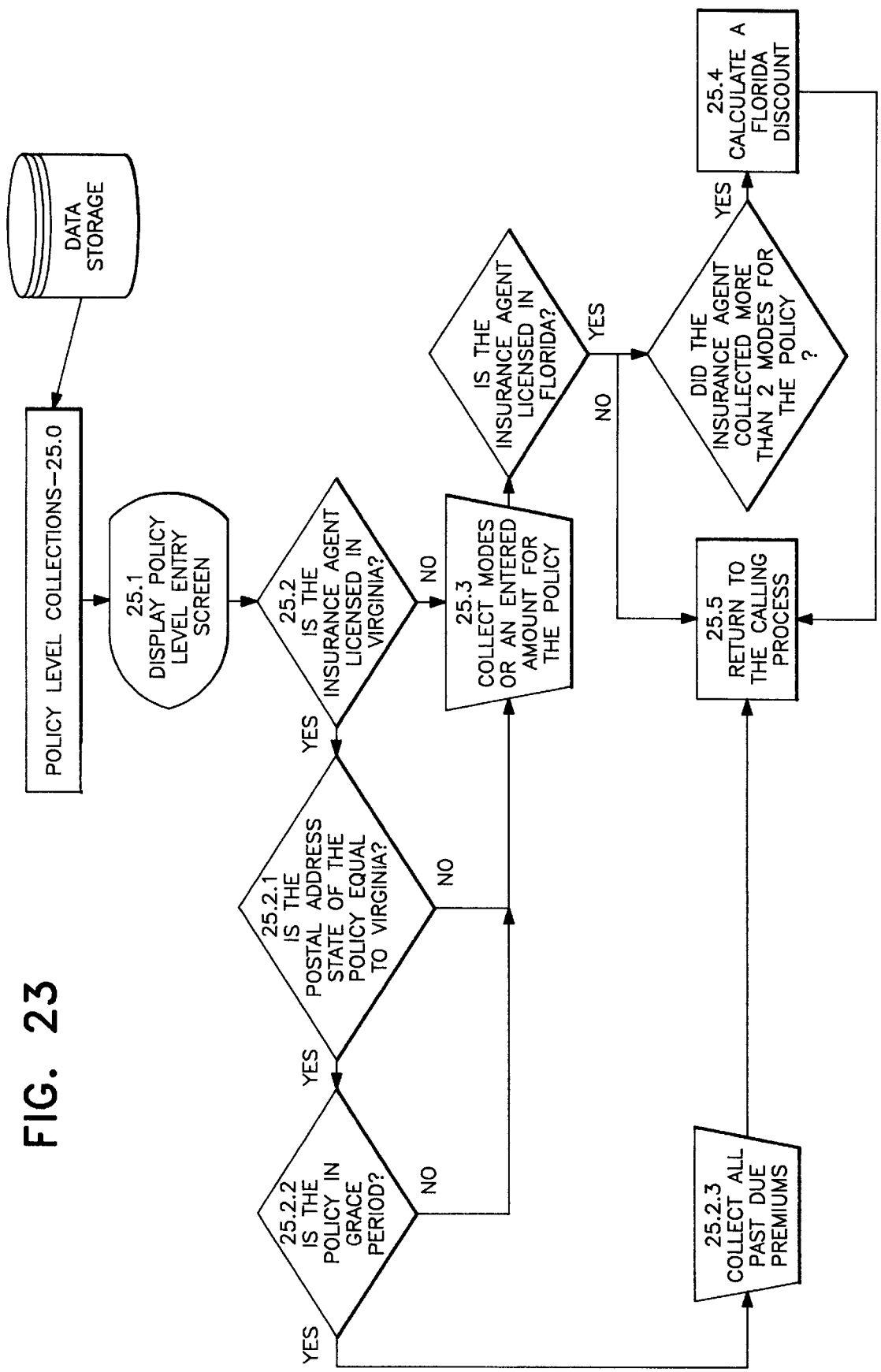
FIG. 23 is a flow diagram illustrating a sequence of events in a Policy Level Collections process according to the present invention.

With reference to FIG. 23, the portable computer 10 is programmed to perform the aforementioned Policy Level Collections process (Step 25.0). According to the Policy Level Collections process, the portable computer 10 first displays (Step 25.1) information regarding payments to be made at the policy level.

The portable computer 10 then determines (Step 25.2) whether the insurance agent is licensed in Virginia. If the insurance agent is not licensed in Virginia, the portable computer 10 prompts (Step 25.3) the insurance agent to collect a payment, which payment may be according to the premium modes or an amount entered by the insurance agent.

If the insurance agent is licensed in Virginia, the portable computer 10 determines (Step 25.2.1) whether the postal address associated with the relevant policy is in Virginia. If the postal address is in Virginia, the portable computer 10 determines (Step 25.2.2) whether the policy is in its grace period. If the policy is in its grace period, the portable computer 10 prompts (Step 25.2.3) the insurance agent to collect all past due premiums.

Upon receiving a confirmation from the insurance agent that all the past due premiums have been collected, the portable computer 10 registers agent transaction information indicative thereof in a designated subsidiary table of the second group of storage tables in the data storage element 17, and then switches to or invokes (Step 25.5) the mode or process from which the Policy Level Collection process was accessed.

If the insurance agent is licensed in Virginia, but the postal address associated with the relevant insurance policy is not in Virginia, the portable computer 10, without determining whether the relevant policy is in its grace period, prompts (Step 25.3) the insurance agent to collect a payment, which payment may be according to the premium modes or an amount entered by the insurance agent.

If the insurance agent is licensed in Virginia and the postal address associated with the relevant insurance policy is in Virginia, but the policy is not in its grace period, the portable computer 10 prompts (Step 25.3) the insurance agent to collect a payment, which payment may be according to the premium modes or an amount entered by the insurance agent.

In response to Step 25.3, the insurance agent enters payment information via the manual input unit 16. The portable computer 10 then determines whether the insurance agent is licensed in Florida.

If the insurance agent is licensed in Florida, the portable computer 10 determines whether the payment information entered by the insurance agent corresponds to more money than is due for two monthly modes. If the payment amount exceeds the amount due for two monthly modes, then a discount is calculated (Step 25.4) and registered in accordance with Florida law. The portable computer 10 then switches to or invokes (Step 25.5) the mode or process from which the Policy Level Collection process was accessed.

If the insurance agent is not licensed in Florida, the portable computer 10 registers the payment information entered by the insurance agent and switches to or invokes (Step 25.5) the mode or process from which the Policy Level Collection process was accessed. References to the States of Virginia and Florida are merely exemplary and it should be apparent that the system may be adapted for other states.

Money Tendered

Figure 24:
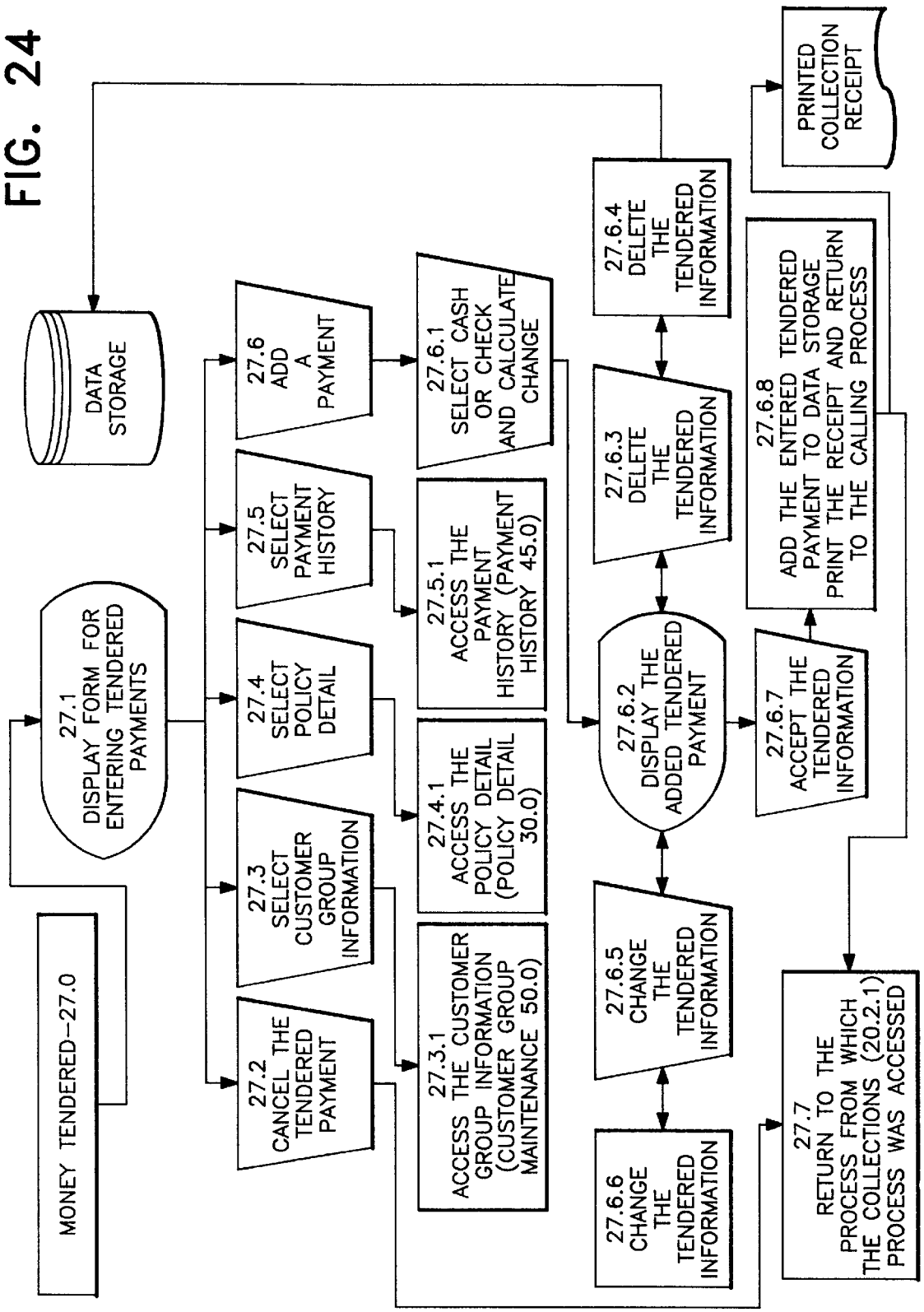
FIG. 24 is a flow diagram illustrating a sequence of events in a Money Tendered process according to the present invention.

With reference to FIG. 24, the portable computer 10 of the present invention is programmed to perform the aforementioned Money Tendered process (Step 27.0).

Initially, the portable computer 10 displays (Step 27.1) a Money Tendered Display which prompts the insurance agent to enter a payment amount. The Money Tendered Display also prompts the insurance agent to select between several options.

With regard to the first option, the insurance agent may elect (Step 27.2), via the electronic pen 16A, to cancel the payment amount entry made in response to Step 27.1. The portable computer 10 is preferably programmed to respond to such an election by switching to or invoking (Step 27.7) the mode or process from which the Collections process (Step 20.0) was accessed, without further processing the payment amount.

With regard to the second option, the insurance agent may elect (Step 27.3), via the electronic pen 16A, to access customer group information. The portable computer 10 preferably responds to such an election by invoking (Step 27.3.1) the Customer Group Maintenance process (Step 50.0).

With regard to the third option, the insurance agent may elect (Step 27.4), via the manual input unit 16, to access policy detail information by invoking (Step 27.4.1) the Policy Detail process (Step 30.0).

With regard to the fourth option, the insurance agent may elect (Step 27.5), via the manual input unit 16, to access payment history information by invoking (Step 27.5.1) the Payment History procedure (Step 45.0).

With regard to the fifth option, the insurance agent may elect (Step 27.6) to register the payment amount requested by the Tendered Payment Display. Initially, the insurance agent selects (Step 27.6.1), via the electronic pen 16A, the type of payment to be entered (e.g., cash or check). The portable computer 10 is preferably programmed to respond to this entry by calculating change due to the customer and displaying (Step 27.6.2) the change amount along with information indicative of tendered amount. The portable computer 10 is further programmed to prompt the insurance agent to elect (Steps 27.6.5, 27.6.3, or 27.6.7) between changing, deleting or accepting the displayed information.

If changing of the tendered amount is selected (Step 27.6.5), then the portable computer 10 responds by changing (Step 27.6.6) the information indicative of tendered amount.

Likewise, if deletion of the displayed information indicative of tendered amount is selected (Step 27.6.3), the displayed information is deleted (27.6.4) by the portable computer 10.

On the other hand, the insurance agent may be satisfied with the entry made and wish to register the displayed information indicative of the tendered amount into the data storage element 17. The portable computer 10 is therefore programmed to respond to such a selection by registering (Step 27.6.8) the displayed information as agent transaction information in a subsidiary table of the second group of storage tables in the data storage element 12. In addition, the portable computer 10 causes a receipt of the agent transaction information to be printed via the printer 19 and then switches to or invokes (Step 27.7) the mode or process from which the Collection Procedure was accessed.

Since the agent transaction information is eventually transmitted to the home office computer array 50 via the communication interface 20, it is understood that by programming the portable computer 10 to operate as indicated above, means are provided for transmitting the payment amount information to the home office 5 as at least part of the agent transaction information.

Policy Detail

Figure 25:
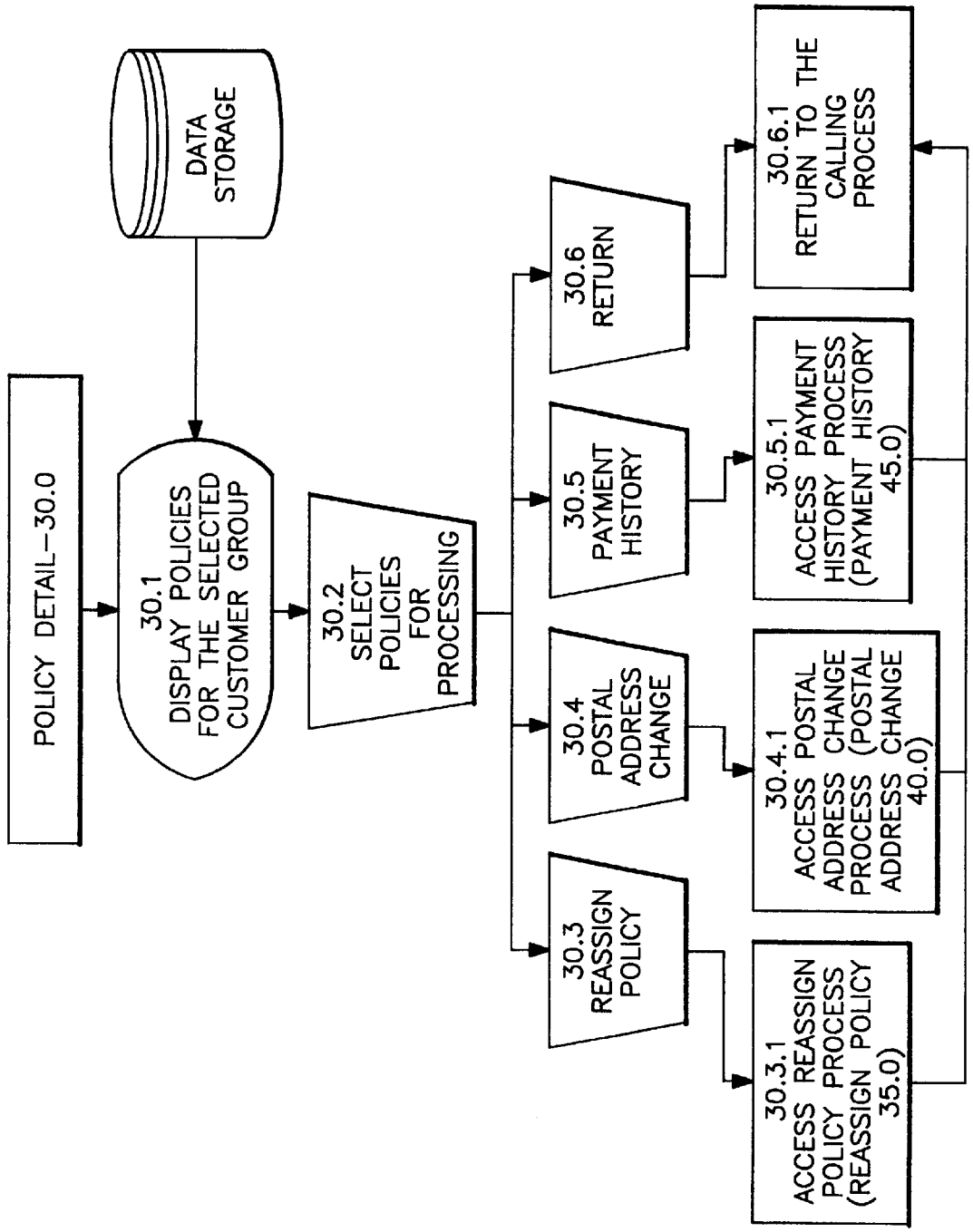
FIG. 25 is a flow diagram illustrating a sequence of events in a Policy Detail process according to the present invention.

With reference to FIG. 25, the portable computer 10 of the present invention is also programmed to perform the aforementioned Policy Detail process (Step 30.0).

Initially, the portable computer 10 displays (Step 30.1) a Policy Detail Display containing information from the data storage element 17 about the individual insurance policies pertaining to a selected customer group. The portable computer 10 prompts the insurance agent to select (Step 30.2) which of the displayed policies are to be included in the Policy Detail process.

After the policies have been selected from the Policy Detail Display, the portable computer 10 prompts the insurance agent to select one of four options.

According to a first option, the insurance agent may elect (Step 30.6), via the electronic pen 16A, to depart from the Policy Detail process without taking action on the selected insurance policies. The portable computer 10 is therefore preferably programmed to respond to such an election by automatically switching to or invoking (Step 30.6.1) the mode or process from which the Policy Detail process was accessed.

According to a second option, the insurance agent may elect (Step 30.3), via the electronic pen 16A, to reassign the selected policies to another customer group. The portable computer 10 is preferably programmed to respond to such an election by invoking (Step 30.3.1) a Reassign Policy process (Step 35.0). Thereafter, the portable computer 10 automatically switches to or invokes (Step 30.6.1) the mode or process from which the Policy Detail process was accessed.

According to a third option, the above-mentioned Payment History process (Step 45.0) may be elected (Step 30.5)

by the insurance agent, and the portable computer 10 is preferably programmed to invoke (Step 30.5.1) the Payment History process. Thereafter, the portable computer 10 automatically switches to or invokes (Step 30.6.1) the mode or process from which the Payment History process was accessed.

According to a fourth option, the insurance agent may elect (Step 30.4), via the electronic pen 16A, to change a postal address associated with the selected policies. The portable computer 10 is preferably programmed to respond to such an election by invoking (Step 30.4.1) a Postal Address Change process (Step 40.0). Thereafter, the portable computer 10 automatically switches to or invokes (Step 30.6.1) the mode or process from which the Postal Address Change process was accessed.

Reassign Policy

Figure 26:
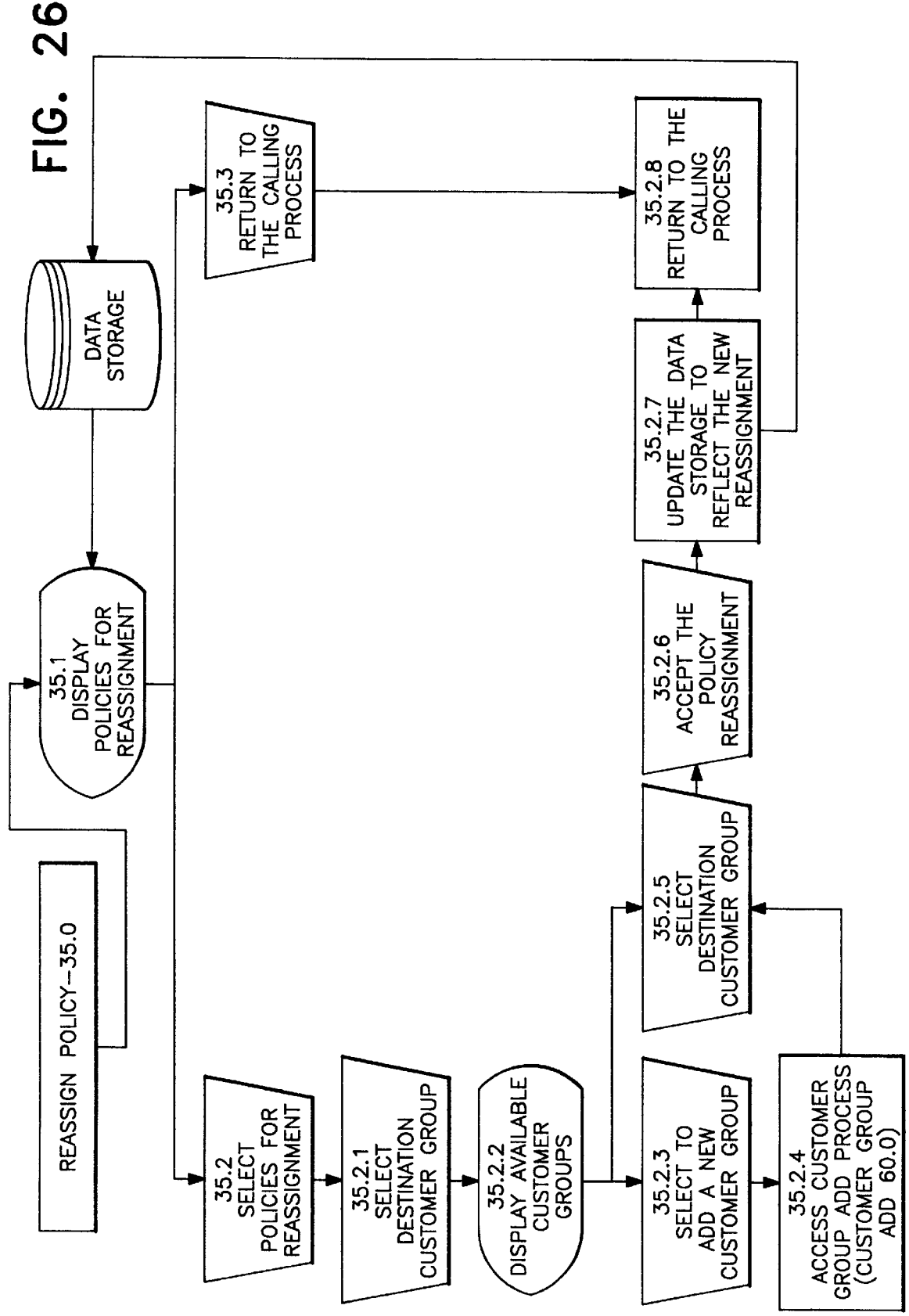
FIG. 26 is a flow diagram illustrating a sequence of events in a Reassign Policy process according to the present invention.
Figure 27:
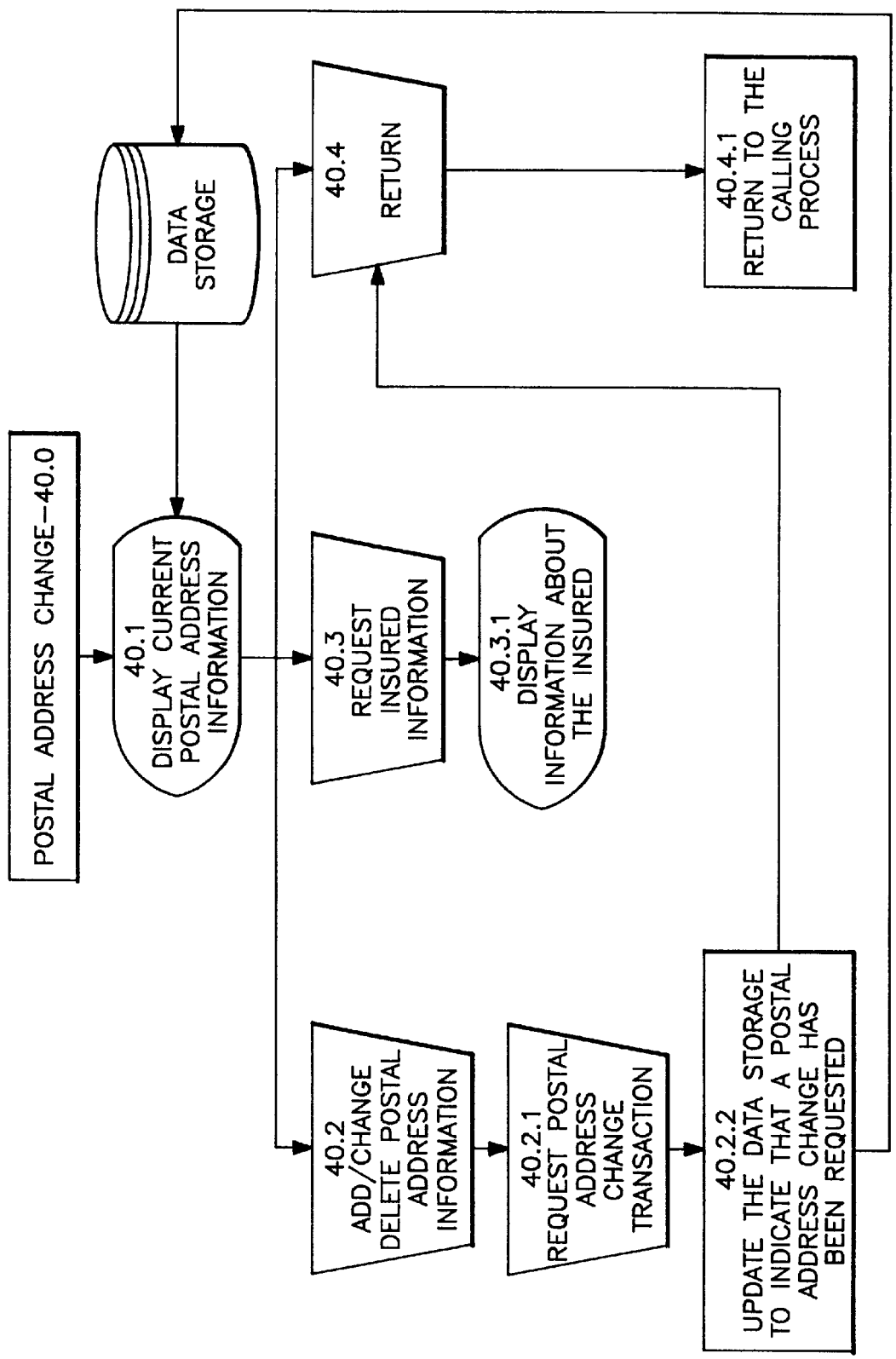
FIG. 27 is a flow diagram illustrating a sequence of events in a Postal Address Change process according to the present invention.

With reference to FIG. 26, the portable computer 10 of the present invention is also programmed to perform the aforementioned Reassign Policy process (Step 35.0).

Initially, the portable computer 10 displays (Step 35.1) information from the data storage element 17 regarding policies for reassignment. The portable computer 10 then prompts the insurance agent to elect between departing (Step 35.3) from the Reassign Policy process (step 35.3) without making any reassignments or selecting (Step 35.2) policies from the displayed information for subsequent reassignment.

If the insurance agent elects (Step 35.3) departure, the portable computer 10 responds by automatically switching to or invoking (Step 35.2.8) the mode or process from which the Reassign Policy process was accessed.

If, on the other hand, the insurance agent selects (Step 35.2) policies from the displayed information, the portable computer 10 responds by prompting (Step 35.2.1) the insurance agent to select a destination customer group for the selected and displayed policy information.

Upon receiving this information regarding a destination customer group from the insurance agent, the portable computer 10 displays (Step 35.2.2) a list of available customer groups. The insurance agent may then chose to select an existing customer number (Step 35.2.5) as the destination customer group, or add (Step 35.2.3) a new customer group which is then selected to be the destination customer group.

If a new customer group is to be added, the portable computer 10 invokes (Step 35.2.4) a Customer Group Add process (Step 60.0) and after the Customer Group Add process is complete, the insurance agent selects (Step 35.2.5) the destination customer group.

The insurance agent then can determine (Step 35.2.6) whether to accept the reassignment. If the reassignment is accepted by the insurance agent, the portable computer 10 reacts by updating the second group of storage tables of the data storage element 17 to reflect the new assignment. The portable computer 10 then switches to or invokes (Step 35.2.8) the mode or process from which the Reassign Policy process was accessed.

Postal Address Change

With reference to FIG. 26, the portable computer 10 of the present invention is also programmed to perform the aforementioned Postal Address Change process (Step 40.0).

According to the Postal Address Change process, the portable computer 10 initially displays (Step 40.1) current postal address information derived from the data storage element 17. The portable computer 10 then prompts the insurance agent to select one of three options.

According to the first option, the insurance agent may elect (Step 40.2) to modify the postal address information by adding, deleting or changing information on the display screen 12, and then may enter (Step 40.2.1) the desired modifications.

The portable computer 10 responds by incorporating the modifications into the agent transaction information contained in a subsidiary table of the second group of storage tables in the data storage element 17. Thereafter, the portable computer 10 switches to or invokes (Step 40.4.1) the mode or process from which the Postal Address Change process was accessed.

According to the second option, the insurance agent may request (Step 40.3) information about the insured, and the portable computer 10 responds to such a request by displaying (Step 40.3.1) information about the insured.

According to the third option, the insurance agent may elect (Step 40.4) to depart from the Postal Address Change process without modifying postal address information. The portable computer 10 responds to such an election by switching to or invoking (Step 40.4.1) the mode or process from which the Postal Address Change process was accessed.

Payment History

Figure 28:
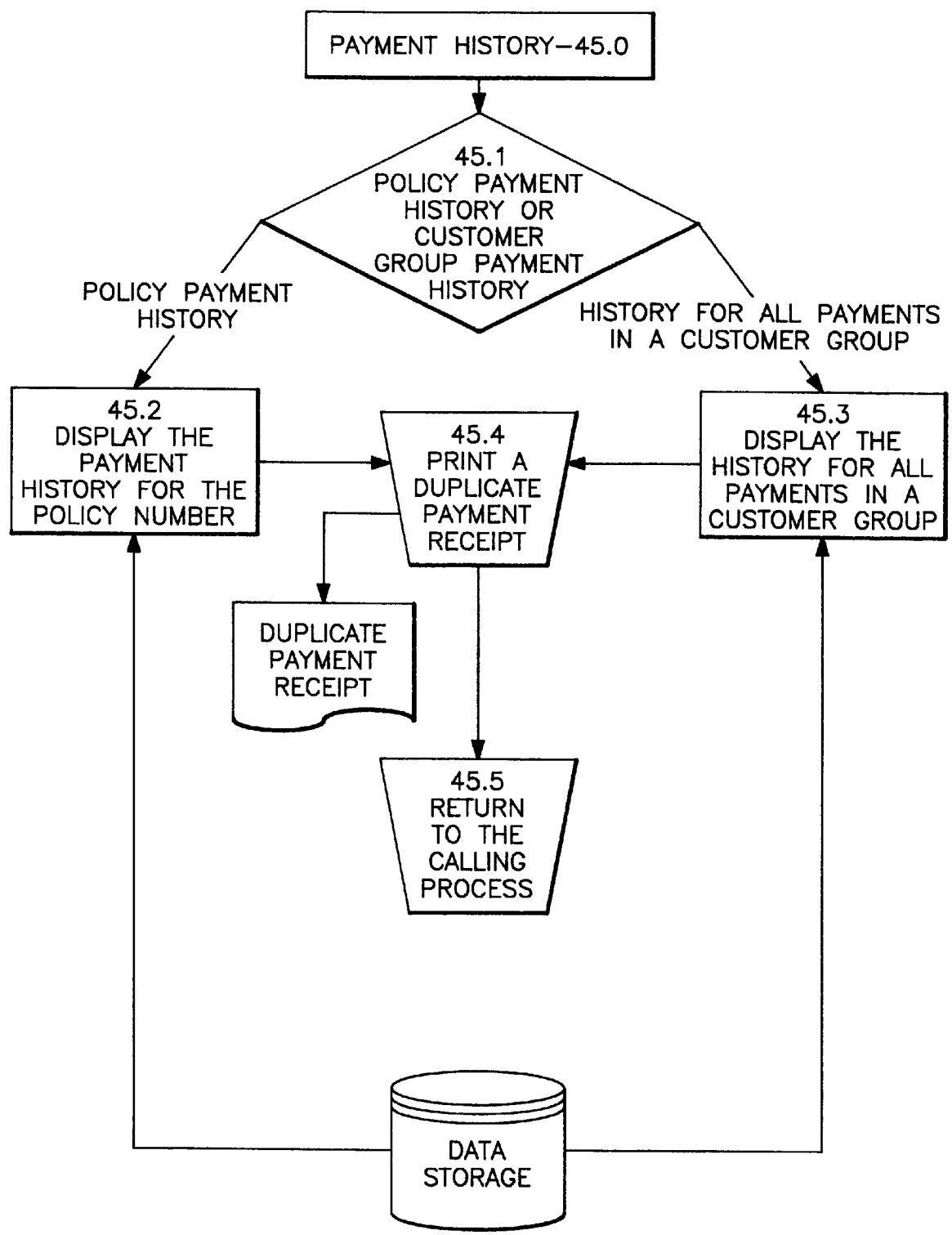
FIG. 28 is a flow diagram illustrating a sequence of events in a Payment History process according to the present invention.

With reference to FIG. 28, the portable computer 10 of the present invention is further programmed to perform the aforementioned Payment History process (Step 45.0).

According to the Payment History process, the portable computer 10 initially determines (Step 45.1) whether a customer group was selected or a particular policy was selected in the previous mode or process which invoked the Payment History process.

If a customer group was selected in the previous mode or process, the portable computer 10 responds by displaying (Step 45.3) payment history information associated with the particular customer group, which payment history information is derived from the first and second groups of storage tables in the data storage element 17.

Similarly, if a particular policy was selected in the previous mode or process, the portable computer 10 responds by displaying (Step 45.2) payment history information associated with the particular policy, which payment history information is also derived from the first group of storage tables of the data storage element.

After the payment history is displayed (Steps 45.2 or 45.3), if a "Print Duplicate Receipt" box is tapped on the display screen 12 using the electronic pen 16A, the portable computer 10 generates a duplicate payment receipt via the printer 19.

Next, if a "Cancel" box on the display screen 12 is tapped using the electronic pen 16A, the portable computer 10 switches to or invokes (Step 45.5) the mode or process from which the payment history process was accessed.

Customer Group Maintenance

Figure 29:
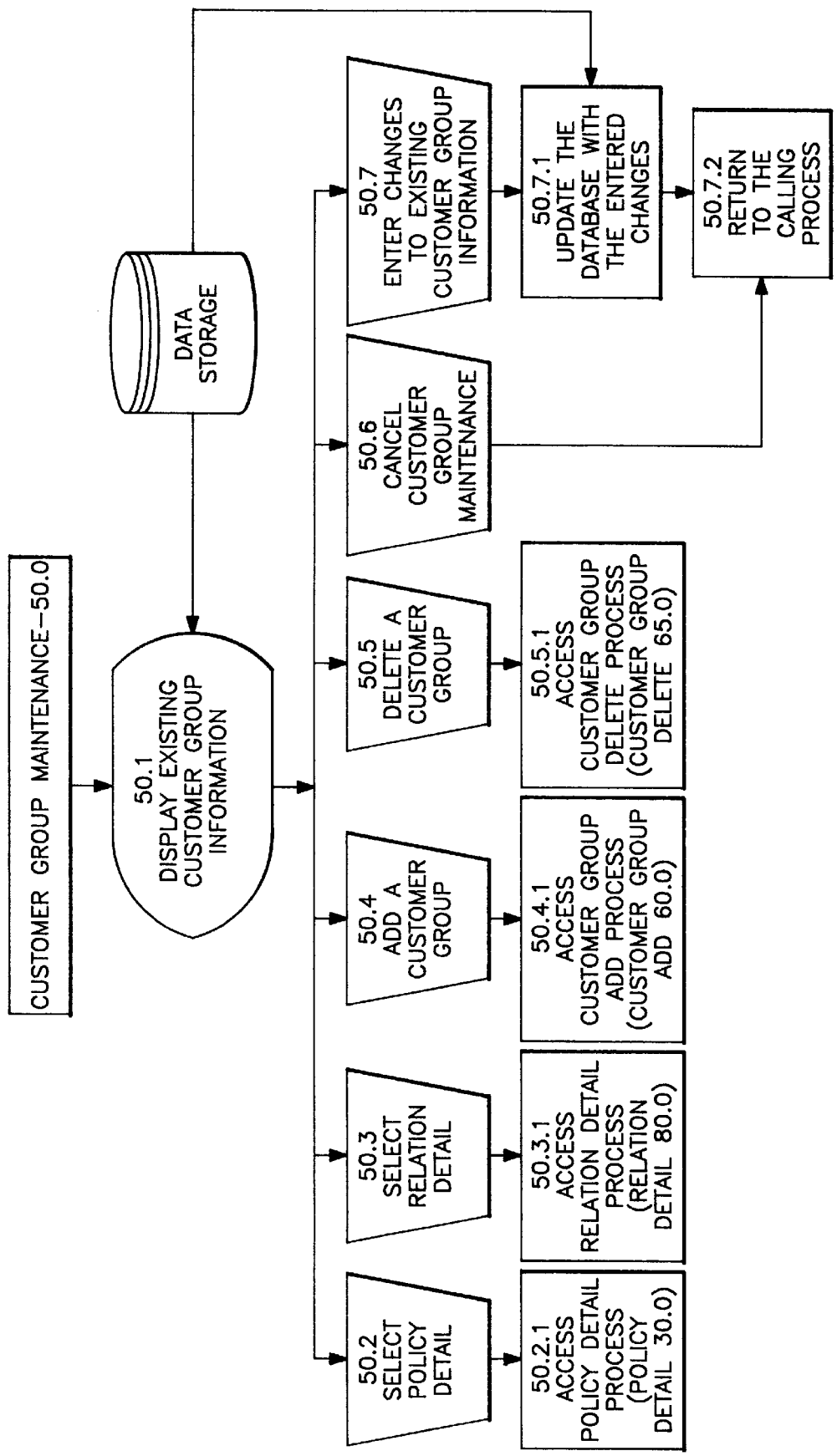
FIG. 29 is a flow diagram illustrating a sequence of events in a Customer Group Maintenance process according to the present invention.

With reference to FIG. 29, the portable computer 10 of the present invention is programmed to perform the aforementioned Customer Group Maintenance process (Step 50.0).

According to the Customer Group Maintenance process, the portable computer 10 initially displays (Step 50.1) existing customer group information derived from the data storage element 17. The portable computer 10 then presents the insurance agent with the ability to select one of six options, by displaying the six options in respective display boxes and being programmed so as to respond to tapping of the display boxes, via the electronic pen 16A, to execute the associated option.

According to the first option, the insurance agent may select (Step 50.2) the Policy Detail process (Step 30.0) described above. In response to such a selection, the portable computer 10 invokes (Step 50.2.1) the Policy Detail process (Step 30.0).

According to the second option, the insurance agent may select (Step 50.3) the Relation Detail process (Step 80.0). In response to such a selection, the portable computer 10 invokes (Step 50.3.1) the Relation Detail process (Step 80.0).

According to the third option, the insurance agent may select (Step 50.4) the Customer Group Add process (Step 60.0) to be described. In response to such a selection, the portable computer 10 invokes (Step 50.4.1) the Customer Group Add process (Step 60.0).

According to the fourth option, the insurance agent may select (Step 50.5) the Customer Group Delete process (Step 65.0) to be described. In response to such a selection, the portable computer 10 invokes (Step 50.5.1) the Customer Group Delete process (Step 65.0).

According to a fifth option, the insurance agent may elect (Step 50.6) to depart the Customer Group Maintenance process, in which case, the portable computer 10 responds by switching to or invoking (Step 50.7.2) the mode or process from which the Customer Group Maintenance process was accessed.

According to the sixth option, the insurance agent may elect to modify the existing customer group information, preferably, using the electronic pen 16A in an manner previously described. The portable computer 10 is programmed to respond to such modifications by registering (Step 50.7.1) the modifications as agent transaction information in a subsidiary table of the second group of storage tables of the data storage element 17. The portable computer 10 then responds by switching to or invoking (Step 50.7.2) to the mode or process from which the Customer Group Maintenance process was accessed.

Customer Group Add

Figure 30:
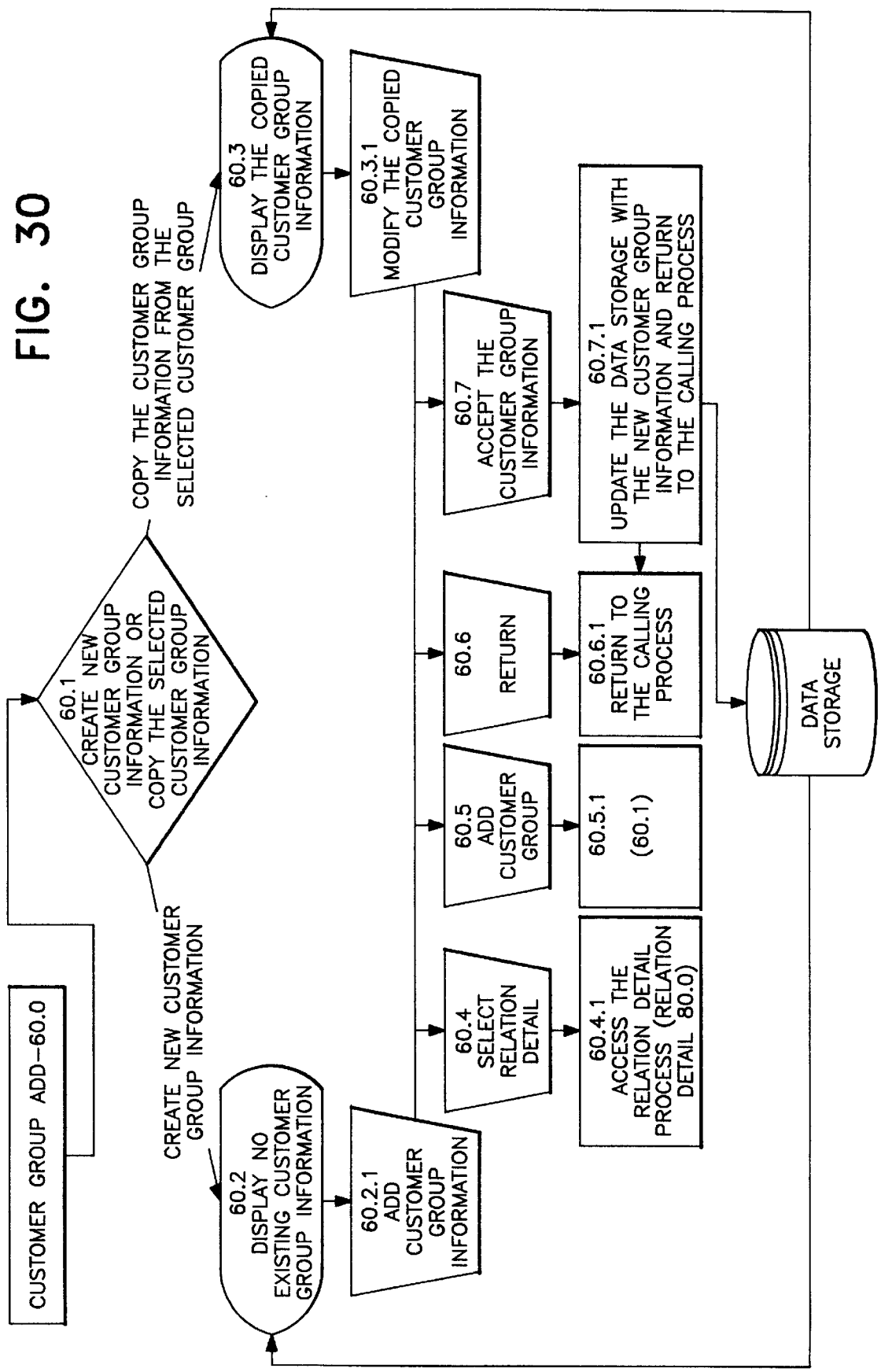
FIG. 30 is a flow diagram illustrating a sequence of events in a Customer Group Add process according to the present invention.

With reference to FIG. 30, the portable computer 10 of the present invention is programmed to perform the aforementioned Customer Group Add process (Step 60.0).

According to the Customer Group Add process, the portable computer 10 initially determines (Step 60.1) whether new customer group information is to be created or whether selected customer group information is to be copied.

If new customer group information is to be added, the portable computer 10 displays (Step 60.2) no existing customer group information and prompts the insurance agent to enter the customer group information to be added. After the insurance agent enters the customer group information to be added (Step 60.2.1), the portable computer responds by presenting the insurance agent with the ability to select one of four options, by displaying the four options in respective display boxes, and being responsive to such tapping of the respective display boxes to execute the associated option.

If, on the other hand, customer group information is to be copied, the selected customer group information derived from the data storage element 17 is displayed (Step 60.3) by the portable computer 10 on the display screen 12, and the portable computer 10 then prompts the insurance agent to modify the copied customer group information. After the insurance agent modifies the copied customer group information (Step 60.3.1), the portable computer responds by presenting the insurance agent with the ability to select one of the same four options in the same manner. As indicated above, the portable computer 10 responds to such a selection by executing the associated option.

According to the first option, the insurance agent may select (Step 60.4) the Relation Detail process (Step 80.0). In response to such a selection, the portable computer 10 invokes (Step 60.4.1) the Relation Detail process (Step 80.0).

According to the second option, the insurance agent may elect (Step 60.5) to again invoke the Customer Group Add process (Step 60.0) from the beginning. In response to such an election, the portable computer 10 again invokes (Step 60.5.1) the Customer Group Add process (Step 60.0).

According to the third option, the insurance agent may elect (Step 60.6) to depart from the Customer Group Add process (Step 60.0) without registering the additions or changes made during the process. In response to such an election, the portable computer 10 switches to or invokes (Step 60.6.1) the mode or process from which the Customer Group Add process was accessed.

According to the fourth option, the insurance agent may accept (Step 60.7), via the manual input unit 16, the added or modified customer group information. If the acceptance is made, the portable computer 10 registers (Step 60.7.1) the added or modified customer group information in a designated subsidiary table of the second group of storage tables in the data storage element 17. Thereafter, the portable computer 10 switches to or invokes (Step 60.6.1) the mode or process from which the Customer Group Add process (Step 60.0) was accessed.

Customer Group Delete

Figure 31:
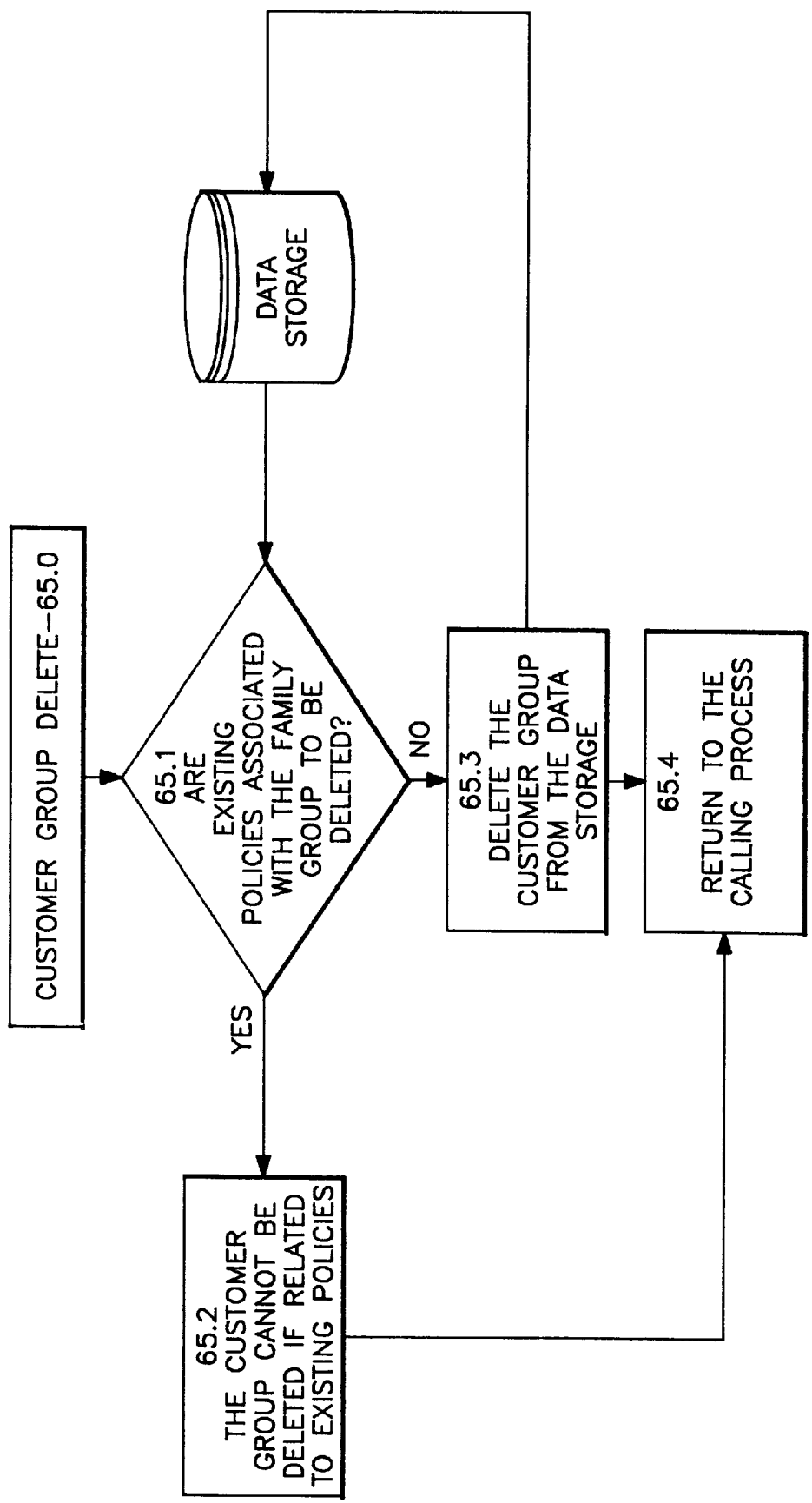
FIG. 31 is a flow diagram illustrating a sequence of events in a Customer Group Delete process according to the present invention.

With reference to FIG. 31, the portable computer 10 of the present invention is programmed to perform the aforementioned Customer Group Delete process (Step 65.0).

According to the Customer Group Delete process, the portable computer 10 initially determines (Step 65.1) whether there are existing policies associated with the customer group to be deleted.

If there are existing policies associated with the customer group to be deleted, the portable computer 10 will not permit deletion of the customer group and will provide a message via the display screen 12 indicative of this. The portable computer 10 then switches to or invokes (Step 65.4) the mode or process from which the Customer Group Delete process was accessed.

If, on the other hand, there are no existing policies associated with the customer group to be deleted, the customer group is deleted and agent transaction information indicative of this deletion is registered by the portable computer 10 in a designated subsidiary table of the second group of storage tables in the data storage element 17 (Step 65.3). The portable computer 10 then switches to or invokes (Step 65.4) the mode or process from which the Customer Group Delete process was accessed.

Mass Billing Process

Figure 32:
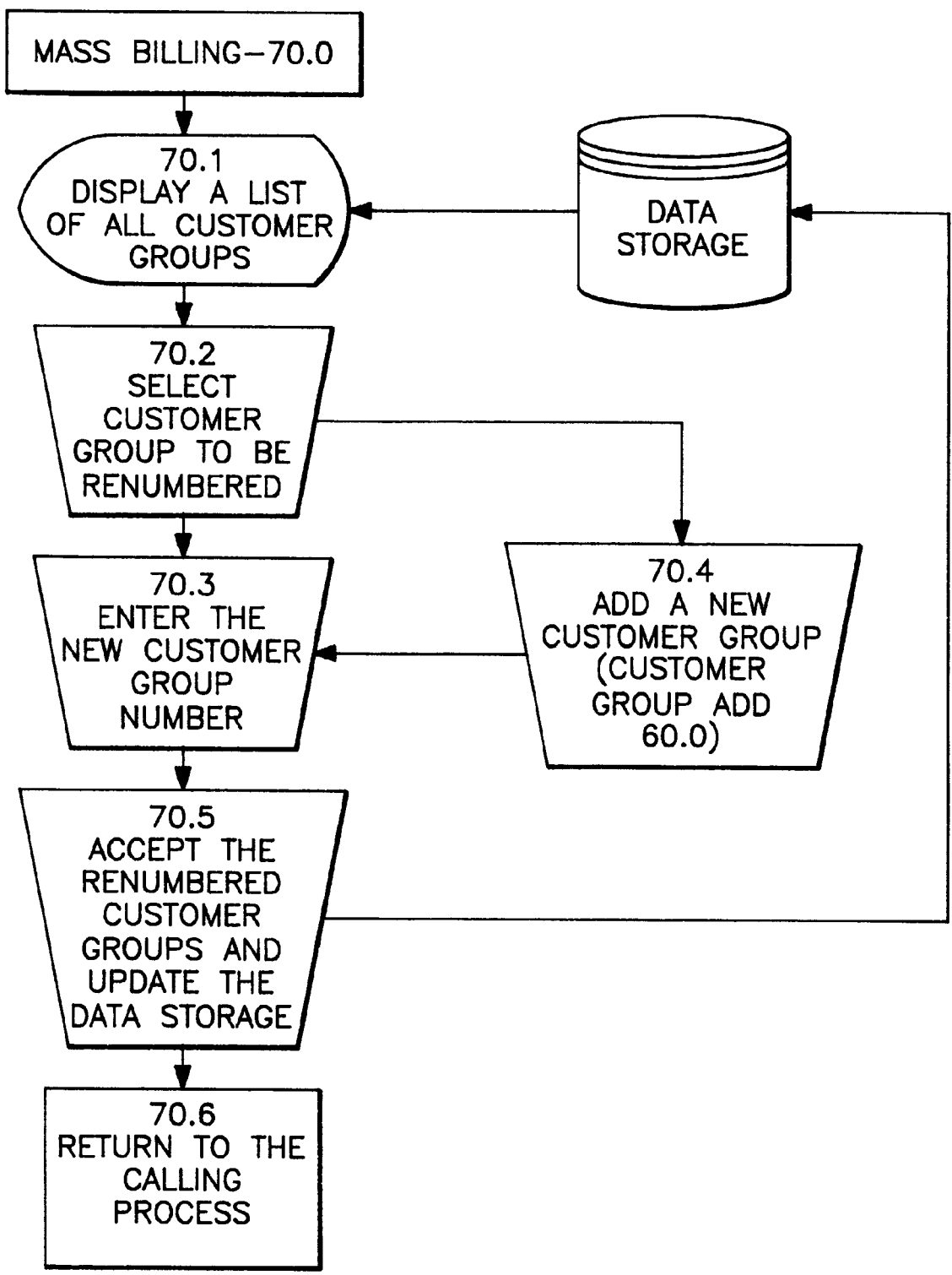
FIG. 32 is a flow diagram illustrating a sequence of events in a Mass Billing process according to the present invention.

With reference to FIG. 32, the portable computer 10 of the present invention is programmed to perform the aforementioned Mass Billing process (Step 70.0).

According to the Mass Billing process, the portable computer 10 initially displays (Step 70.1) a list of all customer groups, which list is derived from the data storage element 17.

From the list of all customer groups, the insurance agent may select (Step 70.2) one of the customer groups for renumbering, and then may enter (Step 70.3) a new number for the selected customer group.

Additionally, the insurance agent may elect (Step 70.4) to add a new customer group by invoking the aforementioned Customer Group Add process (Step 60.0), and then may enter (Step 70.3) a new number for the added group.

If the insurance agent then deems the renumbered customer group acceptable (Step 70.5), the insurance agent signifies this acceptance via the manual input unit 16. In response to such an acceptance, the portable computer 10 registers information regarding the renumbering as agent transaction information in a designated storage table of the second group of storage tables in the data storage element 17. Thereafter, the portable computer switches to or invokes (Step 70.6) the mode or process from which the Mass Billing process was accessed.

Relation Detail

With reference to FIG. 33, the portable computer 10 of the present invention is programmed to perform the aforementioned Relation Detail process (Step 80.0).

According to the Relation Detail process, the portable computer 10 initially displays (Step 80.1) a blank screen field (if there is no relation information in the data storage element 17 for the relevant customer group) or a screen field containing relation detail information from the data storage element 17. The relation detail information, for example, includes spousal information, relative information, friend information, child information, and reference information.

The insurance agent the may elect to add, change, or delete the spousal information (Step 80.2), the relative information (Step 80.3), the friend information (Step 80.4), the child information (Step 80.5), or the reference information (Step 80.6).

After the additions, changes or deletions are made by the insurance agent via the manual input unit 16, the portable computer 10 registers (Step 80.7) agent transaction information indicative of the additions, changes, or deletions in designated subsidiary tables of the second group of storage tables in the data storage element 17. Thereafter, the portable computer 10 switches to or invokes (Step 80.8) the mode or process from which the Relation Detail process was accessed.

District Office Computer

The differences between the programming of the portable computers 10 and the district office computers 30 are very minor. The district office computer 30, for example, is programmed with insurance information for all customers within the respective district, while the portable computer 10 is only programmed with information pertaining to customers served by the particular insurance agent to which the portable computer 10 is assigned.

Since the district office computer preferably never leaves the district office, there is no need for its data storage element 31 to contain ratebook data, calendar management data, or route management data. Likewise, the district office computer 30 need not be programmed to perform the ratebook, calendar management and route management operations.

Another difference between the programming of the district office computer 30 and that of the portable computer 10 is that the district office computer is programmed to generate management and district office reports both summarizing and analyzing the activity of the district office and the various insurance agents associated therewith.

Otherwise, the district office computer operates and is programmed in much the same way as the portable computer. Accordingly, there is no need to describe such programming, in view of the foregoing extensive description of how the portable computer 10 is preferably programmed.

Although the present invention is described above in connection with a preferred embodiment, it is understood that the present invention is not limited to the specific arrangements of the preferred embodiment.

For example, although the present invention has been described as being programmed using various preferred forms of software and displays, it is understood that other software may be utilized to achieve results well within the scope of the present invention. Likewise, hardware components may be substituted in many instances for software components without departing from the scope and spirit of the invention.

We claim:

1. A system for registering insurance transactions and communicating the insurance transactions to a home office, said system comprising:

at least one portable computer including a display screen, data storage means for holding insurance information pertaining to a plurality of insurance customers, a computer processor, and a manual input unit, said at least one portable computer being programmed to receive queries from an insurance agent via said manual input unit and, in response to said queries, to display agent-selected portions of said insurance information, said at least one portable computer being further programmed to receive agent transaction information from the insurance agent via said manual input unit and to register said agent transaction information;

a communication interface for transmitting said agent transaction information to the home office and for receiving from the home office updated insurance information which said computer processor uses to alter the insurance information in said data storage means;

wherein said at least one portable computer is further programmed to prevent permanent alteration of insurance information within said data storage first location via said manual input unit and is programmed to alter the insurance information within said data storage first location only in response to updated insurance information from the home office; and wherein said at least one portable computer is further programmed to operate in a route list planning mode during which said display screen visually presents at least a portion of a first list and at least a portion of a second list;

said first list including customer information sorted according to one of a plurality of different sorting arrangements;

said second list containing only customer information as selected from the first list by the insurance agent;

said at least one portable computer being further programmed to recognize and execute commands from the insurance agent via said manual input unit directing said computer processor to move selected customer information from the first list to the second list.

2. The system of claim 1, wherein said display screen is activated by said at least one portable computer to create a plurality of display fields; and wherein said at least one manual input unit includes an electronic pen which the user places against selectively chosen ones of said display fields and manually manipulates to communicate said agent transaction information to said at least one portable computer.

3. The system of claim 1, wherein said at least one portable computer is further programmed to operate in a Daily Route List mode during which said second list is displayed without displaying said first list;

said at least one portable computer being further programmed to recognize selection of customer information from said second list via said manual input unit by the insurance agent, and being further programmed to retrieve and display supplemental insurance information from said data storage means, said supplemental insurance information being associated with the customer information selected from the second list by the insurance agent.

4. The system of claim 1, wherein said at least one portable computer is programmed to recognize a selection of one of said plurality of different sorting arrangements by the insurance agent via said manual input unit and to execute sorting of said first list in accordance therewith, said at least one portable computer being further programmed so that said plurality of different sorting arrangements include:

a first sorting arrangement wherein sorting is performed in numerical order according to a customer number assigned to each customer;

a second sorting arrangement wherein sorting is performed in alphabetical order according to customer names;

a third sorting arrangement wherein sorting is performed in chronological order according to due dates associated with each customer's insurance; and a fourth sorting arrangement wherein sorting is performed according to status information pertaining to customers' insurance policies, said status information being indicative of whether the insurance policies are in a current period, a lapsed period, or in a grace period within the lapsed period.

5. The system of claim 4, wherein said at least one portable computer is further programmed so as to recognize and execute commands from the insurance agent via said manual input unit directing said computer processor to limit said first list according to status information pertaining to customers' insurance policies, said status information being indicative of whether the insurance policies are in a current period, a lapsed period, or in a grace period within the lapsed period; and wherein said at least one portable computer is further programmed so as to recognize and execute commands from the insurance agent via said manual input unit directing said computer processor to limit said first list according to visit preference information indicative of the best times and dates to visit the customers.

6. The system of claim 1, wherein said at least one portable computer is programmed so that said first list includes:

customer numbers;

customer names;

status information pertaining to customers' insurance policies, said status information being indicative of whether the insurance policies are in a current period, a lapsed period, or in a grace period within the lapsed period;

due dates for payments in connection with said customers' insurance policies;

payment amounts due in connection with said customers' insurance policies; and visit preference information indicative of the best times and dates to visit the customers.

7. The system of claim 1, wherein said insurance information stored in the data storage first location includes data indicative of payment amounts due from each customer; and wherein said at least one portable computer is programmed to receive, via said manual input unit, a collection query from the insurance agent, said collection query being associated with any one of said insurance customers, said at least one portable computer being further programmed to respond to said collection query by:

retrieving from the data storage first location data indicative of a payment amount due from said insurance customer; and displaying said payment amount on the display screen.

8. The system of claim 1, wherein said at least one portable computer is programmed to accept payment amount information indicative of an amount paid by an insurance customer to the insurance agent, said payment amount information being provided by said insurance agent via said manual input unit; and wherein said at least one portable computer is further programmed to register said payment amount information in a data storage second location.

9. The system of claim 8, wherein said at least one portable computer further comprises means for preventing said at least one portable computer from accepting payment amount information associated with improper transactions.

10. The system of claim 8, wherein said at least one portable computer further comprises means for preventing said at least one portable computer from accepting payment amount information associated with transactions which are not permitted under insurance laws and regulations.

11. The system of claim 8, wherein said at least one portable computer is also programmed to register information regarding a type of payment received by the agent and to calculate, if appropriate, an amount of change due back to the insurance customer.

12. The system of claim 8, wherein said at least one portable computer is programmed to receive, via said manual input unit, a close-out command from the insurance agent, said at least one portable computer being further programmed to calculate a total representing the total amount of payments collected during a period of time preceding said close-out command, and wherein said at least one portable computer is programmed to present said insurance agent with a deposit summary including said total amount.

13. The system of claim 12, wherein said at least one portable computer further includes a printer, said at least one portable computer being programmed to print out said deposit summary via the printer.

14. The system of claim 8, wherein said at least one portable computer further includes a printer, said at least one portable computer being programmed so as to print, via said printer, a receipt indicative of said amount paid by an insurance customer to the insurance agent.

15. The system of claim 8, wherein said communication interface for transmitting said agent transaction information to the home office and for receiving from the home office updated insurance information, includes means for transmitting said payment amount information to the home office as at least part of said agent transaction information.

16. The system of claim 1, wherein said at least one portable computer is further programmed to receive modification information from the insurance agent via said manual input unit, said modification information corresponding to changes in the insurance information pertaining to a particular one of said insurance customers, said at least one portable computer being further programmed to register said modification information in a data storage second location and also being programmed to subsequently transmit said modification information via said communication interface to the home office as at least part of said agent transaction information.

17. The system of claim 1, wherein said data storage first location includes ratebook information;

wherein said at least one portable computer is programmed to receive ratebook inquiries from said insurance agent via said manual input unit, said ratebook inquiries corresponding to requests for pricing information associated with insurance policies available from the home office; and wherein said at least one portable computer is further programmed to respond to said ratebook inquiries with an indication of said pricing information, said pricing information being based on said ratebook information in the data storage first location.

18. The system of claim 1, and further comprising a plurality of said at least one portable computer, each portable computer being associated with one of a plurality of insurance districts; said system further comprising:

a district office computer assigned to each insurance district, each district office computer including a district office data storage means for storing at least a portion of the insurance information contained in the data storage first location of each portable computer assigned to that insurance district, each district office computer further including a district office display screen, a district office computer processor, and a manual input device, each district office computer being programmed to receive queries from district office personnel via said manual input device and, in response to said queries, to display selected portions of said insurance information, each district office computer being further programmed to receive district office transaction information from the district office personnel via said manual input device and to register said district office transaction information; and a district office communication interface at each district office computer for transmitting said district office transaction information to the home office and for receiving from the home office district-specific updated insurance information, wherein said district office computer processor utilizes said district-specific updated insurance information to alter the insurance information in said district office data storage means.

19. The system of claim 18, wherein each portable computer is programmed to receive, from the home office, updated insurance information derived from said district office transaction information.

20. The system of claim 1, wherein:

said insurance information pertaining to a plurality of insurance customers is stored in said data storage first location;

said agent transaction information from the insurance agent is registered in a data storage second location; and said at least one portable computer is programmed to alter the insurance information in said data storage first location only in response to said updated insurance information from the home office.

21. A system for registering insurance transactions and communicating the insurance transactions to a home office, said system comprising:

a plurality of portable computers assigned to respective insurance agents, each of said portable computers including a display screen, data storage means for holding insurance information pertaining to a plurality of insurance customers, a computer processor, and a manual input unit, each of said portable computers being programmed to receive queries from its respective insurance agent via said manual input unit and, in response to said queries, to display agent-selected portions of said insurance information, each of said portable computers being further programmed to receive agent transaction information from its respective insurance agent via said manual input unit and to register said agent transaction information;

a home office computer including central data storage means, means for processing agent transaction information transmitted by said portable computer to said home office computer to provide updated insurance information pertaining to a particular one of said portable computers, and means for transmitting said updated insurance information to said particular one of the portable computers;

a communication interface at each portable computer for transmitting said agent transaction information to the home office computer and for receiving from the home office computer said updated insurance information which said computer processor uses to alter the insurance information in said data storage means; and wherein said insurance information and said updated insurance information are stored in a first group designated within the data storage means of said portable computers, and wherein said agent transaction information is stored in a second group designated within the data storage means of said portable computers, said portable computers being programmed to prevent permanent alteration of insurance information within said first group via said manual input unit programmed to alter the insurance information in said first group only in response to said updated insurance information from the home office; and wherein said portable computers are further programmed to operate in a route list planning mode during which said display screen visually presents at least a portion of a first list and at least a portion of a second list;

said first list including customer information sorted according to one of a plurality of different sorting arrangements;

said second list containing only customer information as selected from the first list by the insurance agent;

said portable computers being further programmed to recognize and execute commands from the insurance agent via said manual input unit directing said computer processor to move selected customer information from the first list to the second list.

22. The system of claim 21, wherein each portable computer is associated with one of a plurality of insurance districts; said system further comprising:

a district office computer assigned to each insurance district, each district office computer including a district office data storage means for storing at least a portion of the insurance information contained in the data storage means of each portable computer assigned to that insurance district, each district office computer further including a district office display screen, a district office computer processor, and a manual input device, each district office computer being programmed to receive queries from district office personnel via said manual input device and, in response to said queries, to display selected portions of said insurance information, each district office computer being further programmed to receive district office transaction information from the district office personnel via said manual input device and to register said district office transaction information; and a district office communication interface at each district office computer for transmitting said district office transaction information to the home office computer and for receiving from the home office computer district-specific updated insurance information, wherein said district office processor utilizes said district-specific updated insurance information to alter the insurance information in said district office data storage means.

23. The system of claim 22, wherein each portable computer is programmed to receive, from the home office computer, updated information derived from said district office transaction information.

24. The system of claim 22, wherein said insurance information and said updated district-specific insurance information are stored in a first storage group designated within the district office data storage means, and wherein said district office transaction information is stored in a second storage group designated within said district office data storage means, said district office computers being programmed to alter the insurance information in said first storage group only in response to said district office-specific updated insurance information from the home office.

* * * * *